United States Patent
Nishimura et al.

(10) Patent No.: US 7,386,623 B2
(45) Date of Patent: Jun. 10, 2008

(54) CONTENT DISTRIBUTION NOTIFICATION METHOD, RESERVATION CONTROL APPARATUS AND PROGRAM STORAGE MEDIUM

(75) Inventors: Takanori Nishimura, Kanagawa (JP); Keigo Ihara, Chiba (JP); Takao Yoshimine, Kanagawa (JP); Junko Fukuda, Kanagawa (JP); Takahiko Sueyoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 723 days.

(21) Appl. No.: 09/930,135

(22) Filed: Aug. 16, 2001

(65) Prior Publication Data

US 2002/0026512 A1 Feb. 28, 2002

(30) Foreign Application Priority Data

Aug. 31, 2000 (JP) ............................. 2000-264580

(51) Int. Cl.
*G06F 15/16* (2006.01)
(52) U.S. Cl. ................... 709/231; 709/228; 709/229
(58) Field of Classification Search ................ 709/229, 709/231; 705/5; 379/88.12; 725/86
See application file for complete search history.

(56) References Cited

U.S. PATENT DOCUMENTS 5,760,917 A * 6/1998 Sheridan ..................... 358/442
5,953,706 A * 9/1999 Patel ............................. 705/6
5,978,770 A * 11/1999 Waytena et al. ................ 705/5

(Continued)

FOREIGN PATENT DOCUMENTS

EP 111123 A1 * 6/1984

(Continued)

OTHER PUBLICATIONS

Carl Fenger, et al., "The Fantastic Broadband Multimedia System", Software Platform Description, XP-002258083, May 31, 2000, pp. 1-23.

(Continued)

*Primary Examiner*—Andrew Caldwell
*Assistant Examiner*—Michael D. Meucci
(74) *Attorney, Agent, or Firm*—Oblon, Spivak, McClelland, Maier & Neustadt, P.C.

(57) ABSTRACT

In a content live distribution, to notify people who are wanted to see the content that the contents live distribution will be performed, without the need for the content provider to carry out any troublesome operations. In a content supply system, a provider uses a streaming server to perform live distribution and makes a reservation for the use of a time zone, etc. to a server reservation control center with a user PC. In the case where the user PC sends desired reservation information including e-mail addresses of people who are wanted to see the content, to the server reservation control center over the Internet, when the reservation is permitted, the server reservation control center sends an e-mail notifying that a content distribution will be performed to each e-mail address.

19 Claims, 43 Drawing Sheets

U.S. PATENT DOCUMENTS

| | | | |
|---|---|---|---|
| 5,996,014 A * | 11/1999 | Uchihori et al. | 709/226 |
| 6,041,359 A * | 3/2000 | Birdwell | 709/238 |
| 6,195,117 B1 * | 2/2001 | Miyazaki | 348/14.09 |
| 6,496,568 B1 * | 12/2002 | Nelson | 379/88.12 |
| 6,510,556 B1 * | 1/2003 | Kusaba et al. | 725/93 |
| 6,516,350 B1 * | 2/2003 | Lumelsky et al. | 709/226 |
| 6,564,380 B1 * | 5/2003 | Murphy | 725/86 |
| 6,704,797 B1 * | 3/2004 | Fields et al. | 709/246 |
| 6,728,753 B1 * | 4/2004 | Parasnis et al. | 709/203 |
| 6,751,401 B1 * | 6/2004 | Arai et al. | 386/83 |
| 6,760,916 B2 * | 7/2004 | Holtz et al. | 725/34 |
| 6,792,615 B1 * | 9/2004 | Rowe et al. | 725/37 |
| 7,010,601 B2 * | 3/2006 | Yoshimine et al. | 709/226 |
| 7,069,228 B1 * | 6/2006 | Rose et al. | 705/5 |
| 7,143,177 B1 * | 11/2006 | Johnson et al. | 709/231 |
| 2002/0029384 A1 * | 3/2002 | Griggs | 725/46 |
| 2006/0259607 A1 * | 11/2006 | O'Neal et al. | 709/223 |

FOREIGN PATENT DOCUMENTS

| | | |
|---|---|---|
| EP | 0 836 140 | 4/1998 |
| JP | 2001309263 A * | 11/2001 |
| JP | 2002077868 A * | 3/2002 |

OTHER PUBLICATIONS

Naehyuck Chang, et al., "Dual-Mode Low-Power Bus Encoding for High-Performance Bus Drivers", IEEE TENCON, XP-010368431, Sep. 15, 1999, pp. 876-879.

* cited by examiner

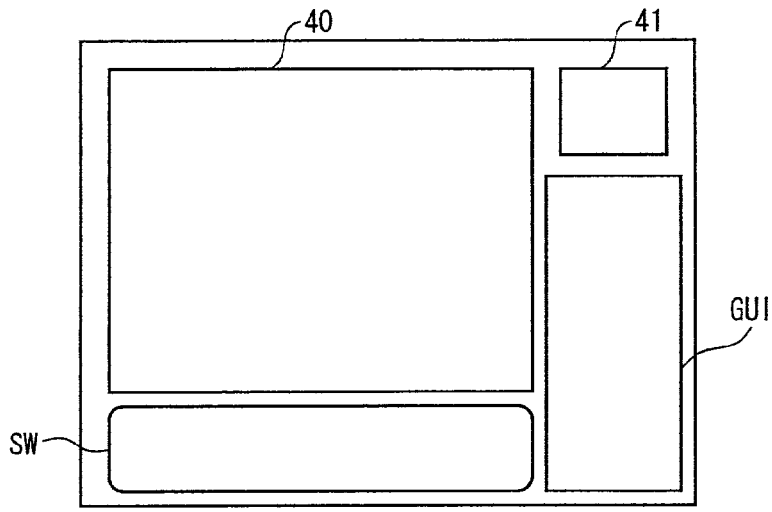
FIG. 5A
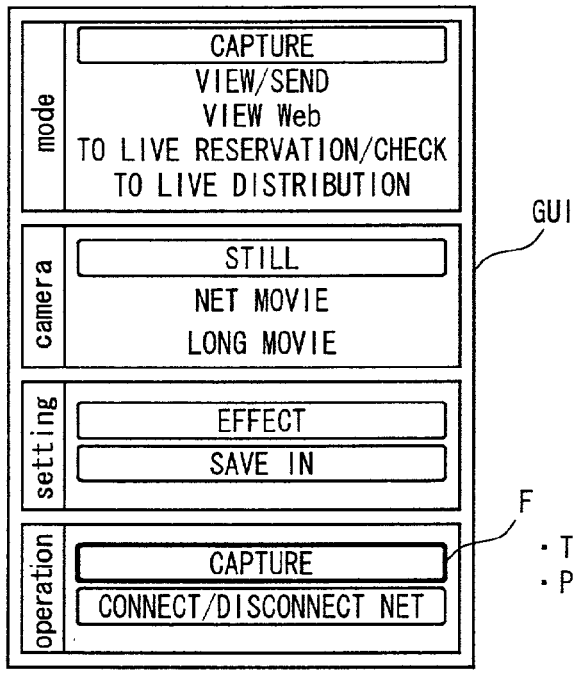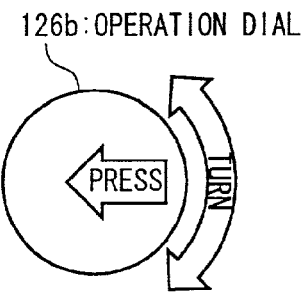
- TURNING OPERATION = MOVE FOCUS
- PRESSING OPERATION = SELECT/DECIDE ITEM
FIG. 5B

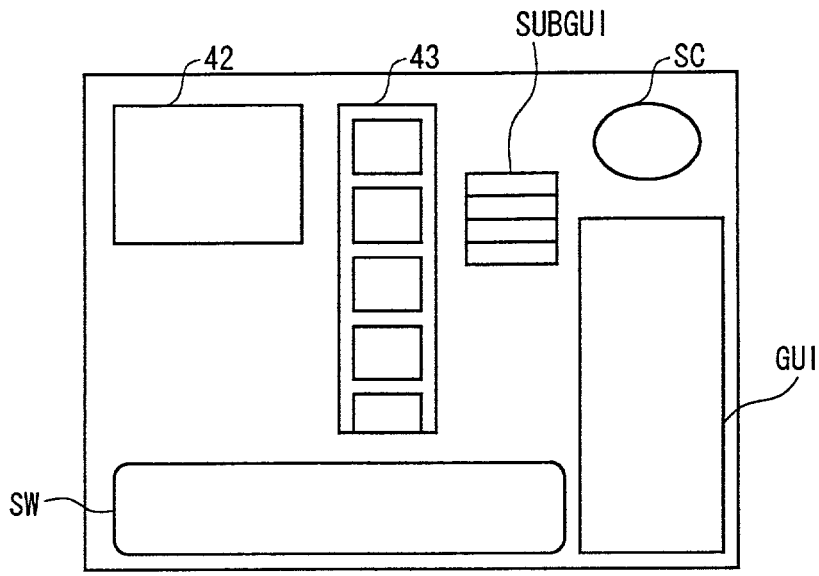
FIG. 6A
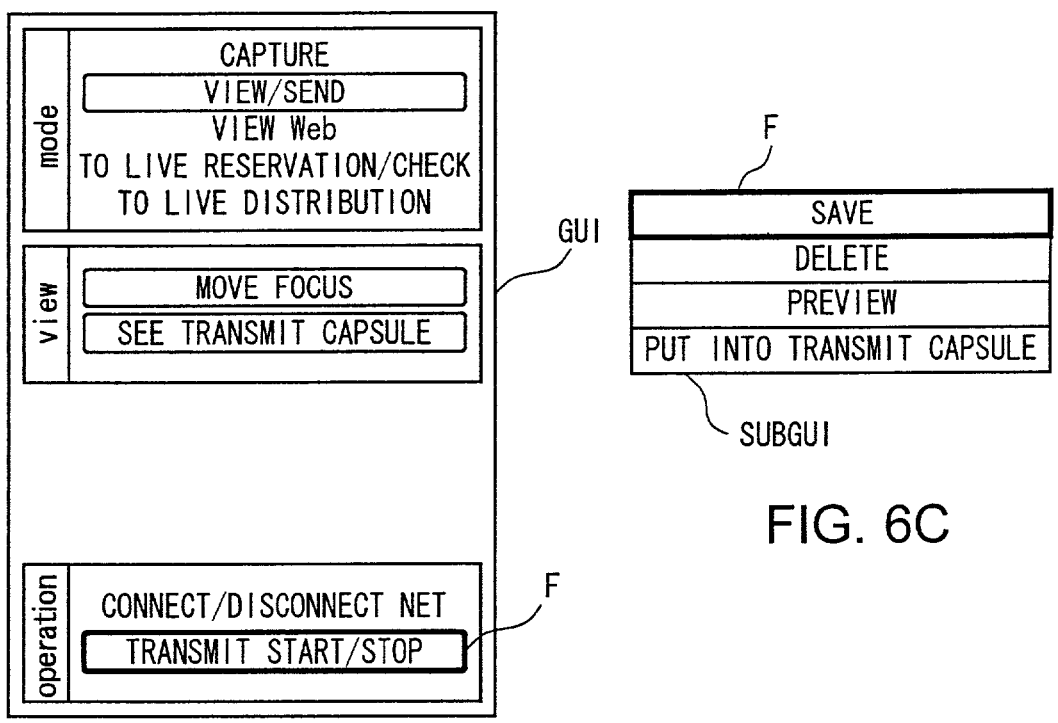
FIG. 6B
FIG. 6C

WELCOME TO PERSONAL CASTING WORLD

·LOG IN
  USER ID:
  PASSWORD:

·MEMBER REGISTRATION
·WHAT IS PERSONAL CASTING TV?
·TODAY'S LIVE
·PROGRAM GUIDE
·PROGRAM GUIDE
·MY CHANNEL
·LIVE DISTRIBUTION RESERVATIONV
·PROGRAM PICKUP
·IMAGE STATION

FIG. 13

REGISTER YOURSELF AS A MEMBER
    USING THE PERSONAL CASTING SERVICE REQUIRES YOU
    TO BE REGISTERED AS A USER...

CLICK HERE TO REGISTER YOURSELF AS
    A MEMBER >>> LINK TO REGISTRATION PAGE >>>

LIVE DISTRIBUTION ALLOWS YOU TO DO THINGS LIKE
    EXAMPLE OF USE

TO CARRY OUT LIVE DISTRIBUTION
    CARRYING OUT LIVE DISTRIBUTION REQUIRES A CREDIT CARD.

TO VIEW LIVE
    VIEWING LIVE REQUIRES REPLAY SOFTWARE.
    IF YOU HAVE NONE, PRESS THE FOLLOWING
    REPLAY SOFTWARE BUTTON AND DOWNLOAD IT.

LIVE DISTRIBUTION PROVIDERS MAY PUT RESTRICTIONS
    ON PEOPLE WHO CAN VIEW LIVES BY OBLIGING THEM
    TO ENTER PASSWORDS. THESE ARE LIVES THAT THOSE
    PROVIDERS DISTRIBUTE ONLY FOR SPECIFIC PEOPLE AND
    OTHER PEOPLE CANNOT VIEW.

PROCEDURE UP TO LIVE DISTRIBUTION
    PREMIUM MEMBER REGISTRATION
    LIVE PLANNING AND PREPARATION
    DISTRIBUTION RESERVATION
    RESERVATION CHECK
    CONNECTION
    DISTRIBUTION START

FIG. 14

```
·CURRENT TIME   15:05  (FOR SERVICE SUPPLY)

·SPECIAL PROGRAM
    ·GENRE
    ·TIME         LIVE TITLE  PROVIDER   OUTLINE   MODE
    ·ON-DEMAND    MOVIE TITLE  PROVIDER  OUTLINE
                  OPEN OR CLOSE

·PRIVATE PROGRAM
    ·GENRE
    ·TIME  LIVE TITLE   PROVIDER  OUTLINE  CAPACITY  CLOSE
```

FIG. 15

CURRENT TIME 15:08 (FOR SERVICE SUPPLY)

GENRE: ROCK MUSIC
LIVE TITLE: ○○○○
PROVIDER (MAIL ADDRESS): △△△@XX.COM
HOMEPAGE: HTTP://WWW.△O△XXX.COM
CAPACITY: 50 PEOPLE
CLOSE OR OPEN

OUTLINE
 . . . . . . . . . .
 . . . . . . . . . .
DETAILS
 . . . . . . . . . .
 . . . . . . . . . .

ENTER PASSWORD:

[REPLAY] ⌒175

NOTE: REPLAYING THE MUSIC REQUIRES REPLAY SOFTWARE.

[REPLAY SOFTWARE] ⌒176
CLICK TO DOWNLOAD

FIG. 16

```
                    ┌─────────────────────┐
                    │ JULY  ▽ │ 2000  ⇅ │
                    │ S  M  T  W  T  F  S │
                    │                   1 │
                    │ 2  3  4  5  6  7  8 │
PROGRAM IN THIS WEEK│ 9 10 11 12 13 14 15 │
                    │16 17 18 19 20 21 22 │
                    │23 24 25 26 27 28 29 │
                    │30 31                │
                    └─────────────────────┘
```

·SPECIAL PROGRAM
 JULY 5, 2000
    TIME  GENRE  LIVE TITLE   PROVIDER  OUTLINE  OPEN

TIME  GENRE  MOVIE TITLE  PROVIDER  OUTLINE  OPEN

·LIVE CHANNEL
 JULY 5, 2000
    GENRE TIME   LIVE TITLE   PROVIDER  OUTLINE  CAPACITY  PRIVATE

FIG. 17

| THE CONTENTS OF RESERVATION | USER ID | BILLING FLAG INFORMATION | RESERVATION ID |
|---|---|---|---|
| ·DATE/TIME<br>·2ch<br>·64kbps<br>... | ○○○○ | ENABLED | ××××× |
| ·DATE/TIME<br>·4ch<br>·28.8kbps<br>... | ×△○○ | DISABLED | △△△△ |
|  |  |  |  |

FIG. 18

MEMBER REGISTRATION INPUT SCREEN 210

| INPUT ITEM | INPUT COLUMN |
|---|---|
| NAME (KANJI) | △○ 太郎 |
| (ALPHABET) | ○○ TAROU |
| DESIRED USER ID | ○○○○ |
| PASSWORD | × × × × |
| E-MAIL ADDRESS | △△△@○○.COM |
| OPEN MAIL ADDRESS? | YES |

IF YOU WANT TO REGISTER AS A PREMIUM MEMBER, CHECK THE CHECKBOX AND ENTER THE FOLLOWING ITEMS.

PREMIUM MEMBER REGISTRATION ☑  211

| INPUT ITEM | INPUT COLUMN |
|---|---|
| ADDRESS | ○○CITY○○3-5-5 |
| TELEPHONE NUMBER | 03-1234-5670 |
| CREDIT CARD NUMBER | 1234-5678-9102 |
| CREDIT CARD EXPIRATION DATE | MAY 2003 |
| CELLULAR PHONE NUMBER | 090-1000-2000 |
| FACSIMILE NUMBER | 03-1234-5671 |

CANCEL  212          ENTER  213

FIG. 20

|  | JULY ▽ | 2000 ▲▼ |
|---|---|---|

| S | M | T | W | T | F | S |
|---|---|---|---|---|---|---|
|  |  |  |  |  |  | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 |  |  |  |  |  |

~220

| ch NO. | CAPA-CITY | TRANSMIT BAND | SERVICE FEE | 6:00 — 12:00 — 18:00 — 24:00 |
|---|---|---|---|---|
| 1 | 5 | 28.8 | ¥1000 | RESERVED \| FREE \| RESERVED \| FREE \|RE |
| 2 | 10 | 28.8 | ¥2000 | FREE \| RESERVED |
| 3 | 15 | 64 | ¥3000 | FREE\| RESERVED \|FRE\|RESERV |
| 4 | 50 | 64 | ¥10000 | FREE \|RE\| FREE \|RESERV |
| 5 | 100 | 64 | ¥15000 | RESERVED \| FREE |
| 6 | 150 | 64 | ¥20000 | FREE \|RESERV\|FREE\| RESERVED |
| 7 | 100 | 64 | ¥50000 | FREE \| RESERVED \| FREE |

221

222 {
- CHANNEL: CHANNEL 1 (CAPACITY: 5)
- RESERVATION DATE/TIME: JULY 5, 15:00 - 17:00
- OPEN LEVEL: PUBLIC    PASSWORD (    )   SECRET (    )
- TITLE: XXXX LIVE
- GENRE: MUSIC
- OPEN OF E-MAIL: YES, NO
- OPEN OF WEB: YES (URL:       ), NO
- PASSWORD: PASSWORD
- FRIEND LIST
   EMAIL ADDRESS (    ) (    ) (    )
- OUTLINE: 20 CHARACTERS
- DETAIL: 200 CHARACTERS

[RESERVE] 223    [CANCEL] 224

FIG. 22

```
·USER ID: ○○○○
·CHANNEL: CHANNEL 8 (CAPACITY: 5)
·RESERVATION DATE/TIME:  JULY 5, 15:00 - 17:00
·OPEN LEVEL:  PUBLIC    PASSWORD (XXXXX)   SECRET (XXXXX)
·TITLE:  XXXX LIVE
·GENRE:  MUSIC
·E-MAIL DISCLOSURE:  YES, NO
·WEB DISCLOSURE:  YES (URL:              ), NO
·PASSWORD:  ** PASSWORD **
·FRIEND LIST
   EMAIL ADDRESS  (○○@XX.COM) (△△@XX.CO.JP) (XX@○○.COM)
·OUTLINE:  UP TO 20 CHARACTERS
·DETAIL:   UP TO 200 CHARACTERS

SERVICE FEE:  ¥XXXXX
IN ADDITION TO THIS SERVICE FEE, THE CARRIER WILL CHARGE YOU
FOR THE TELEPHONE SERVICE TO THE ACCESS PORT SEPARATELY.

△△△@XX○○○.COM
MAKE SURE THE MAIL ADDRESS ABOVE IS CORRECT.
YOUR RESERVATION ID WILL BE SENT TO THE MAIL ADDRESS ABOVE.
ONCE YOU ACQUIRE THE RESERVATION ID, RECONFIRM THE RESERVATION
WITH "MY CHANNEL" BY 6 HOURS BEFORE THE PROGRAM STARTS.
THE RESERVATION WITHOUT RECONFIRMATION WILL BE CANCELED.
```

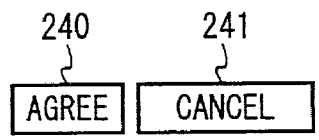

FIG. 23

THANK YOU FOR THE RESERVATION.

CHECK THE MAIL AND RECONFIRM THE RESERVATION ON THE "MY CHANNEL" PAGE USING THE CORRESPONDING PC.

245

| O K |

FIG. 24

- USER ID: ○○○○
- CHANNEL: CHANNEL 1 (CAPACITY: 5)
- RESERVATION DATE/TIME: JULY 5, 15:00 - 17:00
- OPEN LEVEL: PUBLIC   PASSWORD (XXXXX)   SECRET (XXXXX)
- TITLE: XXXX LIVE
- GENRE: MUSIC
- OPEN OF E-MAIL: YES, NO
- OPEN OF WEB: YES (URL:            ), NO
- PASSWORD:  PASSWORD 
- FRIEND LIST
    EMAIL ADDRESS (OO@XX.COM) (△△@XX.CO.JP) (XX@OO.COM)
- OUTLINE: UP TO 20 CHARACTERS
- DETAIL: UP TO 200 CHARACTERS

RESERVATION ID:

INPUT THE RESERVATION ID INCLUDED IN THE MAIL.
TO CHANGE THE DATE/TIME OR CHANNEL, CANCEL THIS RESERVATION AND MAKE A NEW RESERVATION.

PRESSING THE RECONFIRM BUTTON WILL AUTOMATICALLY REGISTER THE PC CONNECTION SETTING. BE SURE TO RECONFIRM THE RESERVATION WITH THE CORRESPONDING PC.

261 — RECONFIRM
262 — RETURN

FIG. 27

```
USER ID:○○○○
LIVE DISTRIBUTION RESERVATION DATE/TIME: 2000:07:05:15:00:00-
2000:07:05:17:00:00
SERVER ACCESSIBLE TIME:  2000:07:05:14:55:00-2000:07:05:17:05:00

ACCESS TELEPHONE NUMBER
    CARRIER 01:03-1234-5670
    CARRIER 02:03-1234-5671
    CARRIER 03:03-1234-5672
    CARRIER 04:03-1234-5673
ACCESS SERVER INFORMATION
    TYPE OF SERVER:  REALSERVER5
    SERVER NAME:  LIVESERVER.COM
    CONNECTION PORT: 555
    STREAM PATH TO SERVER: /CHANNELL/STREAM.RM
ADDRESS INFORMATION FOR DISTRIBATION REQUEST:
rtsp//liveserver.com:554/channell/stream.rm
TRANSMISSION BAND:  28.8KBPS
TITLE:  XXXX LIVE
OUTLINE:··········
OPEN LEVEL:·········
FRIEND LIST ADDRESS INFORMATION
    LIST 01: ○○@XX.COM
    LIST 02: △△@XX.CO.JP
    LIST 03:XX@○○.COM
PASSWORD FOR DISTRIBUTION REQUEST:  XXXX
```

FIG. 28

16:16 (FOR SERVICE SUPPLY)
16:09 (YOUR PC)

THE RESERVATION HAS BEEN ACCEPTED.
AS SHOWN ABOVE, THERE IS A TIME DIFFERENCE BETWEEN THE SERVICE SUPPLY TIME AND YOUR PC TIME.
NOTE THAT THE RESERVED DISTRIBUTION WILL BE PERFORMED AT THE SERVICE SUPPLY TIME.
YOU CAN ACCESS THE SITE FROM 5 MINUTES BEFORE THE RESERVED TIME.

IF YOU USE A DIALUP ROUTER, REGISTER THE FOLLOWING AS THE DIAL ADDRESS. IN THIS CASE, ONLY CONNECTION VIA ISDN IS AVAILABLE.

ISDN ACCESS PORT NUMBER: 03-1234-5679
LOG IN ID: RESERVATION ID
PASSWORD: XXXXXXX

291

| O K |

FIG. 29

- USER ID: ○○○○
- CHANNEL: CHANNEL 1 (CAPACITY: 5)
- RESERVATION DATE/TIME: JULY 5, 15:00 - 17:00
- OPEN LEVEL: PUBLIC    PASSWORD (XXXXX)    SECRET (XXXXX)
- TITLE: XXXX LIVE
- GENRE: MUSIC
- OPEN OF E-MAIL: YES, NO
- OPEN OF WEB: YES (URL:            ), NO
- PASSWORD:  PASSWORD 
- FRIEND LIST
    EMAIL ADDRESS (○○@XX.COM) (△△@XX.CO.JP) (XX@○○.COM)
- OUTLINE: UP TO 20 CHARACTERS
- DETAIL: UP TO 200 CHARACTERS

RESERVATION ID:

INPUT THE RESERVATION ID INCLUDED IN THE MAIL.
TO CHANGE THE DATE/TIME OR CHANNEL, CANCEL THIS RESERVATION
AND MAKE A NEW RESERVATION.

321  322
[UPDATE] [RETURN]

FIG. 32

17:08 (FOR SERVICE SUPPLY)
17:11 (YOUR PC)

THE CHANGE HAS BEEN ACCEPTED.
AS SHOWN ABOVE, THERE IS A TIME DIFFERENCE BETWEEN THE SERVICE SUPPLY TIME AND YOUR PC TIME.
NOTE THAT THE RESERVED DISTRIBUTION WILL BE PERFORMED AT THE SERVICE SUPPLY TIME.
YOU CAN ACCESS THE SITE FROM 5 MINUTES BEFORE THE RESERVED TIME.

IF YOU USE A DIALUP ROUTER, REGISTER THE FOLLOWING AS THE DIAL ADDRESS. IN THIS CASE, ONLY CONNECTION VIA ISDN IS AVAILABLE.

ISDN ACCESS PORT NUMBER:
LOG IN ID: RESERVATION ID
PASSWORD: XXXXXXX

331

| OK |

FIG. 33

- USER ID: ○○○○
- CHANNEL: CHANNEL 1 (CAPACITY: 5)
- RESERVATION DATE/TIME: JULY 5, 15:00 - 17:00
- OPEN LEVEL: PUBLIC    PASSWORD (XXXXX)   SECRET (XXXXX)
- TITLE: XXXX LIVE
- GENRE: MUSIC
- OPEN OF E-MAIL: YES, NO
- OPEN OF WEB: YES (URL:            ), NO
- PASSWORD:  PASSWORD 
- FRIEND LIST
    EMAIL ADDRESS (OO@XX.COM) (△△@XX.CO.JP) (XX@OO.COM)
- OUTLINE: UP TO 20 CHARACTERS
- DETAIL: UP TO 200 CHARACTERS

THIS RESERVATION WILL BE CANCELED.

THE RESERVATION HAS BEEN CANCELED.

```
·USER ID:○○○○
·CHANNEL:   CHANNEL 1 (CAPACITY: 5)
·RESERVATION DATE/TIME:   JULY 5, 15:00 - 17:00
·OPEN LEVEL:  PUBLIC    PASSWORD (XXXXX)   SECRET (XXXXX)
·TITLE:   XXXX LIVE
·GENRE:  MUSIC
·OPEN OF E-MAIL:  YES, NO
·OPNE OF DISCLOSURE:  YES (URL:              ), NO
·PASSWORD:  ** PASSWORD **
·FRIEND LIST
   EMAIL ADDRESS (○○@XX.COM) (△△@XX.CO.JP) (XX@○○.COM)
·OUTLINE:  UP TO 20 CHARACTERS
·DETAIL:   UP TO 200 CHARACTERS

RESERVATION ID:

IF YOU USE A DIALUP ROUTER, REGISTER THE FOLLOWING AS THE DIAL
ADDRESS. IN THIS CASE, ONLY CONNECTION VIA ISDN IS AVAILABLE.

ISDN ACCESS PORT NUMBER:
LOG IN ID: RESERVATION ID
PASSWORD: XXXXXXX
```

361         362

| REENTER PC CONNECTION SETTING | RETURN |

FIG. 36

| | | JULY ▽ | 2000 ⇅ | | | | |
|---|---|---|---|---|---|---|---|
| | | S M T W T F S | | | | | |
| | |                   1 | | | | | |
| | | 2  3  4  5  6  7  8 | | | | | |
| | | 9 10 11 12 13 14 15 | | 220 | | | |
| | | 16 17 18 19 20 21 22 | | | | | |
| | | 23 24 25 26 27 28 29 | | | | | |
| | | 30 31 | | | | | |

221

| ch NO. | CAPA-CITY | TRANSMIT BAND | SERVICE FEE | 6:00 | 12:00 | 18:00 | 24:00 |
|---|---|---|---|---|---|---|---|
| 1 | 5 | 28.8 | ¥1000 | RESERVED | FREE | RESERVED | FREE \| RE |
| 2 | 10 | 28.8 | ¥2000 | FREE | | | RESERVED |
| 3 | 15 | 64 | ¥3000 | FREE | RESERVED | | FRE\|RESERV |
| 4 | 50 | 64 | ¥10000 | FREE | \|RE | FREE | RESERV |
| 5 | 100 | 64 | ¥15000 | RESERVED | | | FREE |
| 6 | 150 | 64 | ¥20000 | FREE | RESERV \| FREE | RESERVED | |
| 7 | 1000 | 64 | ¥50000 | FREE | RESERVED | | FREE |

222a ⎰
- CHANNEL: CHANNEL 1 (CAPACITY: 5)
- RESERVATION DATE/TIME: JULY 5, 15:00 - 17:00
- OPEN LEVEL: PUBLIC   PASSWORD (    )   SECRET (    )
- TITLE: XXXX LIVE
- GENRE: MUSIC
- OPEN OF E-MAIL: YES, NO
- OPEN OF WEB: YES (URL:      ), NO
- PASSWORD: PASSWORD
- FRIEND LIST
   EMAIL ADDRESS(   ) (   ) (   )
   TEL (   ) (   ) (   )
   FAX (   ) (   ) (   )
- OUTLINE: 20 CHARACTERS
- DETAIL: 200 CHARACTERS 223   224
[RESERVE] [CANCEL]

FIG. 43

CONTENT DISTRIBUTION NOTIFICATION METHOD, RESERVATION CONTROL APPARATUS AND PROGRAM STORAGE MEDIUM

BACKGROUND OF THE INVENTION

1. Field of the Invention

The present invention relates to a content distribution notification method for notifying a client that content can be seen by live distribution when the content is intended to be distributed by live distribution by a distribution server that distributes content by streaming to clients, a reservation control apparatus and a program storage medium storing programs to be executed by the reservation control apparatus.

2. Description of the Invention

In a computer network system, an individual generally opens a homepage to provide created content over the Internet.

When a user personally opens a homepage, the user acquires a homepage creation program with a personal computer (hereinafter referred to as "PC"), creates a homepage hyper-linked with a plurality of content based on the homepage creation program and stores the homepage in a server of an Internet service provider (hereinafter referred to as "ISP").

Then, the ISP provides the homepage to a client who has accessed it over the Internet from the server and when an anchor on the homepage is clicked, then the ISP provides linked content.

In recent years, contents to be supplied to clients over the Internet include many motion pictures and sounds in addition to still pictures. To provide content such as motion pictures, motion picture files and audio files created by the user are uploaded beforehand in a predetermined storage area in a streaming server of the ISP. Then, upon receiving a client's request, the streaming server of the ISP distributes corresponding files to the client by streaming over the Internet.

Furthermore, the technique of distributing content such as motion pictures to clients over the Internet includes a technique called "live distribution", in addition to "on-demand distribution" whereby a motion picture file is uploaded in a streaming server beforehand and distributed in response to a request from a client as described above. In the live distribution, motion picture data created by a content creator, for example, using a digital camera, is encoded in real time and is sent to the streaming server over the Internet, etc. Then, the streaming server reproduces the motion picture data supplied in real time from the content creator while recording it in a dedicated storage area, and can thereby supply the motion picture data in real time to the requesting client.

On the other hand, when the above-described live distribution is performed, a content creator needs to send motion picture data to the streaming server in real time, and therefore it is necessary to keep a communication path to transmit motion picture data between a streaming server and a personal computer (hereinafter referred to as "PC") of the content distributor when the live distribution is performed. This limits the number of content that can be distributed by the live distribution by the streaming server at the same time. In a rush hour, some content distributors who have prepared for the live distribution in the time zone may not perform the live distribution in that time zone. In order to prevent such a problem and to effectively use the streaming server to perform live distribution, it is considered that the streaming server should be reserved.

Reserving the streaming server to use realizes a service that may meet the content distributor's demand that live distribution be reliably available in a reserved time zone.

Furthermore, the content distributor may want to distribute content to specific people by the live distribution in a reserved time zone. For example, in the case of distributing content of image data, etc. of pictures taken of a wedding ceremony and wedding reception, etc. by the live distribution, it may be desired that live video, etc. of the wedding ceremony be presented to the couple's family members and friends, etc. who are absent from the ceremony.

In the case where it is desired that live video, etc. of the wedding ceremony be presented to those family members and friends, etc., the content distributor may notify that people of the distribution time and the connection method to receive distribution, that is, the method of accessing the streaming server, by telephone, etc. in advance, and the family members and friends, etc. can receive the content by accessing the streaming server at the distribution time, but such a notification procedure is bothering work.

SUMMARY OF THE INVENTION

In view of the foregoing, an object of this invention is to provide an improved content distribution notification method which allows a content distributor to inform people who are selected to see content, that the content can be seen by live distribution. Another object of the invention is to provide a corresponding reservation control apparatus and a program storage medium.

The foregoing object and other objects of the invention have been achieved by the provision of a content distribution notification method, a reservation control apparatus and a program storage medium. In order to distribute content by live distribution by means of a distribution server that distribute content by streaming over a network to a client terminal apparatus, when a distributor terminal apparatus makes a reservation for the use of the distribution server via the network to the reservation control apparatus that controls the reservation of the distribution server and the content is distributed by the live distribution by means of the distribution server based on the reservation, the following steps are carried out to inform client users of client terminal apparatuses that the content is distributed based on the reservation. At first, the distributor terminal apparatus sends reservation request information including the desired service time to use the distribution server and contact addresses of client users who should be informed of the content distribution, to the reservation control apparatus via a network. Then, when content is allowed to be distributed by means of the distribution server in the desired service time of use included in the reservation request information, the reservation control apparatus sends notification information about the content distribution to the contact addresses of the client users via the network.

In the case where content is distributed by live distribution by means of the streaming server, such reservation system allows a content distributor to distribute content reliably in a time zone reserved by the content distributor. In such a reservation system, when the content distributor sends reservation request information with the distributor terminal apparatus to the reservation control apparatus via a network to make a reservation, if the content distributor includes contact addresses of client users who should be informed of the content distribution, in the reservation request information, then information about the content distribution is sent to these contact addresses. As described above, since the content distributor can notify people who are wanted to see content that the content will be distributed, by making a reservation for content distribution, bothering work such as notifying specific people of the live distribution by telephone, etc. is not needed.

According to the present invention, when performing live-distribution of content, it is possible to notify people who are wanted to see the content that a live distribution of the content will be performed, without the need for the content provider to carry out troublesome operations.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 5A and 5B are drawings showing a display screen of the display section of the user PC in a capture mode;

FIGS. 6A to 6C are drawings showing a display screen of the display section of the user PC in an upload mode;

FIG. 13 is a drawing showing the top page of a Web page stored in a hard disk of a live casting server of the server reservation control apparatus;

FIGS. 14 to 17 are drawings showing the Web page stored in the hard disk of the live casting server;

FIG. 18 is a drawing showing the contents of the reservation database of the server reservation control apparatus;

FIG. 20 is a drawing showing a display screen of the display section of the user PC during the member registration;

FIG. 22 is a drawing showing a display screen shown on the display section of the user PC during the distribution reservation;

FIG. 23 is a drawing showing a display screen shown on the display section of the user PC during the distribution reservation;

FIG. 24 is a drawing showing a display screen shown on the display section of the user PC during the distribution reservation above;

FIG. 27 is a drawing showing a display screen shown on the display section of the user PC during the reconfirmation processing;

FIG. 28 is a drawing showing a reservation setting information file created by the live casting server and sent to the user PC during the reconfirmation processing;

FIG. 29 is a drawing showing a display screen shown on the display section of the user PC during the reconfirmation processing;

FIGS. 31 to 33 are drawings showing a display screen shown on the display section of the user PC when a reservation is changed;

FIGS. 34 and 35 are drawings showing a display screen shown on the display section above of the user PC above when a reservation is canceled;

FIG. 36 is a drawing showing a display screen shown on the display section of the user PC when a reservation is confirmed;

FIG. 43 is a drawing showing a modification of the display screen shown on the display section of the user PC when the distribution reservation shown in FIG. 22 is made.

DETAILED DESCRIPTION OF THE EMBODIMENT

Preferred embodiments of this invention will be described with reference to the accompanying drawings:

A. Configuration of Content Supply System

A-1. Configuration Outline of Entire System

Figure 1:
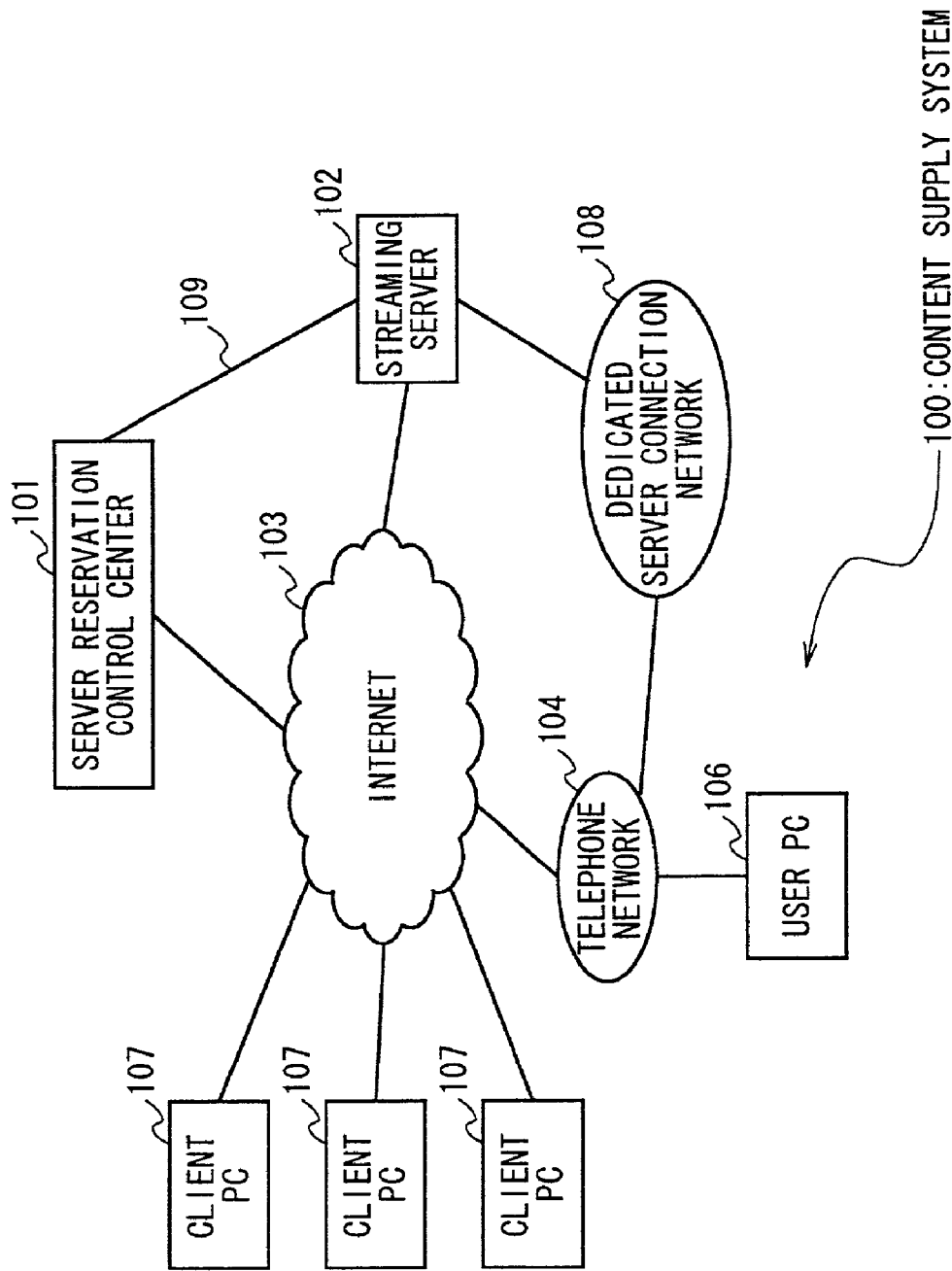
FIG. 1 is a block diagram showing an outlined overall configuration of a content supply system to which a content distribution notification method according to an embodiment of the present invention is applied.

At first, FIG. 1 is a block diagram showing an overall configuration of a content supply system 100 that provides a personal casting service using a content distribution notification method according to an embodiment of the present invention.

As shown in FIG. 1, this content supply system 100 comprises a user PC (distributor terminal apparatus) 106 connected to the Internet 103 via an Internet service provider (not shown) and telephone network 104, a server reservation control center 101 connected to the Internet 103, a streaming server (processing server) 102 and a plurality (three in the figure) of client PCs 107 connected to the Internet 103 with a telephone line (not shown) or a dedicated line (not shown). The streaming server 102 is connected to a dedicated server connection network 108, and when data is sent from the user PC 106 to the streaming server 102 during a live distribution, which will be described later, the user PC 106 connects to an access port of the dedicated server connection network 108 based on point-to-point protocol (PPP) via the telephone network 104. This establishes a communication path between the user PC 106 and streaming server 102 and the content data can be sent using this communication path. A dedicated line 109 is also laid between the streaming server 102 and the server reservation control center 101 and data is transferred between them using the dedicated line 109 in authentication processing, etc. which will be described later.

In this content supply system 100, the user of the user PC 106 sends content data (e.g., video data, etc. obtained by shooting a music live) shot by a digital camera, etc. to the streaming server 102 in a reserved time zone (e.g., 15:00 to 16:00), while the streaming server 102 distributes the content data by streaming to the client PC 107 that has requested. In this way, the content supply system 100 can provide a personal casting service that implements personal broadcasting such that content data shot by the user of the user PC 106 using a digital camera, etc. is received and reproduced by the client PC 107 in real time.

Furthermore, this content supply system 100 adopts a reservation system whereby each user makes a reservation for using or accessing the streaming server 102 in order to implement a personal casting service that allows the user to reliably transmit personal broadcasting in a desired time zone. That is, the user requests the server reservation control center 101 over the Internet 103 for a reservation of a time zone during which the user wants to carry out personal broadcasting, that is, a time zone during which the user (PC) wants to access the streaming server 102 and use the stream distribution function of the streaming server 102. Then, when the reservation is permitted by the server reservation control center 101, the user PC 106 can access the streaming server 102 in the time zone based on this reservation and perform the live distribution.

The content supply system 100 is a system that provides the personal casting service utilizing the above-described reservation system, and the components of this content supply system 100 will be explained in detail below.

A-2. User PC

At first, the user PC 106 will be explained. In this embodiment, the user PC 106 is kind of a PC which is used to transmit content data by a user who has the right to become a broadcasting party who creates and transmits content data after completing a registration procedure, etc. which will be described later in a personal casting service by the content supply system 100.

Figure 2:
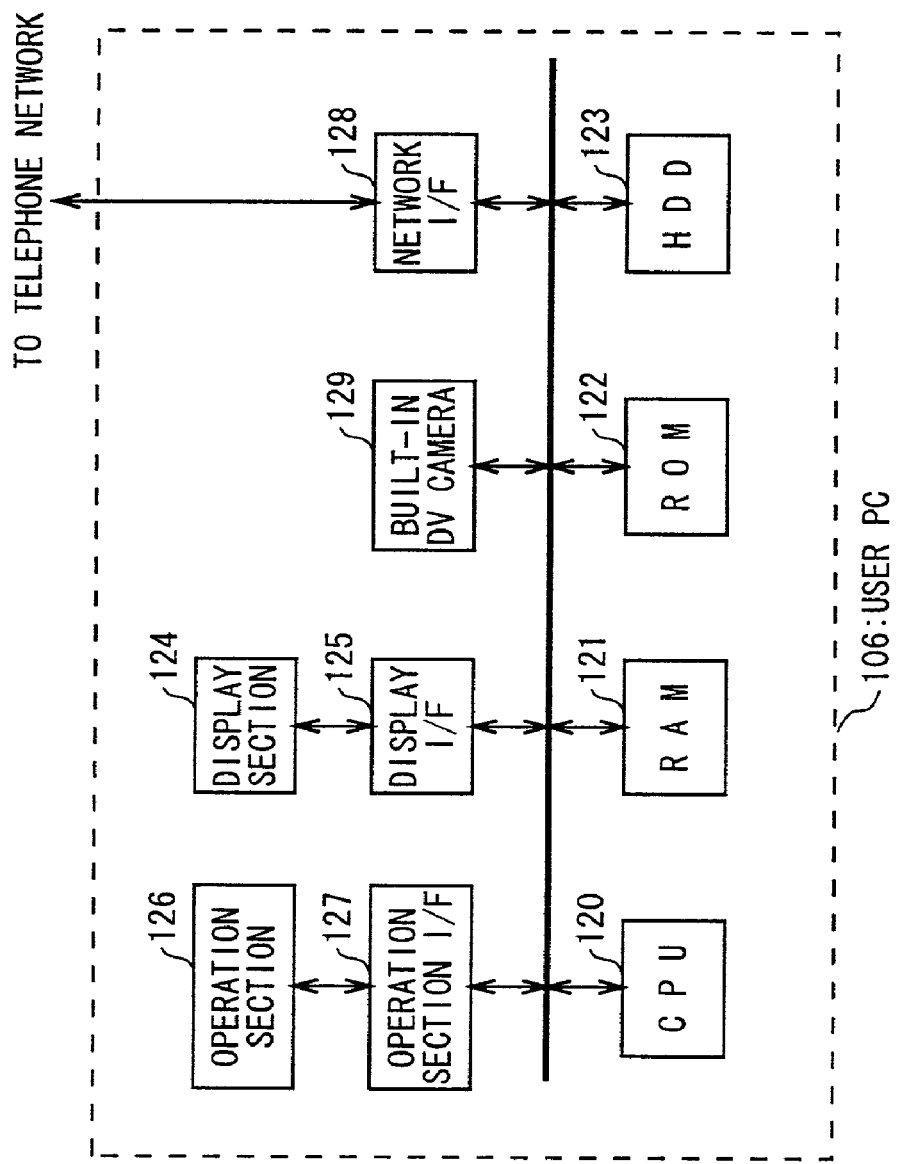
FIG. 2 is a block diagram showing a configuration of a user PC that utilizes a personal casting service in the content supply system.

As shown in FIG. 2, the user PC 106 comprises a central processing unit (CPU) 120 that performs various kinds of operation processing and controls each section, a random access memory (RAM) 121 used as a work memory of the CPU 120, a read only memory (ROM) 122 that stores a set of programs to be read and executed by the CPU 120, a hard disk 123 that stores a set of programs such as an operating system (e.g., "Windows 95/98/2000" (Microsoft Corporation)) and application programs, etc. to be read and executed by the CPU 120, a display section 124 such as a liquid crystal display that displays an image for the user, a display interface 125 to display an image based on data supplied from the CPU 120 on the display section 124, an operation section 126 such as a keyboard, mouse and rotatable dial and operation button which will be described later, used by the user to enter instructions, an operation section interface 127 that supplies data indicating instructions entered via the operation section 126 to the CPU 120, a network interface 128 that transmits/receives data to/from devices connected to the internet 103 (see FIG. 1) and the dedicated server connection network 108 (see FIG. 1) via a telephone network 104 (see FIG. 1), and a digital video camera 129 incorporated in the user PC 106. By the way, data in the hard disk 123 is read/written by the CPU 120 and the hard disk 123 also stores motion picture data and various kinds of control data.

Figure 3A:
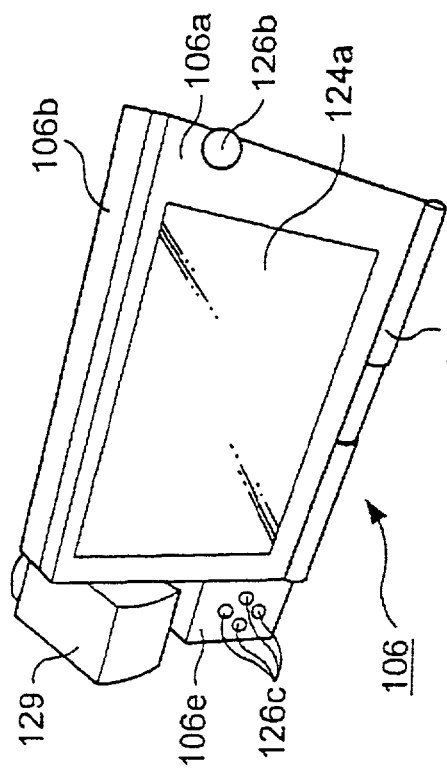
FIGS. 3A to 3D are perspective views showing configuration examples of appearance of the user PC above.

Here, FIGS. 3A to 3D illustrate configuration examples of appearance of the user PC 106 with the built-in digital video camera 129. As shown in FIG. 3A, the user PC 106 shown in this example comprises, as in the case of a general notebook personal computer, a display side case 106a provided with a liquid crystal screen 124a and a keyboard side case 106b provided with a keyboard 126a and both are connected in a relatively pivotable manner by a hinge 106c. Furthermore, the display side case 106a is also made relatively pivotable with respect to the keyboard side case 106b in the direction indicated by an arrow A in the figure. Furthermore, a rotatable operation dial 126b is provided on one side of the display side case 106a. This operation dial 126b can be not only rotated but also pressed.

On one end face of the keyboard side case 106b are attached a button case 106e with a plurality (four in the figure) of operation buttons 126c and the above-described digital video camera 129. The button case 106e is fixed to the keyboard side case 106b as illustrated. On the other hand, the digital video camera 129 is supported at one point on the lateral end face of the keyboard side case 106b in a pivotable manner, which allows the digital video camera 129 to rotate freely in the direction shown by an arrow B in the figure.

Figure 3B:
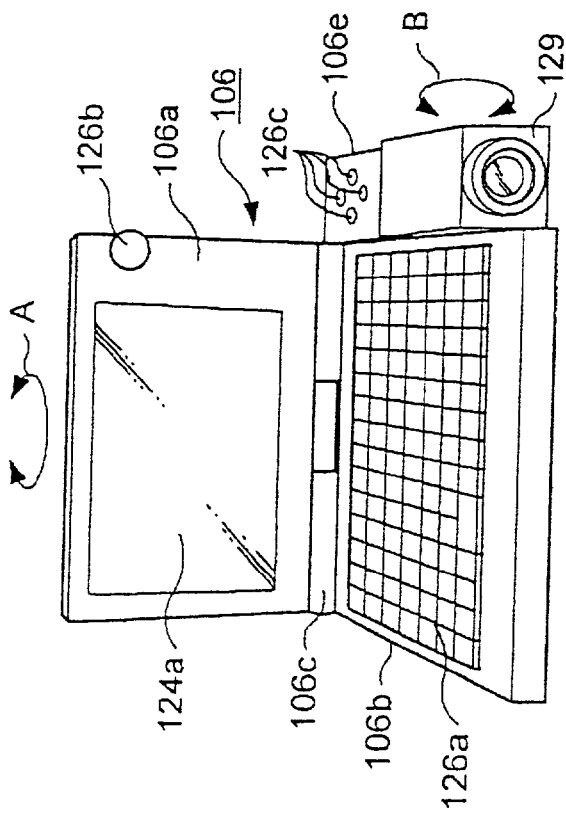
Figure 3C:
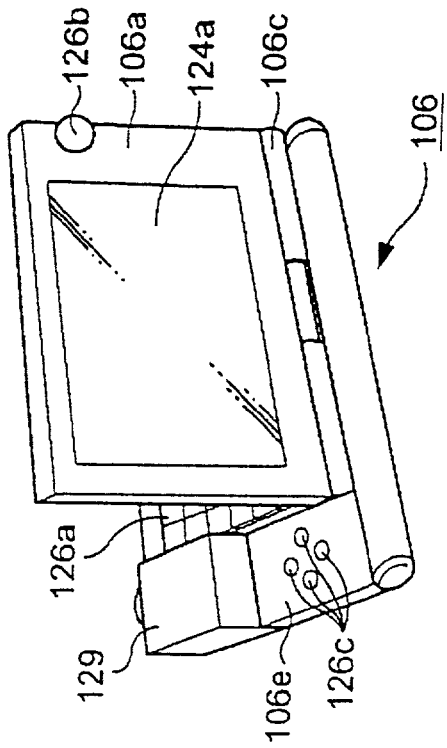
Figure 3D:
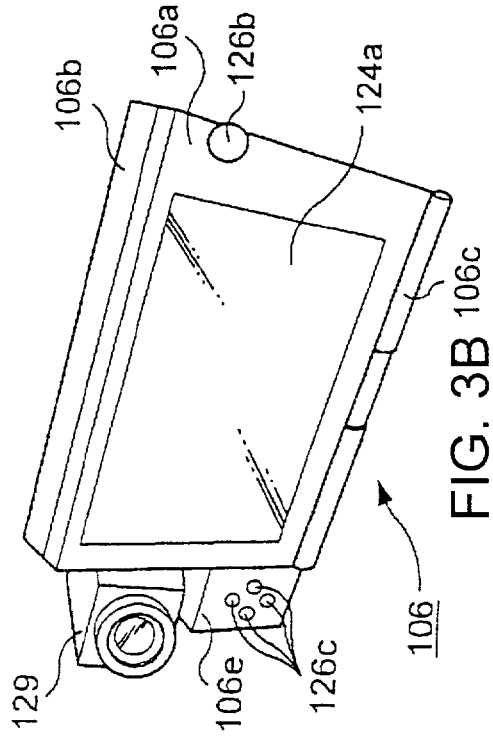

With such a structure, the user PC 106 can be used not only in the mode similar to a general notebook personal computer shown in FIG. 3A but also in modes shown in FIGS. 3B to 3D. For example, in the mode shown in FIG. 3B, the user can hold the user PC 106 to take pictures of the user himself/herself using the digital video camera 129. In this case, since a liquid crystal screen 124a faces to the user side as illustrated, the user can take pictures while checking the video. In this mode, the keyboard 126a is located on the side opposite to the user, and it is difficult for the user to operate the keyboard correctly. Taking into account this point, operations related to photographing and processing of video, etc. of the digital video camera 129 (e.g., operations to instruct start and stop of photographing, zooming, addition of effects, saving of motion picture data and transmission, etc.) in a processing according to an application program described later can be performed by operating the above-described operation dial 126b and operation buttons 126c. Furthermore, in the mode shown in FIG. 3C, the user can hold the user PC 106 to take pictures of a target in front while watching the LCD screen 124a.

Returning to FIG. 2, the user PC 106 is configured to perform various kinds of processing such as motion picture data distribution processing serviced from the above-described content supply system 100, creation/processing of motion picture data and world-wide web (WWW) browsing by the CPU 120 executing an application program stored in the ROM 122 and the hard disk 123 based on turning ON of a power supply (not shown) and instructions input by the user with the operation section 126. Hereinafter, focused on various functions realized by the CPU 120 executing the processing according to the application program, the functions of the user PC 106 will be explained with reference to the display screen, etc.

Figure 4:
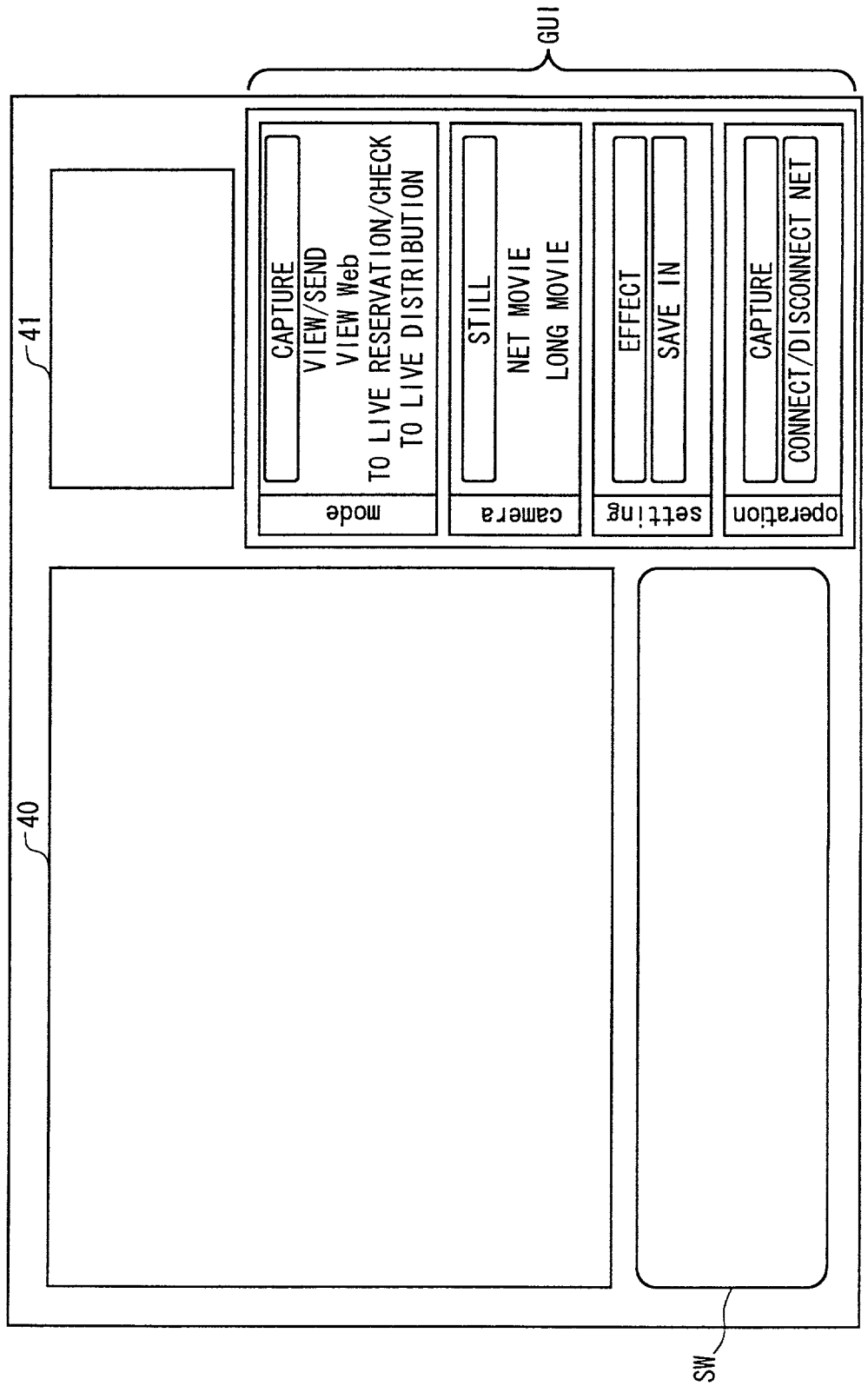
FIG. 4 is a drawing showing an initial screen when an application program of the user PC starts.

At first, when the user PC 106 executes the application program, an initial screen as shown in FIG. 4 appears on the display section 124 under the control of CPU 120. As shown in the same figure, this initial screen shows a large-size main screen display area 40 for displaying an image taken with the digital video camera 129, etc. and a small-size sub image display area 41 for displaying a preview of the last image taken when the application program was executed previously on the upper right side of the screen. Furthermore, a graphical user interface (GUI) to select a mode, type of image (camera), setting and the contents of an instruction (operation) is displayed under the sub image display area 41. By selecting and setting these items, the user can select a mode, select the type of image such as still picture (STILL) or motion picture (MOVIE), change the settings and enter instructions, etc.

In this application, the user can select an mode from five modes of a capture mode (a mode when "Capture" on the GUI is selected), an upload mode (a mode when "View/send" on the GUI is selected), a Web check mode (a mode when "View Web" on the GUI is selected), a live reservation mode (a mode when "To live reservation/check" on the GUI is selected) and a live distribution mode (mode when "To live distribution" on the GUI is selected). By the way, the capture mode is selected in the initial state of the time when the application program is started.

The capture mode is a mode in which pictures are taken with the digital video camera 129 incorporated in the user PC 106 and when this mode is selected or in the initial state, a screen as shown in FIG. 5A is displayed under the control of CPU 120. As shown in the same figure, the display screen in the capture mode shows the main image display area 40 and sub image display area 41 in the same way as in the above-described initial screen (see FIG. 4), and the main image display area 40 shows the picture currently being taken and the sub image display area 41 shows a preview of the last image taken before the current capture.

In this mode, too, the above-described GUI is shown under the sub image display area 41. As shown in FIG. 5B, the GUI in this mode shows selection items such as "mode", "camera", "setting" and "operation". The selection item "operation" in this mode includes an item ("capture") to instruct a capture of an image and an item to instruct connection/disconnection with the Internet ("net connect/disconnect), etc. and it is possible to select and decide a desired item by rotating the operation dial 126b, moving the focus F (shown with bold line) to the desired item and then pressing the operation dial 126b.

Furthermore, in this capture mode, if a command, etc. which is required for capture (e.g., command to instruct a selection of an effect to be given to an image) is assigned to the operation button 126c (see FIG. 3) provided on the button case 106e, the user can perform operations in the capture mode only through operations of the operation dial 126b and operation buttons 126c without using the keyboard 126a (see FIG. 3) making it possible to easily perform a capture operation in the mode when the keyboard 126a is in a position that makes it difficult to operate the keyboard as shown in FIG. 3B and FIG. 3C. By the way, the above-described command can be assigned to the operation buttons 126c as default, but in this capture mode and other modes which will be explained below, it is also possible to allow the user to freely select a command to be assigned to the operation buttons 126c for each mode. In this way, the user sets so that commands frequently used in each mode are assigned to the operation buttons 126c and can thereby reduce the necessity of operating the keyboard 126a and improve the operability in each mode.

The status window SW shown at the bottom of the screen in FIG. 5A shows the current condition of the user PC 106 (e.g., the battery level and the vacant storage space of the hard disk drive, etc.), processing condition in the selected mode (e.g., data size of the image being taken), a specified storage medium (hard disk and network, etc.) and information on the command assignment of the operation buttons 126c.

Then, the upload mode is a mode in which the image data taken in the above-described capture mode is displayed or referenced or the image data is selected and transmitted to a server (not shown) at a predetermined upload destination connected to the Internet 103 (see FIG. 1). When this mode is selected, a screen as shown in FIG. 6A is displayed on the display section 124 under the control of CPU 120. As shown in the same figure, the display screen in the upload mode shows a preview area 42, a list display area 43 that shows images taken in a tile form (lined vertically in the example in the figure), a GUI, a status window SW and a transmission capsule icon SC.

As shown in FIG. 6B, "operation" of the GUI in the upload mode includes an item to instruct connection/disconnection with the Internet ("connect/disconnect Net"), an item to instruct start/end of transmission of image data ("transmit start/stop"), an item to instruct movement of the focus F to the list display area 43 ("Move focus"), an item to instruct a view inside the transmission capsule icon SC, that is, a view of the list of image data selected to be sent ("see transmission capsule"), etc. and it is possible to select a desired item by rotating the operation dial 126b to move the focus F to a desired item and then pressing the operation dial 126b.

Furthermore, in the upload mode, the operation buttons 126c are assigned commands to instruct replay/stop of a motion picture in the preview area 42 and display of a still picture, etc. Furthermore, the status window SW in this mode shows the file name of image data, file size, format (joint photographic experts group (JPEG) and moving picture experts group (MPEG), etc.) and information indicating the transmission destination currently specified (the name of the server to be uploaded and its uniform resource locator (URL)).

Here, when an item instructing the move of the focus F to the list display area 43 ("Move focus") is selected, the focus F moves to the list display area 43. When the focus F moves to the list display area 43, the focus F sequentially moves from one listed image to another according to the rotation operation of the operation dial 126b. When the user wants to send some image data, the user rotates the operation dial 126b and moves the focus F onto the relevant image data. Then, pressing the operation dial 126b shows a SUBGUI to instruct processing on the image data as shown in FIG. 6A and the focus F moves onto an item of this SUBGUI. As shown in FIG. 6C, the SUBGUI includes instruction items such as "Save", "Delete", "Preview" and "Enter into transmission capsule". Here, when the user rotates the operation dial 126b to move the focus F onto "Enter into transmission capsule" which is desired processing and presses the operation dial 126b, the relevant image data is added to the list of image data to be sent. When the user selects image data to be sent and sends the image data in this way, the user returns the focus F onto an item of the GUI and selects "transmit start/stop". When "transmit start/stop" is selected, the processing of transmission of the image data selected by the CPU 120 of the user PC 106 is executed.

Figure 7A:
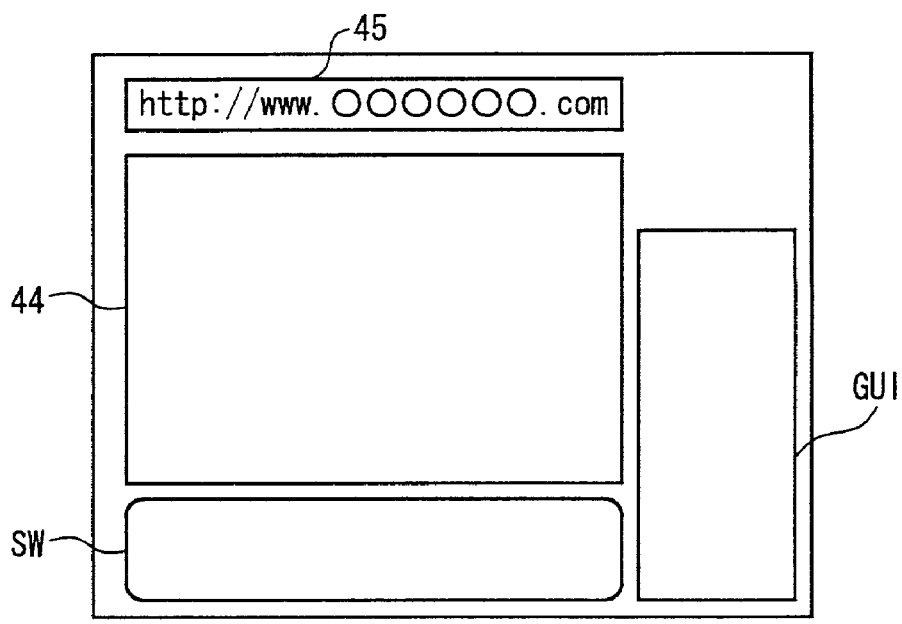
FIGS. 7A and 7B are drawings showing a display screen of the display section of the user PC in a Web check mode.

Next, the Web check mode is a mode for connecting to a network such as the Internet and carrying out browsing. When the Web check mode is selected, a screen as shown in FIG. 7A is displayed on the display section 124 under the control of CPU 120. As shown in the same figure, the Web check mode shows a browser display screen 44 that shows a Web browser, a URL display field 45 that shows URLs entered to display resources on the browser display screen 44, a GUI and a status window SW. Here, when the Web check mode is selected, the CPU 120 executes browser software stored in the hard disk 123 (e.g., Internet Explorer (Microsoft Corporation) and Netscape Navigator (registered trademark of Netscape Communications Inc.)) and the display screen is shown on the browser display screen 44 by the browser software.

Figure 7B:
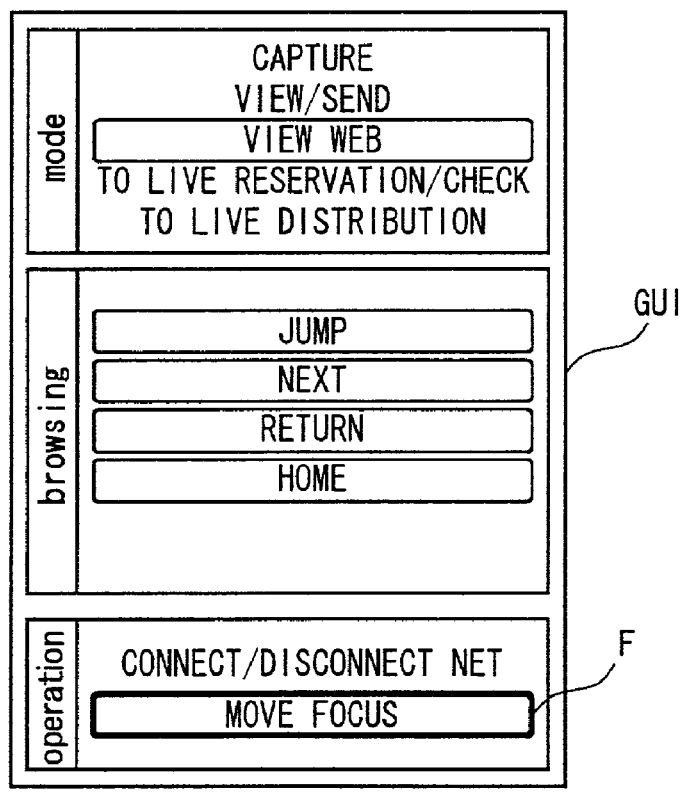

As shown in FIG. 7B, the GUI in the Web check mode shows "browsing" to select an instruction item in browsing and "browsing" shows an item to instruct a jump to a predetermined Web page ("Jump") and an item to operate the browser (e.g., "Next" or "Return", etc.). "Operation" in this mode includes an item to instruct connection/disconnection with the Internet ("Connect/disconnect Net"), an item to instruct movement of the focus F to the browser display screen 44 ("Move focus"), etc. and it is possible to select a desired item by rotating the operation dial 126b to move the focus F to a desired item and then pressing the operation dial 126b.

This "Web check" allows the user to perform general browsing processing such as entering a URL and performing browsing.

Figure 8A:
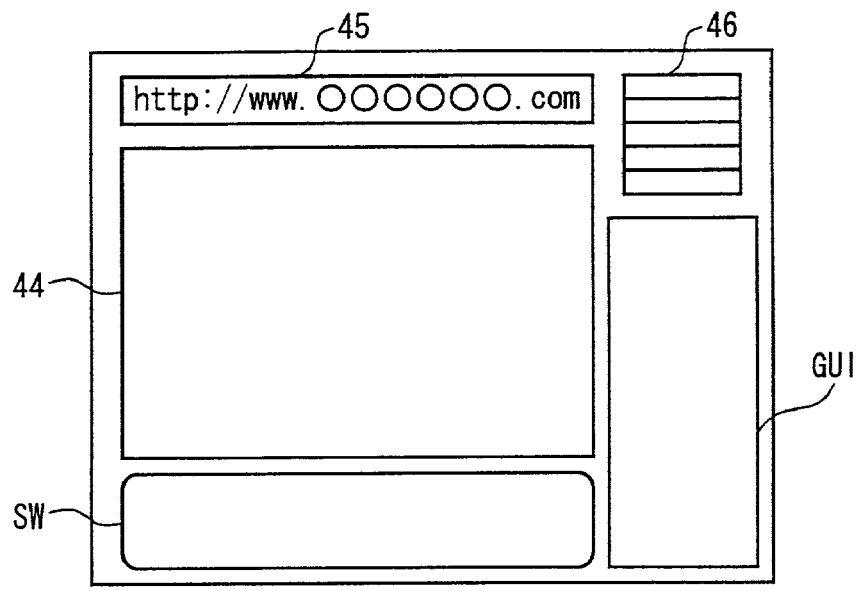
FIGS. 8A and 8B are drawings showing a display screen of the display section of the user PC in a live reservation mode.

Then, the live reservation mode is a mode to reserve a time zone, etc. to be connected to the server reservation control center 101 (see FIG. 1) over the Internet 103 and carry out personal broadcasting using the above personal casting service. When the live reservation mode is selected, a screen as shown in FIG. 8A is displayed on the display section 124 under the control of CPU 120. As shown in the same figure, the live reservation mode shows a reservation list display area 46 in addition to a browser display screen 44, a URL display field 45, a GUI and a status window SW in the same way as in the above Web check mode.

Figure 8B:
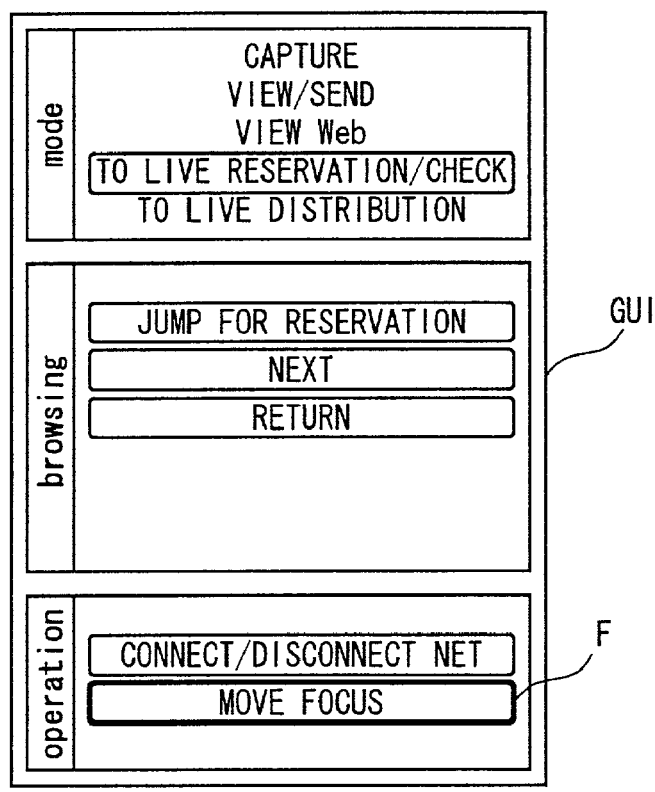

As shown in FIG. 8B, "operation" of the GUI in the live reservation mode includes an item to instruct connection/disconnection with the Internet ("connect/disconnect net") and item to instruct movement of the focus F to the browser display screen 44 ("Move focus"), etc. The GUI in this mode shows "browsing" as in the case of the above Web check mode and "browsing" shows an item to instruct a jump to a Web page to make a live reservation ("Jump for reservation") and an item to operate the browser (e.g., "Next" or "Return", etc.) etc. It is possible for the user to select a desired item by rotating the operation dial 126b to move the focus F to a desired item and then pressing the operation dial 126b. By the way, the Web page to make a live reservation is kind of a Web page that is stored by the live casting server, which will be described later, in the server reservation control center 101 in its hard disk.

When the user makes a reservation for live distribution using the personal casting service, the user selects and decides the item to instruct a jump to the Web page to make a reservation for distribution. Then, the CPU 120 accesses the live casting server over the Internet 103 to make a live reservation and can thereby exchange reservation-related information such as sending reservation request information to the relevant live casting server and downloading the reservation setting information from the live casting server.

The reservation list display area 46 shows a list of the contents of reservations made by the user to the above server reservation control center 101 and displays outlined information such as a reservation time zone, etc. for each reservation. When the user rotates the operation dial 126b to move the focus F onto the reservation list display area 46, presses the operation dial 126b and thereby selects the item on the reservation list display area 46 which shows the desired reservation outlined information, then the CPU 120 controls such as jumping to the Web page to check the reservation of the live casting server of the server reservation control center 101. Details about the reservation-related processing between the user PC 106 and server reservation control center 101 will be described later.

Then, the live distribution mode is a mode for connecting to the streaming server 102 (see FIG. 1) via the telephone network 104 and dedicated server connection network 108 and transmitting content data such as motion picture data, etc. taken with the digital video camera 129 to the streaming server 102 in real time and the content data sent in this mode is distributed by streaming by the streaming server 102 to the client PC 107 that sent a request. This allows the user to distribute personal broadcasting in real time.

Figure 9A:
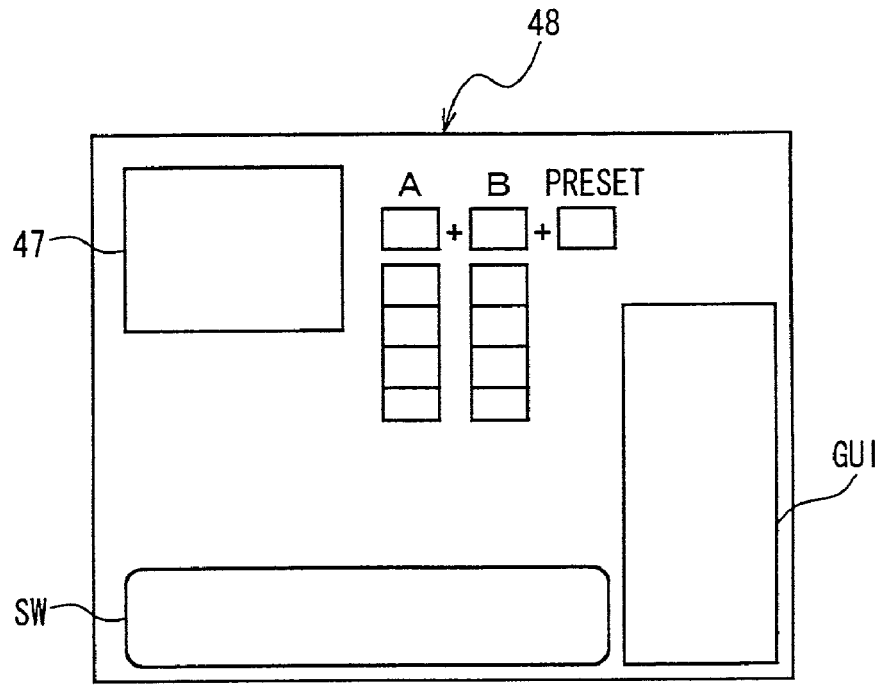
FIGS. 9A and 9B are drawings showing a display screen of the display section of the user PC in a live distribution mode.

When such a live distribution mode is selected, a screen as shown in FIG. 9A appears on the display section 124 under the control of CPU 120. As shown in the same figure, the live reservation mode shows an effect display field 48, a preview screen 47 that displays an image to be sent to the streaming server 102, that is, an image taken with the digital video camera 129 with predetermined effects, etc. applied, the GUI and status window SW.

The status window SW in the live distribution mode shows on-air information that indicates that distribution is in progress, distribution elapsed time information indicating the elapsed time after distribution is started, time information on the service provider side, time information on the user PC 106 side, reserved time zone information that indicates reservation start time and reservation end time, image size information, bit rate information indicating the distribution data transmission rate (bit rate), distributed image data title name information, connection destination information indicating the connected streaming server 102 and its channel and audience number information indicating the number of clients who receive content data stream-distributed by the streaming server 102, etc.

Figure 9B:
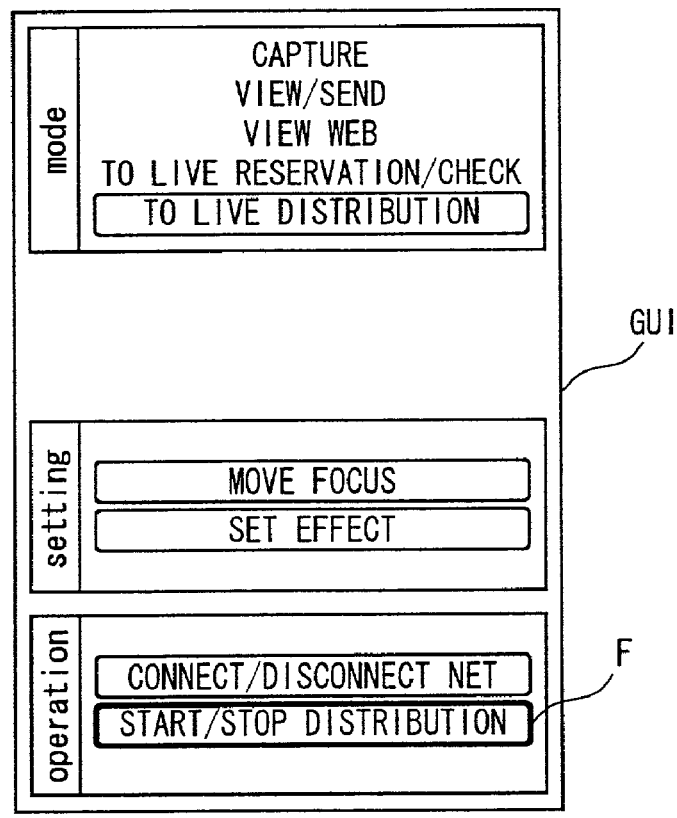

As shown in FIG. 9B, "operation" of the GUI in the live distribution mode includes an item to instruct connection/disconnection with the Internet ("Connect/disconnect Net"), an item to instruct the start/end of live distribution ("Start/finish distribution"), an effect setting item to set effects shown in the effect display field 48 ("Set effect"), an item to instruct the movement of the focus F to the effect display field 48 ("Move focus"), etc. and it is possible to select a desired item by rotating the operation dial 126b to move the focus F to a desired item and pressing the operation dial 126b.

Here, when the user selects and decides an item to instruct the start/end of live distribution, the CPU 120 connects to the streaming server 102 via the telephone network 104 and dedicated server connection network 108 according to the reservation setting information supplied from the live casting server in the above live reservation mode. Then, when the connection with the streaming server 102 is established, the CPU 120 sends motion picture data taken with the digital video camera 129 to the streaming server 102 in real time according to the contents (e.g., data transfer rate, etc.) set in the above reservation setting information. The processing of communication/connection with the streaming server 102 and motion picture data transmission processing, etc. after communication/connection will be described later in detail.

Figure 10:
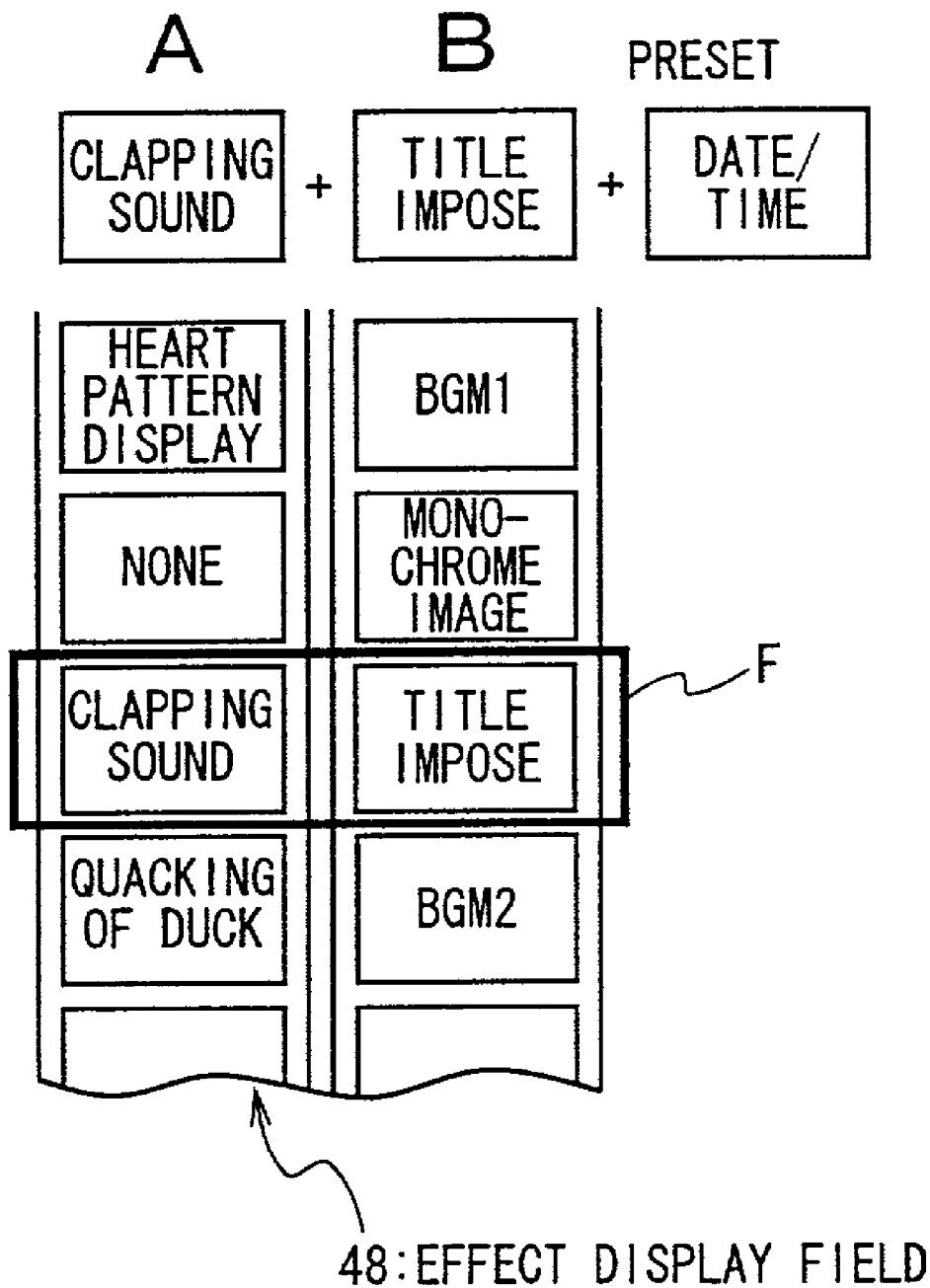
FIG. 10 is a drawing showing an effect display field in the live distribution mode.

As shown in FIG. 10, the effect display field 48 in the live distribution mode displays effect names in order in the vertical direction for each of button A and button B (marked "A" and "B" on the upper surface of the button, etc.) in the operation buttons 126c. The uppermost effect name is the currently selected effect name. In the example of the figure, button A shows selection candidates such as "Heart pattern display", "None", "clapping sound" . . . starting from the top. These are used to instruct assignment of an effect corresponding to the effect name enclosed by the focus F that relatively moves when the user rotates the operation dial 126b, that is, the currently selected effect name shown at the top and when the user presses the button A in the operation buttons 126c, the effect corresponding to the effect name selected and enclosed by focus F is applied to the image taken with the digital video camera 129. For example, in the figure, when button A is pressed, processing of adding a clapping sound which is the effect corresponding to the "Clapping sound" to the motion picture data taken with the digital video camera 129 is executed. The focus F moves relatively means that the operation of the rotatable dial 126b does not cause the focus F to move but causes the display string of the effect name to scroll and as a result the focus F moves on the "effect name" displayed on the display string.

Button B shows an effect name "Title impose" currently enclosed by the focus F, that is, selected and below this shows effect names such as "BGM1", "Monochrome image", "Title impose" . . . sequentially starting from the top. These are used to instruct that an effect corresponding to the effect name enclosed by the focus F be applied and by the user pressing the button B in the operation buttons 126c, the effect corresponding to the effect name enclosed by the focus F is applied to the image taken with the digital video camera 129. For example, in the figure, when button B is pressed, processing of superimposing the title name which is the effect corresponding to "Title impose" is executed on the motion picture data taken with the digital video camera 129. The effect processing corresponding to button A is the addition of "clapping sound" which is processing to be temporarily applied, while the effect processing corresponding to button B is applied continuously. Therefore, a toggle button is used as button B in the operation buttons 126c in the user PC 106 and once pressed, effect applying processing such as "monochrome image", etc. is continued until the button is pressed the next time.

Furthermore, a preset effect name preset by the user is shown to the right of the effect names corresponding to button B on the screen. The effect shown here is applied continuously unless the effect to be preset is changed in the effect setting, which will be described later, irrespective of button operations. In the example in the figure, "Date/time" is set and in this case, the date/time is always superimposed in the motion picture data to be distributed.

The above effect processing is implemented assuming that live distribution will be performed, that is, motion picture data taken with the digital video camera 129 will be sent in real time. That is, when live distribution is performed, the user PC 106 sends images taken in real time and the operation when applying effects, etc. to the images taken is required to be simple, and therefore it is designed that processing can be executed by a single operation of pressing button A or button B as described above. However, while it is possible to instruct the processing of applying an effect by a single operation of pressing button A or button B, when button A or button B is depressed, the processing of the effect corresponding to the effect name enclosed by the focus F in the effect display field 48 is executed. Therefore, if the effect name and its display sequence shown in the effect display field 48 do not match the user's intention, the amount that the focus F must be moved increases relatively to apply the desired effect, which will take much time to rotate the operation dial 126b, preventing the user from applying the desired effect at desired timing.

Figure 11A:
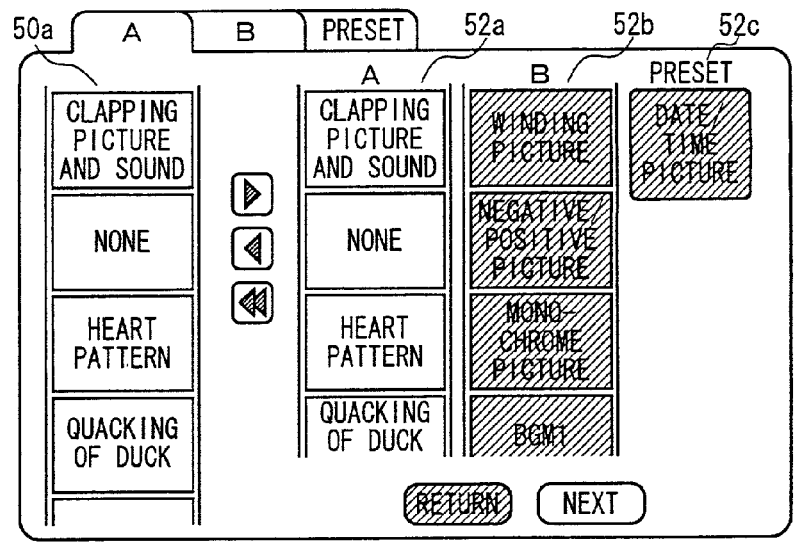
FIGS. 11A to 11C are drawings showing a display screen during effect setting processing in the live distribution mode.
Figure 11B:
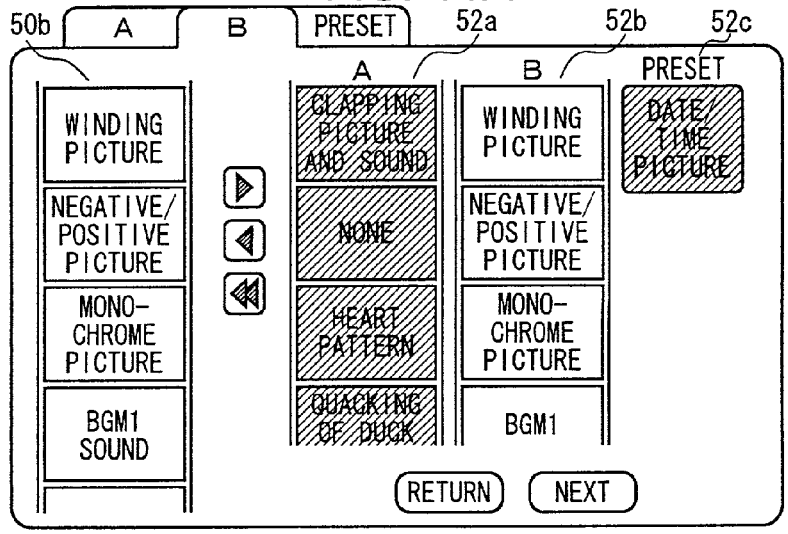
Figure 11C:
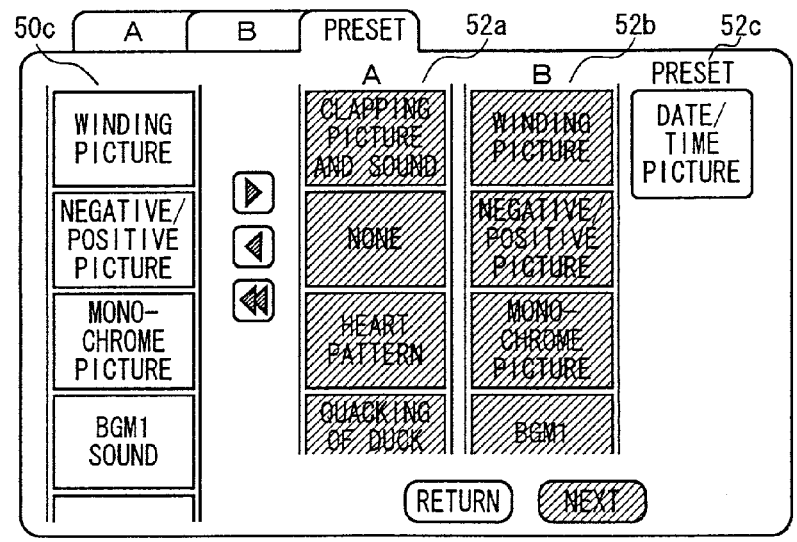

Thus, selecting "Set effect" on the GUI (see FIG. 9B) in the live distribution mode makes it possible to set what effect from among many effects provided beforehand should be displayed in the above effect field 48 in what order. Here, FIG. 11 shows a screen displayed on the display section 124 when "Set effect" (see FIG. 9B) of the above GUI is selected. As shown in FIGS. 11A, 11B and 11C, three setting screens, button A, button B and preset button, are provided. The screen to perform the effect setting corresponding to button A in FIG. 11A shows a button A effect list field 50a that lists many effect names provided and to be temporarily assigned, that is, effect names corresponding to button A on the left side of the screen and a registration list field 52 to be displayed in the above effect display field 48 on the right side of the screen. The registration list field 52 displays button A registration list field 52a, button B registration list field 52b and preset registration field 52c. On the button A setting screen, the display colors of the button B registration list field 52b and the preset registration field 52c are different from the display color of button A registration list field 52a, which allows the user to easily recognize the currently settable registration field. In the button A effect list field 50a, the user can scroll up and down many provided and executable effect names for effect processing.

On such a display screen, the user selects an effect to be displayed in the effect display field 48 from among the effects displayed in the button A effect list field 50a and drags the selected effect into the button A registration list field 52a. Thus, the user can make a setting in such a way that desired effects corresponding to button A are displayed in the effect display field 48 in a desired order.

When effects corresponding to button B are set, the screen shown in FIG. 11B is displayed. On the right side of this screen, a button B effect list 50b that displays many effect names provided and consecutively applied, that is, effect names corresponding to button B is displayed. In the button B effect list 50b, the user can scroll up and down many provided and executable effect names for effect processing.

On such a display screen, the user selects an effect to be displayed in the effect display field 48 from among the effects displayed in the button B effect list field 50b and drags the selected effect into the button B registration list field 52b. Thus, the user can make a setting in such a way that desired effects corresponding to button B are displayed in the effect display field 48 in a desired order.

When preset effects are set, the screen shown in FIG. 11C is displayed. On the right side of this screen, a preset effect list 50c that displays many effect names provided and consecutively applied is displayed. In this preset effect list 50c, the user can scroll up and down many provided and executable effect names for effect processing.

On such a display screen, the user selects an effect to be displayed in the effect display field 48 from among the effects displayed in the preset effect list field 50c and drags the selected effect into the preset registration list field 52c. Thus, the user can set preset effects.

When carrying out live distribution, the user generally has an established concept of the types of effects to be applied, timing and order of applying those effects, etc. Therefore, if a setting is made with consideration given to the types of effects to be applied and order in which effects are applied based on the user's concept, it is possible to perform effect processing that will reproduce the user's concept more faithfully through simple operations in live distribution.

The user PC 106 can store an application program provided with the five functions of the capture mode, the upload mode, the Web check mode, the live reservation mode and the live distribution mode as described above in the hard disk 123 and execute the above processing function. In addition, the user PC 106 also stores a program to execute processing for automatically incorporating a reservation setting information file, which will be described later, when a reservation for live distribution is made and a program to execute processing for communication/connection with the streaming server 102. The functions obtained by executing these programs will be described in detail later.

A-3. Server Reservation Control Apparatus

As described above, when the user PC 106 performs live distribution as a broadcaster, it is necessary to make a reservation for use of the streaming server 102 in the time zone for carrying out live distribution in a personal casting service provided by the content supply system 100. Next, the server reservation control center 101 on the service provider side who controls the reservation for use of the streaming server 102 will be explained with reference to FIG. 12.

Figure 12:
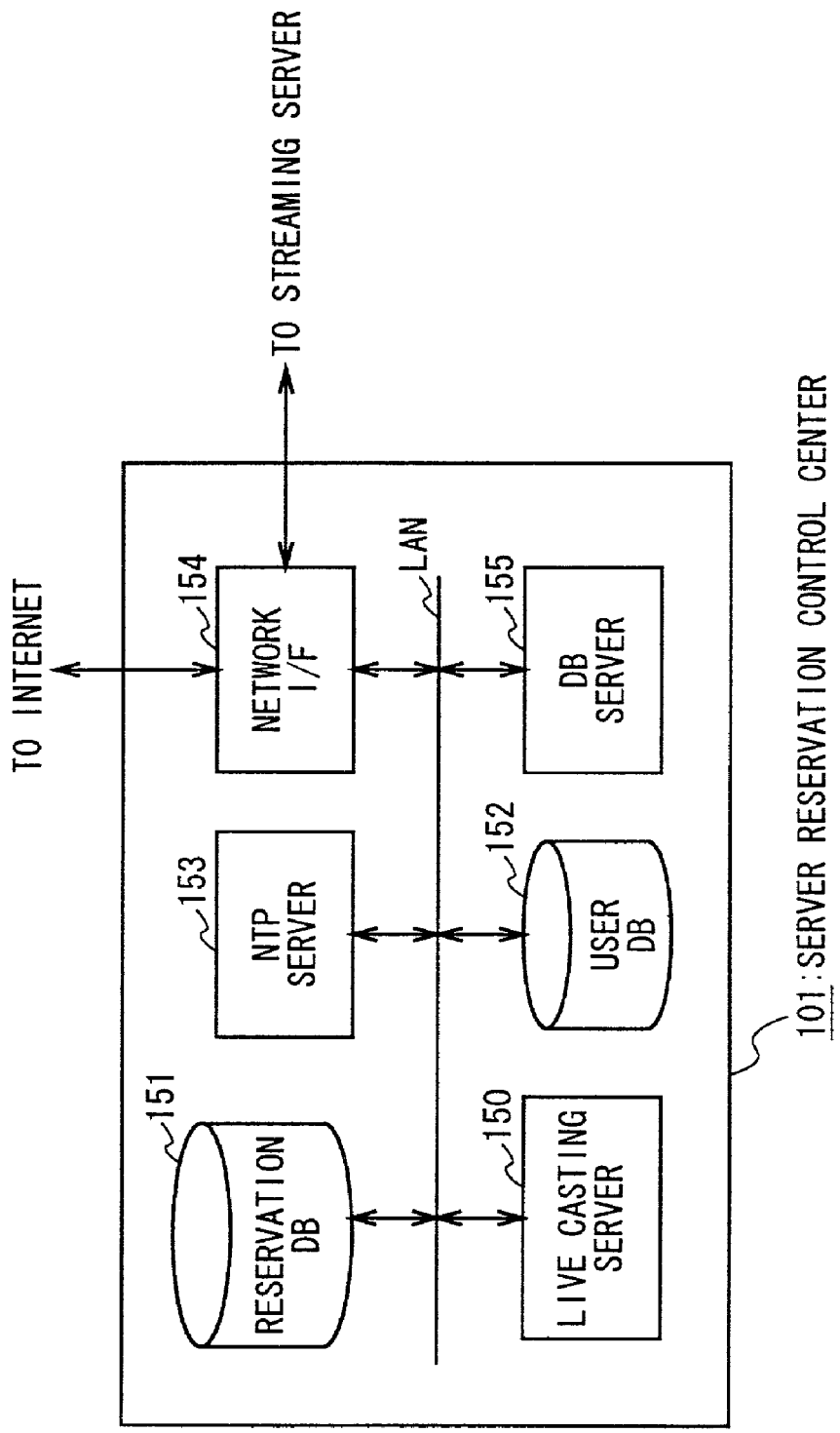
FIG. 12 is a block diagram showing a configuration of a server reservation control apparatus of the content supply system.

As shown in FIG. 12, the server reservation control center 101 comprises a live casting server 150, a reservation database 151, a user database 152, a network time protocol (NTP) server 153, a network interface 154 and a database server 155, all of which are mutually connected with a local area network (LAN). Here, each component of the server reservation control center 101 exchanges various kinds of data with the user PC 106 and the client PC 107 which are connected to the Internet 103 via the network interface 154, and the streaming server 102 connected to a dedicated line 109 (see FIG. 1).

The live casting server 150 is a server that performs processing to control the overall service such as live distribution reservation processing, billing processing, service member registration processing in a personal casting service. The live casting server 150 stores Web pages for registration for the user to acquire the right to utilize this service, for reservation reception to receive the reservation from the user, for reservation confirmation for the user to confirm or change the reservation and for referencing a program table to reference program table, etc. distributed by the live distribution to the client PC 107, in the hard disk. When receiving a request from the user PC 106 or client PC 107, the user PC 106 or client PC 107 is allowed to browse the Web page corresponding to this request. The Web page provided for the live casting server 150 will be explained with reference to the display screen displayed on the browser screen of the PC that has requested the browsing of the Web page.

By using a PC such as the user PC 106 or client PC 107, which is connectable to the Internet 103, the user enters a URL to identify the top page (homepage) of a Web page of the live casting server 150 and makes a request for browsing, then a Web page display screen shown in FIG. 13 appears on the requesting PC. By the way, the method of requesting the browsing of the top page of a Web page of the live casting server 150 also includes a method of jumping to a desired page by clicking a link button on another homepage, in addition to the method of entering the URL described above.

As shown in FIG. 13, this homepage shows link buttons including "Member registration", "What is personal casting TV?", "Today's live", "Program guide", "My channel", "Live distribution reservation", "Program pickup", "Image Station", in addition to the columns for entering a user ID and password to log in. When any link button is clicked, a Web page hyper-linked to the link button is displayed on the PC side.

When "Member registration" is clicked, a Web page for registering a person as a member who is eligible to the personal casting service appears on the display screen of the PC, which will be described in detail later.

Then, when "What is personal casting TV?" is clicked, a screen as shown in FIG. 14 appears on the display screen of the PC. As shown in this figure, this Web page screen shows a description urging member registration for utilizing the personal casting service and a link button "To registration page" to jump to the "Member registration" Web page. Moreover, this display screen includes outlined descriptions of the personal casting service and processing procedure, etc.

Then, when "Today's live" is clicked, a screen as shown in FIG. 15 appears on the display screen of the PC. As shown in this figure, this Web page screen shows live programs to be distributed today and shows the current time set on the service provider side (a reservation is executed based on this time) at the top and a list of information about items such as distribution time, title, distributor and outline, etc. of a special program and a private program to be distributed today below (the example in the figure describes the names of items displayed, but the contents of the above items (distributor name and title, etc.) are actually displayed)). This "special program" means content supplied by a company and the "private program" means content supplied by an individual user like the user PC 106. Furthermore, a program described as "On-demand" instead of distribution time is an on-demand distribution program for storing distribution data in the live casting server 150 beforehand and distributing it in response to the request of the client PC 107, etc, not a distribution program for live-distribution. Furthermore, "Capacity" in a private program is information indicating a fixed number of clients who can receive the content of the program, and "OPEN" and "CLOSE" are information indicating whether the content can be distributed at present in response to the request from the client taking the fixed capacity into consideration ("OPEN": distributable, "CLOSE": not distributable).

Here, "Title" in the list of programs is a link button and when this button is clicked, detailed information of the live program of the clicked "Title" appears as shown in FIG. 16. On this screen, when the user enters a correct password and clicks on the "Replay" button 175 while the program is distributed, a distribution request for the live program is sent to the streaming server 102 over the Internet 103. This allows the client PC 107 that has sent the distribution request to receive content of the live program by streaming from the streaming server 102 and reproduce this in real time. By the way, reproducing the content distributed by streaming by the streaming sever 102 in real time requires replay software to replay this in real-time (e.g., "Real player" (Real Networks Co., Ltd.) and "Windows Media Player" (Microsoft Corporation), etc.). Therefore, if a PC that sends a distribution request does not store such replay software, the "Replay software" button 176 is clicked. This makes it possible to download the Replay software to the PC and to reproduce and view the content distributed by streaming by the streaming server 102 in real time on the PC.

Then, when "Program guide" is clicked, a screen as shown in FIG. 17 appears on the display screen of the PC. As shown in this figure, this Web page screen shows a monthly calendar including the present day and shows a list of programs to be distributed on the date indicated by the outline characters on a colored background of the calendar. This list of programs displayed is the same as "Today's live" described above (see FIG. 16). On this display screen, clicking a desired date on the monthly calendar shows a program list for that relevant date. The screens displayed for "Today's live" and "Program guide" are not limited to those shown in FIG. 16 and FIG. 17, but may be displayed in a display format like a TV column of newspaper in which a matrix-like program display filed is provided showing times on the vertical axis and channels on the horizontal axis and a title name, the contents and a distributor name, etc. are displayed in the matrix, and this display format can be set arbitrarily.

Then, "My channel" is a Web page provided for each user who has the right to become a transmitter of live distribution (a user registered as a premium member, which will be described later) and when "My channel" is clicked, a Web page, etc. to confirm the contents of reservation of live distribution at this time is displayed. Furthermore, when "Live distribution reservation" is clicked, a Web page to make a reservation for live distribution is displayed, but these will be described in detail later. By the way, users who are not members have no user ID or password, and cannot perform log-in processing such as entering the user ID and password. When "My channel" or "Live distribution reservation" is clicked on the PC of a user who has not performed such log-in processing, a jump is not made to the corresponding Web page but to "What is personal casting TV?" where the user is urged to register as a member.

Then, "Program pick up" is a Web page to present programs, etc. recommended by the service provider and when this is clicked, detailed information (see FIG. 16) on the program recommended by the service provider appears.

The live casting server 150 stores the above-described Web pages in its hard disk.

Returning to FIG. 12, the reservation database 151 stores information on the reservation situation of live distribution and billing resulting from the reservation. As shown in FIG. 18, the reservation database 151 stores the reservation contents information including the reservation time zone, channel to be used, band to be used (bit per second (bps)), etc. for each reservation, in association with user ID to identify the user, billing flag information to indicate whether the reservation is established and billing is possible at this time and reservation ID used for authentication of the time when the reserved distribution is carried out. Each item of these information will be written during reservation processing, etc. by the live casting server 150 which will be described later and each item of information stored with in the authentication processing by the database server 155 which will be described later will be referenced.

The user database 152 stores information on registered users who have the right to utilize the personal casting service and stores information including a name, user ID, password, e-mail address, address, telephone number (cellular phone and facsimile number), credit card number and expiring date of the credit card for billing, for each registered user. Each item of these information will be written during member registration processing by the live casting server 150 which will be described later and referenced in the reservation processing by the live casting server 150 which will be described later.

The NTP server 153 controls time information in the apparatuses of the service providers including this server reservation control center 101 and the streaming server 102 together. The live casting server 150 and streaming server 102 acquire the time information from the NTP server 153 and control the live distribution start time and end time based on the acquired time information. This is because a service like live distribution must operate under precise time control. Unifying the reference times on the service providers prevents the server reservation control center 101 and the streaming server 102, which are the apparatus on the service provider side, from operating based on different times. Furthermore, the time of the user PC 106, which is the user side apparatus, may be different from the time of the service provider, and if the user of the user PC 106 fails to recognize this time difference, there may be a difference between the start time and end time of live distribution specified by the service provider and the start time and end time of live distribution recognized by the user. Therefore, the reservation processing by the live casting server 150 notifies the user PC 106 of this time difference, and this time difference is calculated based on the time information acquired by the live casting server 150 from the NTP server 153.

When the user PC 106 or another illegal PC sends a connection request to use the streaming server 102 to the access port of the dedicated server connection network 108, the database server 155 receives the request from an access server (not shown) of the dedicated server connection network 108 and performs authentication processing as to whether the accessing PC is a PC that has made a valid reservation (that is, user PC 106) or not. If that PC has been authenticated to be the valid PC in the above authentication processing, a communication/connection between the streaming server 102 and the user PC 106 is established and the user PC 106 requests the streaming server 102 to execute streaming distribution processing. In this case, the streaming server 102 requests the database server 155 for authentication processing to authenticate whether the PC sending the distribution request is a PC that has a valid reservation. When receiving such a request from the streaming server 102, the database server 155 also performs authentication processing to authenticate whether it is a PC that has a valid reservation. This authentication processing is performed by referencing the reservation database 151. The two kinds of authentication processing above will be explained in detail later.

A-4. Streaming Server

Then, the streaming server 102 shown in FIG. 1 receives content data such as motion picture data sent from the user PC 106 having the above-described valid reservation via the dedicated server connection network 108, etc. and distributes this by streaming to the client PC 107 that has requested for a distribution over the Internet 103.

The streaming server 102 can distribute a plurality of content simultaneously. That is, the streaming server 102 has a plurality of channels so that a plurality of distributors can distribute content by the live distribution using the streaming server 102 in the same time zone. This streaming server 102 has a preset number of people who can receive distribution, transmission band (64 kbps or 28.8 kbps, etc.) and service fee, etc. for each channel and the user who distribute content using the streaming server 102 can select a channel to be reserved taking into account the above settings.

Furthermore, the streaming server 102 performs streaming distribution processing of content sent from the live distributor with the user PC 106 as described above, and stores commercial content, etc. to be distributed during a free time zone with no reservation or intervals between programs, to distribute the commercial content in such free time zones.

Furthermore, the streaming server 102 controls the distribution time zone and restriction on the number of client PCs 107 which is to receive content, according to the contents of reservation permitted to the user PC 106 by the server reservation control center 101. This processing will be described later.

A-5. Communication Path Between Streaming Server and User PC for Live Distribution As shown in FIG. 1, the streaming server 102 is connected to the dedicated server connection network 108 and when live distribution described above is performed, the user PC 106 is connected to the streaming server 102 via the telephone network 104 and dedicated server connection network 108. The dedicated server connection network 108 is a dedicated network provided to carry out the live distribution in the personal casting service provided by this content supply system 100.

Here, while communication/connection between the streaming server 102 and user PC 106 is possible via the Internet 103, this content supply system 100 has the dedicated server connection network 108 to be connected to the streaming server 102 in order to secure the transmission path and transmission band of content data from the user PC 106 to the streaming server 102. Such a dedicated network is used for the following reasons. In order for the user PC 106 to be connected to the Internet 103, the user PC 106 needs to be connected to an Internet service provider (hereinafter referred to as "ISP") with which the user PC 106 has contracted, via the telephone network 104. Such an ISP receives connections not only from registered members of this personal casting service but also from PCs of a great number of Internet users. Therefore, when a great number of Internet users connects to the ISP and thereby to the Internet 103, the user PC 106 can no longer secure a transmission band necessary for the live distribution. Moreover, the user PC 106 may not be able to be connected to the ISP for a reason why the line is busy. Data transmission using the Internet 103 has the problem of a deteriorated connection environment as described above, while carrying out live distribution requires a communication path with the streaming server 102 at a desired bit rate to be secured for a desired duration of time. The above problem may prevent a normal service from being supplied. Therefore, the content supply system 100 prevents the above problem by providing the dedicated server connection network 108 so as not to use the Internet 103.

The dedicated server connection network 108 is provided with a great number of lines for connection to the streaming server 102. The number of lines provided for the dedicated server connection network 108 is greater than the maximum number of users who can connect to the streaming server 102 in the same time zone (e.g., if the maximum number of users who are allowed to connect is 10, the number of lines is 20). This is for the following reason. As described above, the access server of the dedicated server connection network 108 requests the database server 155 (see FIG. 12) to perform authentication processing on the PC that has requested for connection in order to authenticate whether the PC that has requested for the connection has a legal reservation. If the PC is judged to have no legal reservation in this authentication processing, the call from the PC requesting for the connection is immediately cut. Therefore, while any illegal PC cannot use the line of the dedicated server connection network 108, one line remains busy while the above authentication processing is in progress. For this reason, if the maximum number of users allowed to connect is equal to the number of lines provided, an illegal user may make a great number of calls simultaneously to the access port of the dedicated server connection network 108 for the purpose of interference with the personal casting service, etc., which will prevent PCs of users with a legal reservation from connecting. Therefore, providing lines exceeding the maximum number of users as shown above reduces the possibility that the service will be interfered by illegal users.

Furthermore, this personal casting service allows connection to the streaming server 102 a predetermined time before the distribution start time based on the reservation, making it possible to complete connection processing such as authentication before the time at which the distribution is started and to perform live distribution at the reserved distribution start time. Therefore, if reservation times of different users are continuous, the following problem may occur. That is, the connection of a user receiving a distribution who reserved a previous time zone may overlap the connection after a predetermined time before distribution is started, by the user who reserved a posterior time zone, and the number of lines equal to the maximum number of users who can receive distribution are not enough. Thus, providing lines twice the maximum number of users can handle even the case where the connection by the user who reserves the preceding time zone overlaps the connection by the user who reserves the posterior time zone.

Furthermore, the dedicated server connection network 108 to be connected to the streaming server 102 can provide not only access ports for a network (e.g., public telephone network) of one carrier but also access ports accessible from networks (e.g., integrated services digital network (ISDN) or mobile telephone network) of a plurality of carriers. In this case, the user PC 106 selects a carrier to be connected, calls an access port corresponding to the network of the relevant carrier and establishes a communication/connection with the streaming server 102 via the dedicated server connection network 108.

A-6. Client PC

As described above, the content data sent from the user PC 106 to the streaming server 102 in real time is distributed by streaming over the Internet 103 to the client PC 107 that has sent a request for distribution to the streaming server 102. The client PC 107 can send a distribution request on the Web page (see FIG. 16) of the above-described live casting server 150 and also directly send a distribution request to the streaming server 102 by entering the URL of the streaming server 102. This embodiment refers to the PC that sends a distribution request to the streaming server 102 and receives distribution by streaming from the streaming server 102 and these client PCs 107 store an application program to reproduce content distributed by streaming in real time (e.g., "Real player" (Real Networks Co. Ltd.), "windows Media Player" (Microsoft Corporation), etc.) and can replay and view the distributed content data in real time by executing the application program in distribution.

B. Operation of Content Supply System

Then, the various processing operations in the content supply system 100 having the above configuration to implement a live casting service will be explained.

B-1. Member Registration

Figure 19:
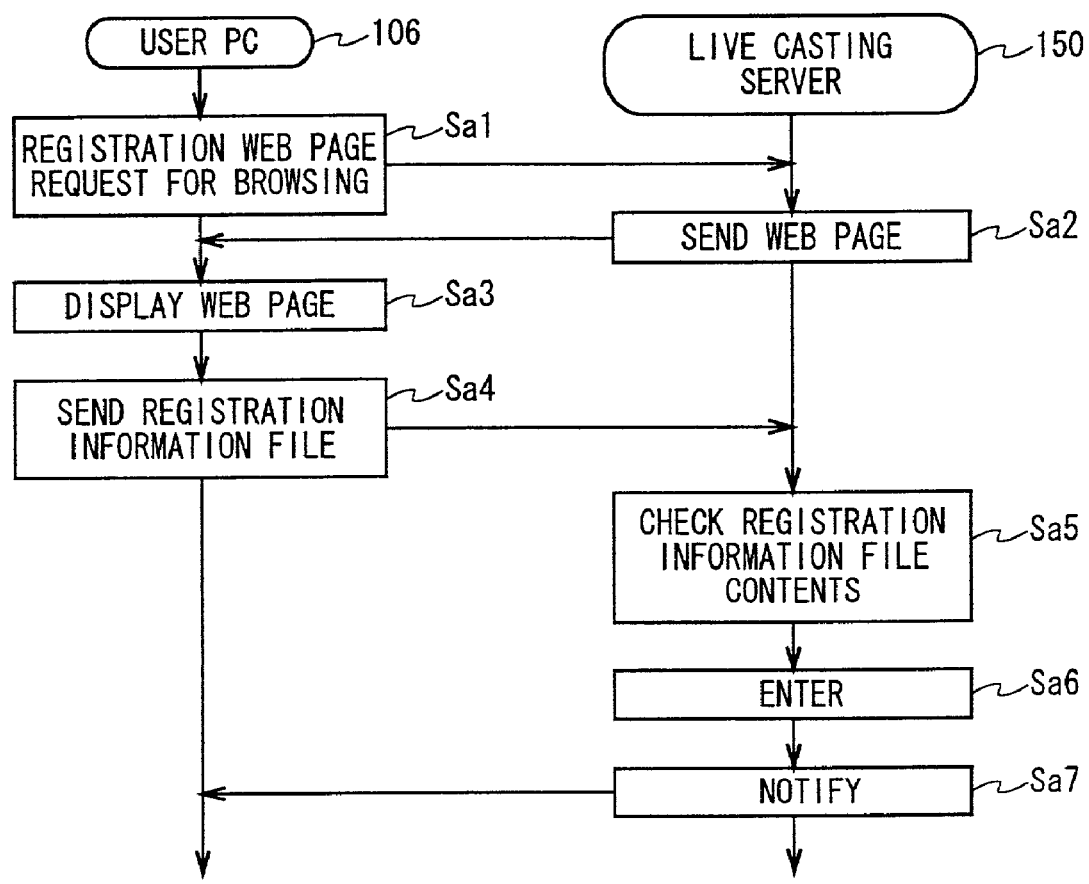
FIG. 19 is a sequence flow chart showing processing operations by the user PC and the live casting server during member registration.

At first, when the user of the user PC 106 performs a live distribution using the personal casting service, it is necessary to apply for member registration to the live casting server 150 of the server reservation control center 101 to acquire the right to perform a live distribution utilizing this service. FIG. 19 shows a sequence flow chart of the processing operation of the user PC 106 and live casting server 150 when applying for this member registration. As shown in this figure, to apply for member registration, the user PC 106 connects to the Internet 103 and sends a request for browsing a Web page to the live casting server 150 (see FIG. 12) (step Sa1). When the user PC 106 connects to the Internet 103, power to the user PC 106 is turned on firstly and then the above-described application program is started. Then, by the user selecting the Web check mode, the screen as shown in FIG. 7A is displayed on the display section 124. In this Web check mode, the user enters a URL identifying the Web page of the live casting server 150 to request for browsing.

When the user PC 106 sends a request for browsing a Web page to the live casting server 150 in this way, the live casting server 150 sends the Web page via the Internet 103 to the user PC 106 (step Sa2). The user PC 106 that has received the Web page sent displays the Web page on the browser display screen 44 (step Sa3).

In the case of such a browsing request or Web page transmission, the user PC 106 and live casting server 150 carry out the following operation and processing. At first, when the user PC 106 enters the URL of the live casting server 150 and sends a browsing request, the browser display screen 44 displays the top page of the Web page stored in the live casting server 150 as shown in FIG. 13. The user clicks "Member registration" to apply for member registration. This makes the CPU 120 of the user PC 106 send a request for browsing the Web page to apply for member registration to the live casting server 150 via the Internet 103. Then, the live casting server 150 sends the member registration Web page. Upon receiving this, the CPU 120 of the user PC 106 displays the member registration screen as shown in FIG. 20 on the browser display screen 44.

As shown in FIG. 20, the member registration screen shows the names of the items to be entered for member registration and the entry column for entering the item. This personal casting service provides the above described function of the client PC 107, that is, two kinds of member registration: a general member who receives a service of receiving content by live distribution from the streaming server 102; and a premium member who can utilizes the service as a distributor who performs a live distribution in addition to the service of receiving the content. The member registration screen shows an input column 210 for general/premium members and an input column 211 only for a premium member.

In this display screen, the user who registers as a general member like the user of the client PC 107, enters items of the input column 210. The member registration input screen displays a Cancel button 212 that cancels the contents entered, and an Enter button 213 to register with the content entered and when the user clicks the Enter button 213, the CPU 120 sends the contents entered in the input column 210 as registration information to the live casting server 150 via the Internet 103.

On the other hand, when the user registers as a premium member, the user checks the checkbox and enters items of the input column 210 and input column 211. When the user completes entries of these items and clicks on the Enter button 213, the CPU 120 of the user PC 106 creates a registration information file having the same contents as that entered in the above member registration input screen and sends this to the live casting server 150 via the Internet 103 (step Sa4) and at the same time writes and stores the registration information file in the hard disk 123 in the user PC 106.

The live casting server 150 receives the registration information file created according to the contents entered of the user of the user PC 106 over the Internet 103 as described above, checks the contents of the registration information file received and decides whether to allow it to be registered (step Sa5). The processing contents is as follows. At first, when there is no information on any item, that is, the user has entered nothing in the item, etc., the user PC 106 is informed of this and urged to reenter. Furthermore, the live casting server 150 accesses a credit check server of a credit company via the Internet 103 to check whether the credit card in the registration information file is valid, and permits the registration only when the credit card is valid.

When the registration is permitted, the live casting server 150 writes the information of the items in the registration information file in the user database 152 to carry out the registration processing (step Sa6). Furthermore, in the premium member registration processing, the live casting server 150 creates a "My channel" Web page corresponding to the registered user and stores in the hard disk.

When this registration processing is completed, the live casting server 150 notifies the user PC 106 over the Internet 103 that the registration processing has been completed (step Sa7) and the member registration processing is completed.

B-2. Distribution Reservation

When the above described member registration processing is completed, the user of the user PC 106 can become a distributor who carries out a live distribution using the personal casting service and makes a reservation for a distribution to the live casting server 150 to actually carry out the live distribution. In this personal casting service, a reservation is established by the user making a reservation for registration to the live casting server 150 and reconfirming the reservation to the live casting server 150 by a predetermined time before the reserved live distribution time (e.g., six hours before). Obliging the user who made the reservation to reconfirm the reservation promotes the fulfillment and establishment of reservations and reduces fictitious reservations. Furthermore, this personal casting service sets a maximum number of frames (e.g., one frame corresponds to ten minutes) that a registered user can reserve a month and this prevents some users from monopolizing this service.

B-2-1. Reservation Registration

Hereinafter, the processing operation by the user PC 106 and the live casting server 150 when reservation registration is performed in such a distribution reservation will be explained with reference to FIG. 21 that shows a sequence flow chart of the processing operation and display screens, etc. of the user PC 106.

Figure 21:
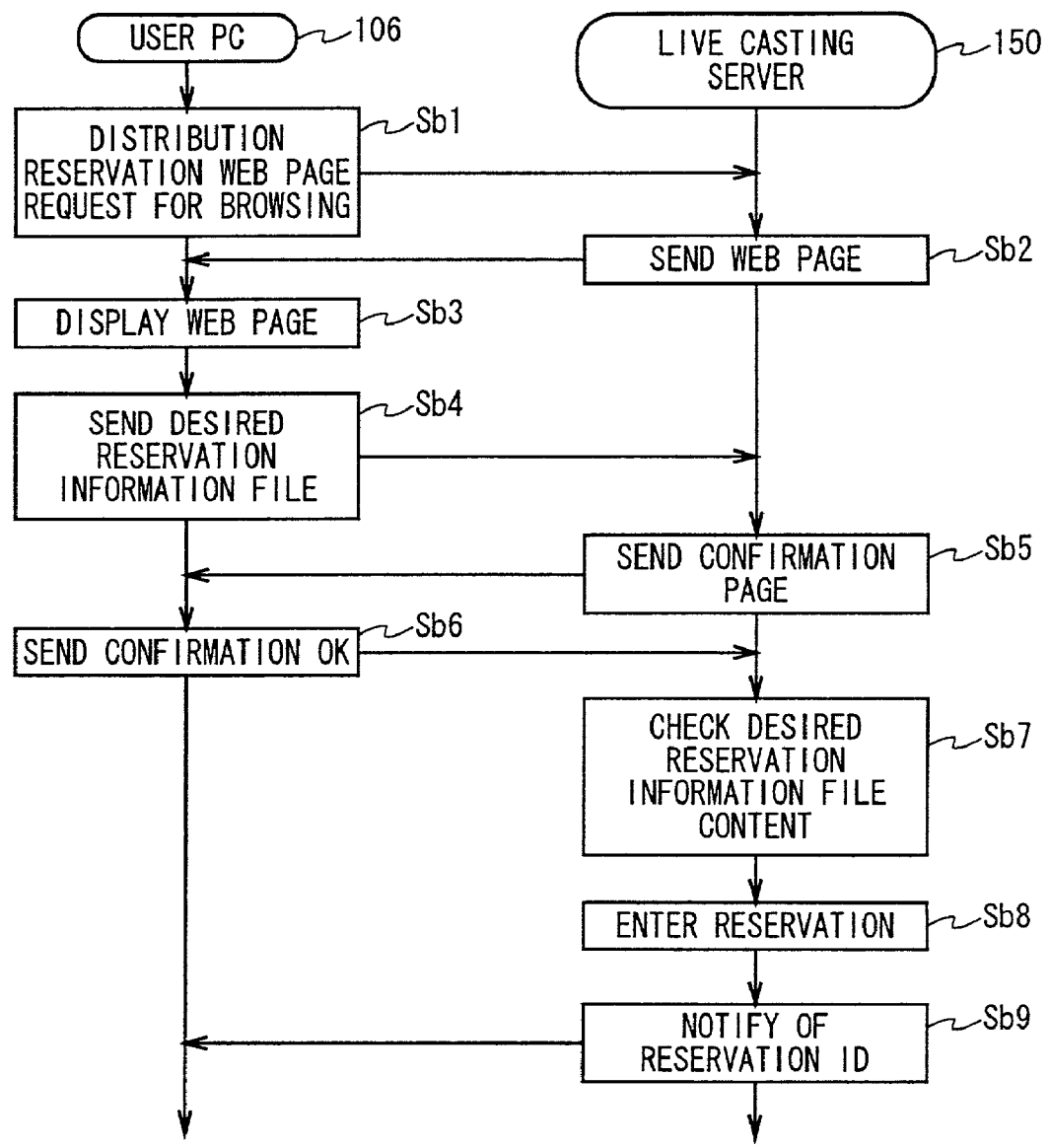
FIG. 21 is a sequence flow chart showing processing operations by the user PC and the live casting server during distribution reservation.

As shown in FIG. 21, when a distribution reservation is made, the user turns on the power to the user PC 106 and starts the aforementioned application program. Then, the user selects the live reservation mode to open the screen shown in FIG. 8A on the display section 124. In this live reservation mode, the user operates the operation dial 126b, etc. to select/determine "Jump for reservation", which is a selection item of the GUI. This allows the CPU 120 of the user PC 106 to connect the Internet 103 and requests for browsing of the Web page to make a reservation for a distribution (Web page of the time when "Live distribution reservation" in FIG. 13 is clicked) to the live casting server 150 (step Sb1). In this way, the user PC 106 can request for browsing of the Web page to make a reservation for a distribution by selecting/determining "Jump for reservation" using the function of the application program above, but the user PC 106 can also request for browsing of the Web page by entering a URL. More specifically, the user PC 106 can request for browsing of the Web page by entering a URL to request for browsing of the homepage shown in FIG. 13, logging in with the user ID and password entered and clicking the link button of "Live distribution reservation".

Once the user PC 106 requests for browsing the Web page for distribution reservation to the live casting server 150, the Web page is sent from the live casting server 150 to the user PC 106 over the Internet 103 (step Sb2). The user PC 106 that has received the Web page shows the Web page on the browser display screen 44 (step Sb3).

FIG. 22 shows a Web page for distribution reservation displayed on the browser display screen 44. As shown in this figure, this display screen shows a monthly calendar column 220, a reservation situation display column 221 that shows the reservation situation on the date expressed in outline characters on a colored background on the calendar, a reservation input column 222 that shows items to be entered by the user to make a reservation and the input field, a reservation button 223 to instruct an application for a reservation and a cancel button 224 to cancel the inputted contents of the reservation input column 222.

On this display screen, the user clicks a desired date for reservation in the monthly calendar column 220. This allows the CPU 120 of the user PC 106 to instruct to display the clicked date in outline characters on a colored background on the calendar and request the live casting server 150 over the Internet 103 to display the reservation situation of the date. Upon reception of this request, the live casting server 150 creates the data to display the reservation situation of the date at this time by referring to the registered contents of the reservation database 151 and sends the data to display the reservation situation of the requested date to the user PC 106 over the Internet 103. The CPU 120 of the user PC 106 displays the reservation situation display column 221 based on this data.

As illustrated, the reservation situation display column 221 displays the capacity of distribution, transmission band used, service fee, reservation situation per time ("Free" or "Reserved") for each channel and the user determines the channel and time zone, etc. and enters items of the reservation input column 222 with reference to this reservation situation display column 221. The capacity of distribution, the transmission band to be used and the service fee are set for each channel beforehand and the user of the user PC 106, who is a content distributor, can select a channel that matches the desired service fee and capacity, etc. by referring to the preset information for each channel displayed in the reservation situation display column 221.

The items to be entered in the reservation input column 222 are "channel" to select a channel to be used, "reservation date/time" to specify the date/time of reservation, "open level", "title" to enter the title of the content, "genre" to enter the genre to which the content belong, "open of e-mail" to select whether to open the e-mail address of the content provider, "Open of Web" to select whether to open the URL of the Web page of the content provider, "password" to enter a password, "friend list", "outline" to write an outline of the content in up to a predetermined number of characters (e.g., 20 characters) and "detail" to write the detail of the content in up to a predetermined number of characters (e.g., 200 characters).

The input item "open level" in the reservation input column 222 is the item indicating the open level of content distribute based on this reservation, that is, an item specified by the user who is a content provider to restrict the users of the content, and it is possible to specify one of three levels "Public", "Password" and "Secret" here.

"Public" specifies that the contents are totally opened and when "Public" is specified, users who have registered as general members can receive the content by the content distribution based on the reservation (however, should be within the capacity).

"Password" restricts users who can receive the content based on the reservation and is the open level in which only allows the users who can enter a valid password to receive content. When the user selects "Password", the user needs to enter a password to be used when content is received.

Then, "Secret" is also the open level in which the users who have entered a valid password can receive content as in the case of "Password". When the user selects "Secret", too, the user needs to enter a password to be used. When "Password" or "Secret" is selected, information on the distribution time of the program and the password, etc. is sent to the e-mail addresses specified in "friend list" which will be described later.

Furthermore, "Password" and "Secret" are the same in that both allow content to be supplied to only specific users, but different in that when "Password" is selected, the program based on this reservation is included in the Web pages of "Today's live" and "Program guide", while in the case of "Secret", the program is not shown on the Web pages and the fact that the content will be distributed is not opened. When "Secret" is selected, the fact that the content will be distributed is sent only to those who have e-mail addresses included in the "Friend list" which will be described later.

The user can select any one of the three open levels "Public", "Password" and "Secret" taking into account the content to be distributed. For example, when the user wants to perform a content distribution to a specific few people, it is desirable to select a channel with small capacity (inexpensive) from the economical standpoint, but if this is opened to all people, and a distribution request is made from people other than the specific people, the specific people may not receive the content distribution because of the capacity restriction. Therefore, in this case, selecting "Password" or "Secret" makes it possible to perform content distribution to specific people reliably and economically.

The input item "Friend list" in the reservation input column 222 is the column to enter e-mail addresses of people who the user of the user PC 106 wants to be notified that the content will be distributed in a time zone and with a channel based on the reservation. The live casting server 150 sends e-mail including various kinds of information to receive the content based on the relevant reservation, to the entered e-mail addresses, which will be described later.

When the entries of the items of the reservation input column 222 are completed and the reservation button 223 is clicked, the CPU 120 of the user PC 106 creates a desired reservation information file with the same contents as the inputted contents of the reservation input column 222 and sends this desired reservation information file to the live casting server 150 over the Internet 103 (step Sb4). In the example shown in FIG. 22, the user inputs characters, etc. in each column of the reservation input column 222 using the keyboard, etc., but for the items with predetermined contents such as "channel", "reservation date/time" and "genre", the user may display a pull-down menu showing a list of candidates and select/specify an item from the displayed candidates.

The live casting server 150 receives the desired reservation information file created according to the contents inputted by the user of the user PC 106 over the Internet 103 and sends a Web page to reconfirm whether the content of the received desired reservation information file is acceptable (step Sb5). In this way, the display screen of the user PC 106 shows a display prompting to confirm the desired reservation information as shown in FIG. 23. In this case, the display screen also shows the service fee of the service based on the reservation, the e-mail address of the sender of the reservation setting information to be sent from the live casting server 150 to the user PC 106 later (this e-mail address is the e-mail address entered by the user at the time of member registration), etc, for confirmation. Moreover, as described above, the user who reserved the live distribution is obliged to reconfirm the reservation a predetermined time before the distribution time (e.g., six hours before) based on the reservation and the display screen also shows messages to notify the user of this and how to reconfirm.

When the user agrees to the contents displayed on the confirmation screen, then the user clicks on the Agree button 240 and when the user does not agree to the contents displayed on the confirmation screen, then the user clicks on the Cancel button 241. Once the Cancel button 241 is clicked, this intention is sent to the live casting server 150, and the live casting server 150 discards the desired reservation information file and displays a reservation input screen shown in FIG. 22 on the display screen of the user PC 106 and prompts for a reentry. On the other hand, when the Agree button 240 is clicked, the CPU 120 sends this intention to the live casting server 150 over the Internet 103 (step Sb6).

When the Agree button 240 is clicked, the live casting server 150 checks the contents of the desired reservation information file and judges whether the reservation should be permitted (step Sb7). The live casting server 150 checks whether the inputted contents are sufficient and confirms whether there is any free space in the desired reservation time zone of the desired channel and further checks whether the user who requested the reservation has made a reservation exceeding the set number of frames. More specifically, it has already been mentioned above that this live casting service sets the maximum number of frames (e.g., one frame corresponds to ten minutes) that each registered user can reserve a month. Therefore, in checking as to whether the reservation should be permitted, it is judged whether the number of frames already reserved by the user for one month exceeds the set number of frames, and if it exceeds the set number of frames, the reservation is not permitted. On the other hand, if the number of frames already reserved by the user for that month is smaller than the set number of frames, it is judged that the check result has no problem and if other check results have no problem, the reservation is permitted. In this way, in order to check the number of frames reserved by the user for one month, the user database 152 stores the reservation situation from at least one month ago until the present day for each user registered as a premium member.

When a reservation is permitted, the live casting server 150 creates a reservation ID only used for authentication of the time when the reserved distribution is executed based on the reservation and writes and registers the reservation time zone, channel to be used, band to be used (bit per second (bps)), reservation content information including mail addresses of the friend list, etc., user ID to identify the user who has reserved and the created reservation ID, in the reservation database 151 (see FIG. 18) based on the contents of the desired reservation information file (step Sb8). By the way, at the time of this reservation registration, the billing flag information indicating whether billing is possible indicates that billing is "not possible" and when a reconfirmation is made and the reservation is established later, this billing flag is rewritten as "possible". Moreover, the live casting server 150 adds and writes the information on the reservation to the Web page of "my channel" corresponding to the user who made the reservation. Furthermore if the open level in the reservation is "Public" or "Password", the live casting server 150 updates the Web page to include the program based on this reservation on the Web pages of "Today's live" and "Program guide". That is, the information that the content distribution based on the reservation will be performed is stored as information that can be browsed. In this case, it is possible to browse the Web page with the client terminal apparatus 107, etc. over the Internet 103 and know that the live distribution will be performed based on the reservation. That is, not only when "Public" is set but also when "Password" is set, it is possible to browse the Web page including the information that the live distribution based on the reservation will be performed and any third party can know that the live distribution exists. On the other hand, when "Secret" is set, the live casting server 150 does not include any information on the live distribution to be carried out based on this reservation, on the Web pages of "Today's live" and "Program guide". Therefore, for the live distribution with "Secret", only specific people who have received e-mail transmitted which will be described later and who have browsed are allowed to know that the live distribution will be performed.

Once such reservation registration processing is completed, a Web page urging the user to agree to the copyright control and prohibitions, etc. when the service is used is sent to the user PC 106 and displayed on the display screen of the user PC 106. Then, upon reception of agreement from the user PC 106, the live casting server 150 sends a Web page informing of the completion of the reservation procedure except reconfirmation to the user PC 106. FIG. 24 shows a reservation procedure completion screen displayed on the display screen of the user PC 106. As shown in this figure, this reservation procedure completion screen displays a message urging the user to reconfirm. If the "OK" button 245 is clicked, the reservation procedure except reconfirmation is completed and hereinafter, the live casting server 150 sends an e-mail about the reservation including the reservation ID created, to the user PC 106 (step Sb9).

B-2-2. Reconfirmation

Figure 25:
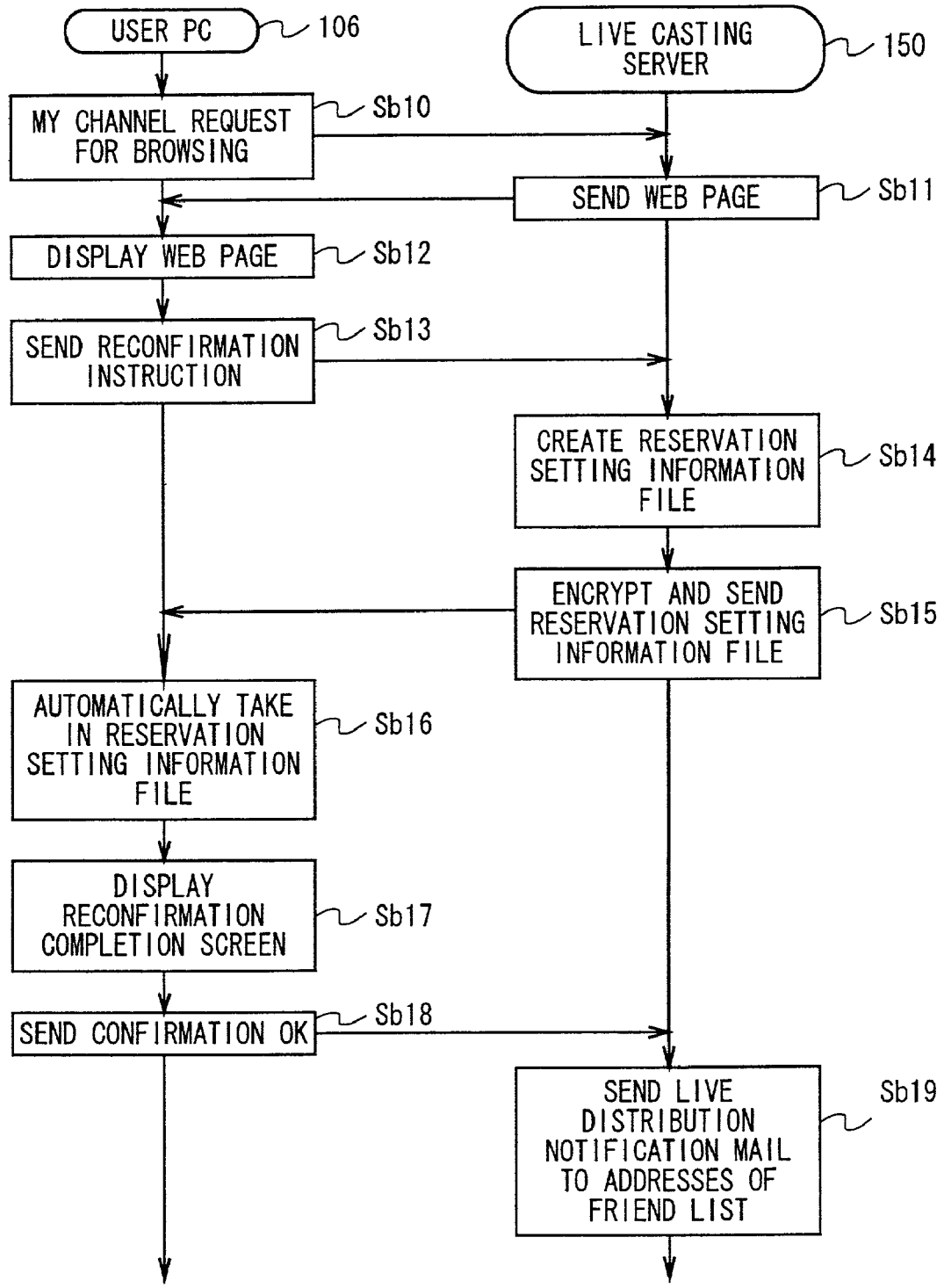
FIG. 25 is a sequence flow chart showing processing operations by the user PC and the live casting server during reconfirmation processing in the distribution reservation.

As described above, this personal casting service requires the user to reconfirm the reservation six hours before the reserved distribution is executed and if the user fails to reconfirm, the reservation is forcibly canceled. Therefore, the user who has acquired the reservation ID via an e-mail from the live casting server 150 must reconfirm the reservation using the user PC 106 to ensure the reservation. The reservation procedure until the reservation ID above is received can be done using a PC different from a PC to be used for the live distribution, but the PC used for live distribution must be the PC used for reconfirmation. The following explanation assumes that a reconfirmation will be made using the user PC 106. The processing operations by the user PC 106 and live casting server 150 when a reconfirmation is made will be explained with reference to FIG. 25.

When making a reconfirmation, the user turns ON the power to the user PC 106 and starts the application program (when power is OFF). Then, the user selects a live reservation mode to display the screen shown in FIG. 8A on the display section 124. In this live reservation mode, the user operates the operation dial 126b, etc. to select/determine the reservation to be reconfirmed from the reservation list (it may include only one item) displayed in the reservation list area 46. Then, the CPU 120 of the user PC 106 connects to the Internet 103 and sends a request for browsing the Web page "My channel" corresponding to the user to the live casting server 150 (step Sb10). In this way, the user PC 106 can send a request for browsing the Web page to make a reservation for distribution using the function provided by the application program. The request for browsing the Web page can also be sent by entering a URL. More specifically, the request for browsing the Web page can be sent by entering a URL to send a request for browsing the homepage shown in FIG. 13, entering the user ID and password to log in and clicking the link button of "My channel".

When a request for browsing the "My channel" Web page is sent from the user PC 106 to the live casting server 150 in this way, the live casting server 150 sends the Web page to the user PC 106 over the Internet 103 (step Sb11). Upon reception of the Web page sent, the user PC 106 displays the Web page on the browser display screen 44 (step Sb12).

Figure 26:
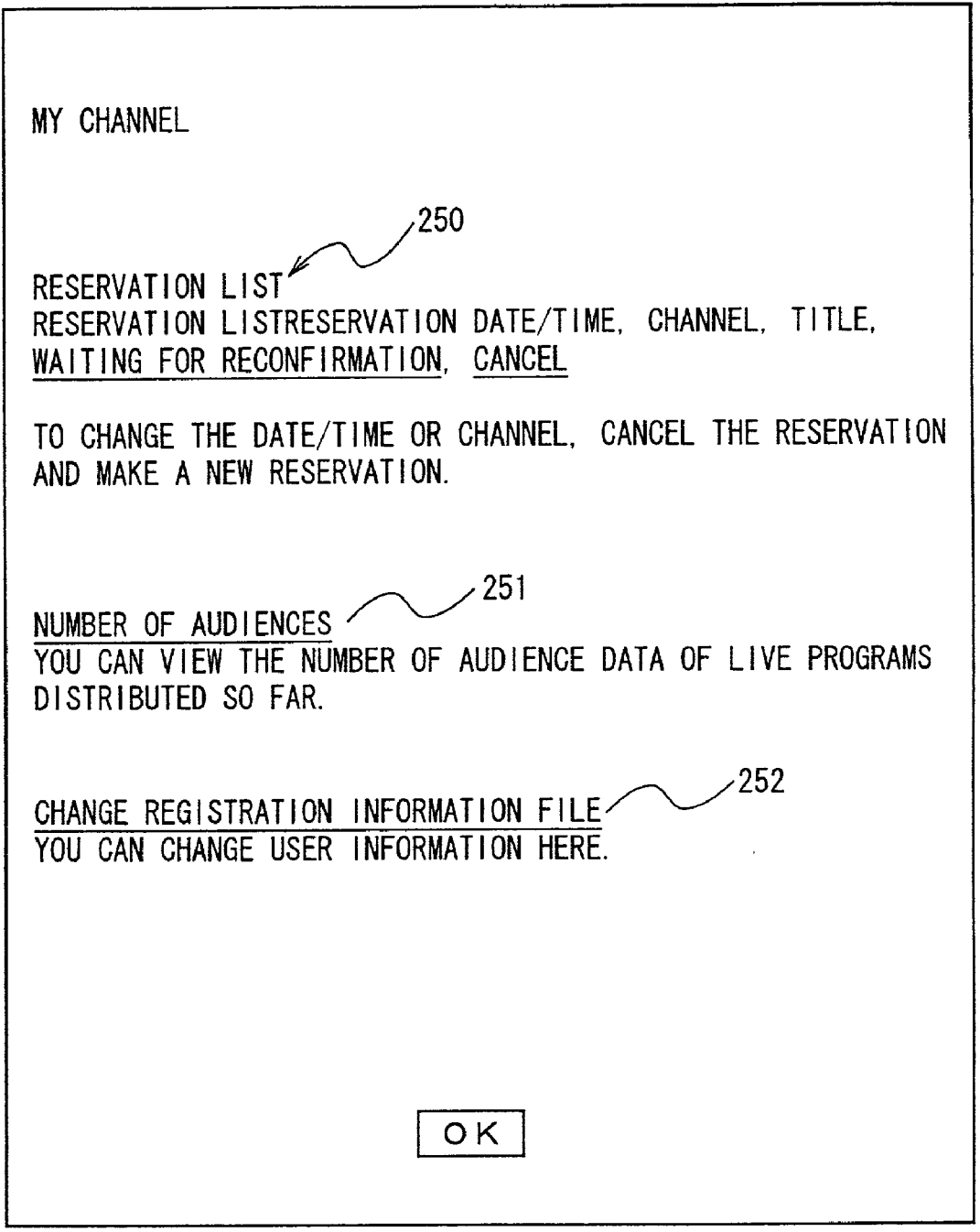
FIG. 26 is a drawing showing a display screen shown on the display section of the user PC during the reconfirmation processing.

FIG. 26 shows the "My channel" Web page displayed on the browser display screen 44. As shown in this figure, this display screen shows a reservation list 250, which is a list of reservations currently made by the user to the live casting server 150, a link button 251 to jump to the Web page to check the number of audiences of the program distributed by the user in the past, etc. and a link button 252 to jump to the Web page to modify the registration information file (see FIG. 20) of the user registered in the user database 152. This display screen also includes descriptions of the method of canceling or modifying a reservation, and this personal casting service requires the user to cancel the reservation if the user changes the reservation contents such as the channel or date/time, and then to take necessary steps to make a distribution reservation again, and this process is described in this display screen. On the other hand, items including the title and outline, other than the channel and date/time, can be changed without canceling the reservation.

The reservation list 250 shows for each reservation "reservation date/time", "channel", "title", a status item indicating whether this reservation is "waiting for a reconfirmation" or "reconfirmed", and the "cancel" button to be clicked when the reservation is cancelled (one reservation in the figure).

If no reconfirmation of the reservation has been made yet, "waiting for reconfirmation" is displayed in the status item as shown in the figure and if this page is opened after a reconfirmation of the reservation has been made, "reconfirmed" is displayed. In the case of "waiting for reconfirmation", if this is clicked, the CPU 120 sends a request for browsing the reconfirmation screen to the live casting server 150 over the Internet 103. In response to this request, the live casting server 150 sends the reconfirmation Web page to the user PC 106 over the Internet 103 and the screen shown in FIG. 27 appears on the user PC 106.

As shown in this figure, the reconfirmation screen displays contents of items including "user ID", "channel", "reservation date/time", "open level", "title", "genre", "open of e-mail", "open of Web", "password", "friend list", "outline" and "detail", set in reservation. This display screen further shows the column for entering a reservation ID and a message urging the user to enter a reservation ID and make a reconfirmation.

To reconfirm the reservation, the user enters the reservation ID included in the e-mail sent from the live casting server 150 in the reservation procedure described above and clicks on the reconfirmation button 261. On the other hand, to go back to the "my channel" screen including the reservation list 250, etc. (see FIG. 26), the user clicks on the Return button 262.

Here, when the reconfirmation button 261 is clicked on the reconfirmation display screen in FIG. 27, setting information to establish communication/connection with the streaming server 102 in the live distribution is automatically set in the PC and a message is displayed prompting to make a reconfirmation on the corresponding PC, that is, the PC which will carry out the live distribution.

When the reconfirmation button 261 is clicked, the CPU 120 of the user PC 106 informs the live casting server 150 of this reconfirmation over the Internet 103 (step Sb13).

As described above, the live casting server 150 that has received the reconfirmation sent from the user PC 106 refers to the reservation database 151 and user database 152 and creates a reservation setting information file shown in FIG. 28 on this reservation (step Sb14). Out of the information about each reservation registered in the reservation database 151, the live casting server 150 erases the data about the reservation from the reservation database 151 after six hours before the distribution start time based on the reservation and cancels the reservation. That is, the reservation-related data is erased from the reservation database 151 six hours before the distribution start time. Therefore, if the live casting server 150 receives the reconfirmation after six hours before the distribution start time, the data about the reservation no longer exist even if the reservation database 151 is referenced. In this case, the live casting server 150 sends a Web page posting a message "Reservation has been canceled because reconfirmation is not executed. To make a reservation, please redo the distribution reservation procedure", etc. to the user PC 106.

On the other hand, if the live casting server 150 receives the reconfirmation by six hours before the distribution start time, the live casting server 150 creates reservation setting information. As shown in FIG. 28, the reservation setting information file created by the live casting server 150 includes "reservation ID", "live distribution reservation date/time", "server accessible time", "access telephone number", "access server information", "address information for distribution request", "transmission band", "title", "outline", "open level", "friend list address information" and "distribution request password".

"Reservation ID" describes the reservation ID created about the reservation, "live distribution reservation date/time" describes the reserved distribution start time and end time. "Server accessible time" describes the time zone during which access to the streaming server 102 is permitted to carry out a live distribution. This example describes that access to the streaming server 102 is permitted from three minutes before the distribution start time until three minutes after the distribution end time.

"Access telephone number" describes the telephone numbers of access ports of the dedicated server connection network 108 to connect to the streaming server 102 and this example describes the telephone numbers of access ports of a plurality (four in this figure) carriers. In the procedure for actual connection to the streaming server 102, which will be described later, the user selects any one of carriers to carry out processing of making a call to the telephone number of the access port for the selected carrier.

"Access server information" describes items determined according to the channel selected in this reservation such as "type of server" connected when the channel is used, "server name", "connection port", "stream path for server", etc. When a communication/connection between the user PC 106 and the access port of the dedicated server connection network 108 is established, the connection processing to use the channel reserved by the streaming server 102 is carried out based on the description of this "access server information".

"Address information for distribution request" describes URL information used by the client PC 107 to connect to the streaming server 102 when the client PC 107 requests a stream distribution of the contents to be sent by the user PC 106 to the streaming server 102. When a distribution of the content is requested, it is possible to allow the client PC 107 to connect to the streaming server 102 using the URL over the Internet 103.

"Transmission band" describes information which is determined according to the reserved channel and describes information on the transmission band such as 64 kbps and 28.8 kbps, preset in the reserved channel. "Title", "outline" and "open level" each describes the contents registered at the time of reservation (see FIG. 22 and FIG. 23). "Friend list address information" describes e-mail addresses registered at the time of reservation.

"Distribution request password" also describes the password information registered at the time of reservation. If "open level" is "Public", the distribution requesting side can request a distribution without entering a password and in this case, the information of "distribution request password" is not included in the reservation setting information file.

Thus, the reservation setting information file created by the live casting server 150 includes information including the reservation ID used for authentication of the time of connection to the streaming server 102, which will be described later, the telephone number and connection port of the server, etc. to establish a communication/connection with the streaming server 102. The reservation setting information file is sent from the live casting server 150 to the user PC 106 over the Internet 103. In this case, the reservation setting information file contains command information for automatically writing and incorporating the reservation setting information file into a predetermined area created in the hard disk 123 of the user PC 106 and command information for instructing the display of a message notifying that the automatic incorporation has ended normally or failed. As a technology for automatically incorporating a file sent from the live casting server 150, the distributor, to the user PC 106, the receiver, the technology of "ActiveX" (registered trademark of Microsoft Corporation) can be used. When using this technology, the user PC 106 needs to use "Internet Explorer" (Microsoft Corporation) which can use "ActiveX" as the browser software.

The live casting server 150 that has created the reservation setting information file in the form of text data, etc. including the various kinds of data and commands above encrypts this file using an encryption system such as data encryption standard (DES), etc. and sends this encryption file together with the Web page that displays the reconfirmation completion screen to the user PC 106 over the Internet 103 (step Sb15).

As described above, when the live casting server 150 sends the encrypted reservation setting information file and Web page, the CPU 120 of the user PC 106 receives this and decrypts the reservation setting information file using the technology of "ActiveX", automatically takes it in a predetermined area of the hard disk 123 according to the command included in the file (step Sb16) and shows the reconfirmation completion screen on the browser display screen 44 (step Sb17). Therefore, the user PC 106 stores a program to decrypt the above encryption to execute this program when encrypting the reservation setting information file. Furthermore, when the CPU 120 writes the reservation setting information file in a predetermined area, the user PC 106 has a program to encrypt and write the file according to a predetermined encryption system (DES, etc.) and by executing this program, the reservation setting information file is encrypted and saved. Therefore, normally, the user is not allowed to display and refer to the contents of the automatically incorporated reservation setting information file. This prevents the access port numbers of the dedicated server connection network 108 from being unnecessarily opened to many people and prevents illegal accesses to the access ports of the dedicated server connection network 108 with an intention of interfering with this service.

Here, FIG. 29 shows the reconfirmation completion screen displayed on the browser display screen 44. As shown in this figure, this screen shows the current time of the service provider side and the time of the user PC 106. The time of the service provider side is the time information acquired from the NTP server 153 when the live casting server 150 sends the Web page. On the other hand, the time of the user PC 106 shows the current time based on the clock of the user PC 106. Then, the CPU 120 of the user PC 106 calculates the difference between these times (in units of minutes) and if there is any difference, shows a message about the presence of the difference as shown in the figure. In this way, it is possible to notify the user of the user PC 106 of the time difference from the service provider to call attention, or it is also possible to store a time correction program to automatically correct the time of the user PC 106 based on the time information of the service provider side sent together with the Web page in the user PC 106 and when the user PC 106 receives the reconfirmation completion screen Web page as shown above, to correct the time of the user PC 106 based on the time of the service provider side by the CPU 120 executing the time correction program. This allows the service provider side and the user PC 106 to have the same time, thus making it possible to smoothly carry forward the service of live distribution, which requires the accuracy in time.

Furthermore, the reconfirmation completion screen describes the special item to access the dedicated server connection network 108 using a dialup router. When executing processing of communication/connection with the streaming server 102 to execute a live distribution, the user PC 106 is set to automatically call the access telephone number to the access port of the dedicated server connection network 108 described in the reservation setting information file above (details will be given later). In this way, by the CPU 120 executing the program for automatic calling, the user can automatically carry out communication/connection processing without carrying out troublesome input operation such as entering telephone numbers. However, when the user PC 106 is connected to the network via a dialup router, it is necessary to set the information to be connected to the dedicated server connection network 108 via the dialup router. Thus, since it is not possible to perform processing of automatical calling based on the telephone number described in reservation setting information file, it is necessary for the user to manually set the telephone number, etc. of the access port. The special item is a description taking into account the necessity of manual setting when this dialup router is used and in this case, the access port number, login ID (reservation ID in this case) and password to be manually set by the user are displayed. In the example illustrated above, connection using the dialup router is only permitted for connection via integrated services digital network (ISDN), but the present invention is not limited to this.

Figure 30:
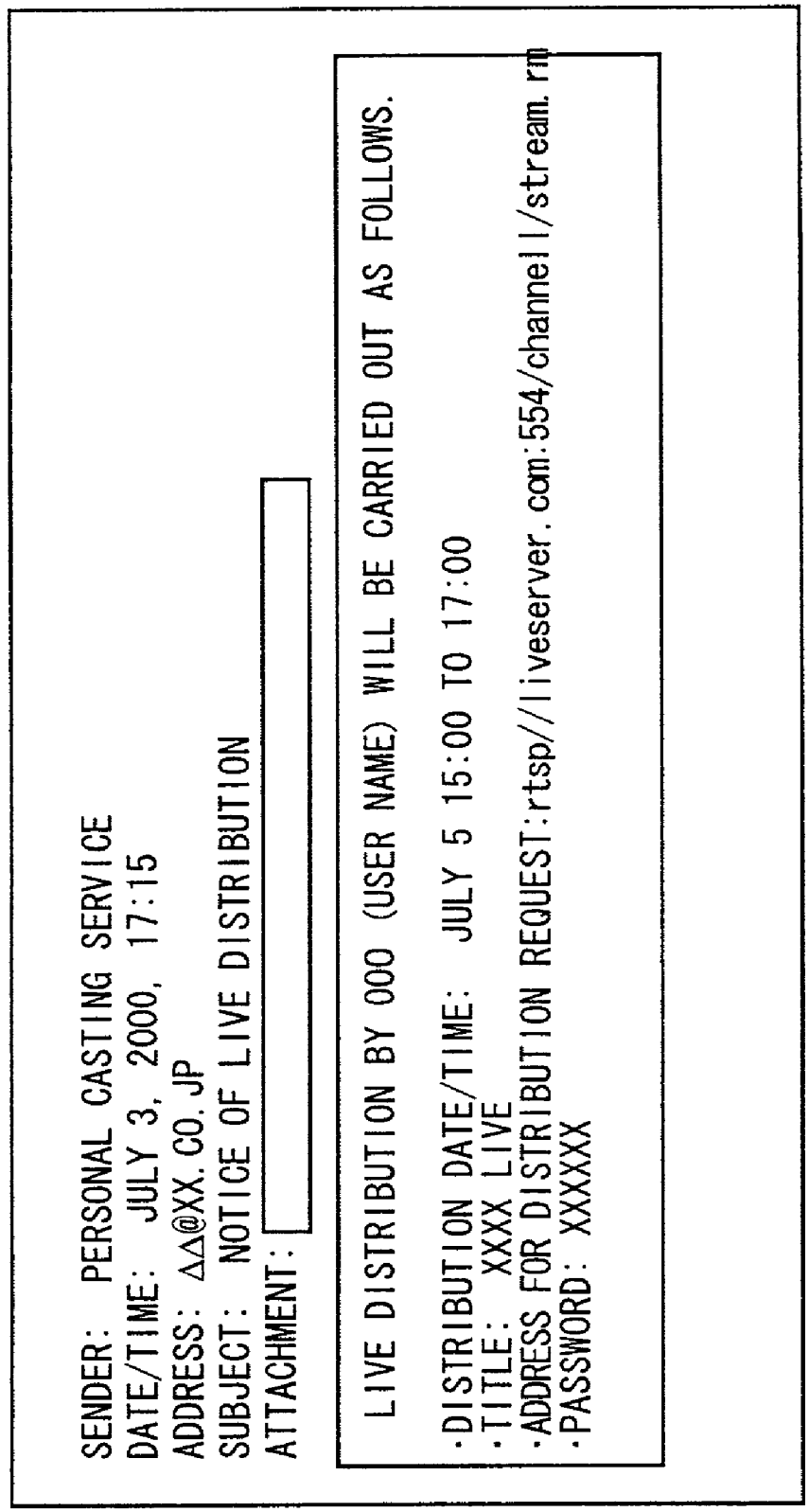
FIG. 30 is a drawing showing the contents of e-mail to be sent to e-mail addresses specified during the reconfirmation processing.

When the user clicks the "OK" button 291 by confirming the display of the confirmation screen, the CPU 120 sends information that the "OK" button 291 has been clicked to the live casting server 150 over the Internet 103 (step Sb18) and the reconfirmation-related processing on the user side completes. On the other hand, the live casting server 150 that receives the information that the "OK" button 291 has been clicked refers to the reservation database 151 and sends an e-mail notifying that there is a live distribution to the e-mail addresses registered in the "friend list" of the reservation (step Sb19). FIG. 30 shows the contents displayed on the display screen of the PC when the e-mail is opened. As shown in this figure, this e-mail shows information including "live distribution date/time", "title", "outline", "URL for distribution request" (see "address information for distribution request" in FIG. 28), "password" to request a distribution when the open level is "Password" or "Secret" (see "Distribution request password" in FIG. 28). If the user of the user PC 106 registers e-mail addresses of friends, etc. to whom the user wants the live distribution to be presented, at the time of reservation, the friends are automatically informed of the information for receiving distribution. Thus, this eliminates the necessity for the user who performs the live distribution to carry out a troublesome operation such as transmitting the information to receive live distribution by telephone or creating an e-mail including the relevant information.

In the above explanation, the processing of sending the e-mail (see FIG. 30) to the e-mail addresses registered in the "friend list" is performed after the reconfirmation is completed, but transmission of the e-mail can also be performed by the live casting server 150 when the processing of registering the reservation in the reservation database 151 based on the reservation request file from the user (step Sb8 in FIG. 21) is completed. If an e-mail is sent at the time of completion of the reservation registration processing, those who have e-mail addresses can know earlier that there is a live distribution. In this case, it is also possible to perform similar e-mail transmission processing again at the time of completion of the reconfirmation.

In addition to sending e-mail as described above, when the reconfirmation-related processing finishes, the live casting server 150 assumes that the reservation has been established, rewrites the billing flag information of the reservation database 151 about this reservation to "enabled" and performs billing processing about the reservation. The billing amount is calculated based on the service fee preset for each channel as described above. For example, when a reservation of using six frames in a channel for which a service fee of ¥100 per one frame (ten minutes) is set is established, ¥600 is billed for the reservation. However, the actual billing processing is executed after confirming that the streaming server 102 is operating on the day of live distribution without problems.

The aforementioned explanation describes the case where the user PC 106 is used which stores the program for encrypting and automatically storing the reservation setting information file sent from the live casting server 150, but the PC that does not store such a program can not automatically take in the file. In such a case, the following technique is used to take in the reservation setting information file into the PC. At first, in the case of a PC that does not store the program and thus can not automatically take in the file, the information that automatic taking-in processing has failed is displayed on the display screen of the PC. In addition to a message indicating the failure, another message appears on the same screen which instructs the user to return to the "my channel" (see FIG. 26) screen and click "wait for reconfirmation" to request for browsing the reconfirmation screen again. On the other hand, after sending the Web page indicating that the aforementioned reconfirmation has been completed to the user PC 106, when the live casting server 150 receives no reconfirmation "OK" from the user PC 106 and receives a request for a reconfirmation screen from the user PC 106, it judges that the user PC 106 has failed to automatically read the reservation setting information file and sends a Web page for downloading the reservation setting information file to the user PC 106 over the Internet 103. As a result, the display screen on the PC side shows a button for downloading the reservation setting information file, and clicking this button starts downloading of the reservation setting information file.

This is the flow of the distribution reservation processing operation from the issuing of a reservation request to the establishment of the reservation made by the completion of a reconfirmation. In this way, even after a reconfirmation is completed, the information such as genre and outline can be changed and the reservation can still be canceled even after the reconfirmation is completed (in this case, the billing processing is performed because the billing flag information above is "enabled"). The processing operation when such a change or cancellation is made will be explained below with reference to the display contents of the browser display screen 44 displayed on the display section 124 of the user PC 106.

At first, when a reconfirmed reservation is changed or canceled, an operation to request for browsing the Web page corresponding to "My channel" is performed in the same way as the operation for the reconfirmation. Thus, the CPU 120 of the user PC 106 carries out processing for connecting to the Internet 103 and requests the live casting server 150 for browsing the "My channel" web page corresponding to the user.

When the user PC 106 requests the live casting server 150 for browsing the "My channel" Web page, the live casting server 150 sends the Web page to the user PC 106 over the Internet 103. Upon reception of the Web page sent, the user PC 106 displays the Web page on the browser display screen 44.

Figure 31:
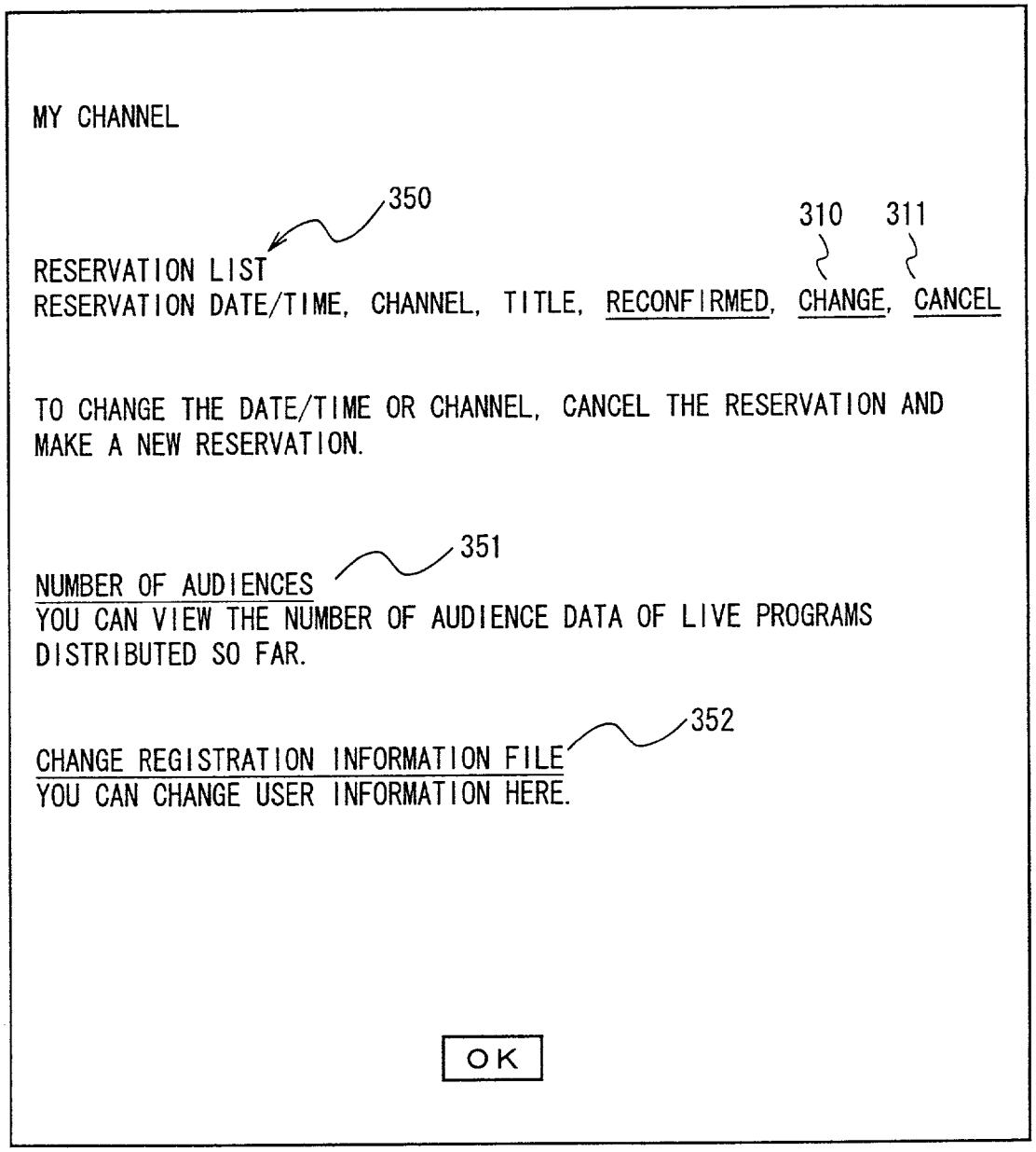

FIG. 31 shows the reconfirmed "My channel" Web page displayed on the browser display screen 44. When compared with the display screen (see FIG. 26) of "My channel" waiting for a reconfirmation, the reconfirmed "My channel"

display screen differs in that "reconfirmed" is displayed in the status item of the reservation list 250 and a "change" link button 310 is displayed.

To make a change, this "change" link button 310 is clicked. When the "change" link button 310 is clicked, the CPU 120 of the user PC 106 sends information that the "change" link button has been clicked, to the live casting server 150 over the Internet 103. In response to this, the live casting server 150 sends a Web page for the change to the user PC 106 over the Internet 103 and as a result, the browser display screen 44 of the user PC 106 displays the screen shown in FIG. 32.

As shown in this figure, the change screen shows the currently set reservation contents and the items "genre", "open of e-mail", "open of Web", "password", "outline" and "detail" of these display contents can be changed, and these are displayed in a different color from that of items that cannot be changed (reservation date/time, etc.).

The user overwrites the currently displayed setting contents with new contents and clicks the Update button 321. If the contents are not changed, the user clicks the Return button 322.

Then, when the user clicks the Update button 321, the CPU 120 of the user PC 106 creates an information file with the changed contents and sends this to the live casting server 150 over the Internet 103. Thus, the live casting server 150 updates the registration contents of the reservation database 151 based on the information file with the changed contents and sends the Web page of the changed screen to the user PC 106 over the Internet 103. As a result, the browser display screen 44 displays the screen shown in FIG. 33.

As shown in this figure, in addition to a message stating that the change has been accepted, the change completion screen shows the time of the service provider side, the time of the user PC 106 side and the time difference between them and special items when the dialup router is used, in the same way as for the reconfirmation completion screen above (see FIG. 30). Clicking on the "OK" button 331 completes the change and returns to the "My channel" screen shown in FIG. 31.

When the reservation is changed in this way, the live casting server 150 sends an e-mail including the information that the reservation has been changed and the changed contents, etc. to the e-mail addresses registered in the friend list. Thus, it is possible to automatically inform those who have the e-mail addresses of the friend list in the reservation changed contents for live distribution, without the need for the user of the user PC 106 to inform by telephone that the reservation contents for live distribution has been changed or to create an e-mail including such a message.

Next, the case where a reservation is canceled will be explained. As in the case of changing a reconfirmation as described above, the operation for requesting for browsing a Web page corresponding to "My channel" is performed. Thus, the browser display screen 44 shows the reconfirmed "My channel" screen shown in FIG. 31.

Figure 34:
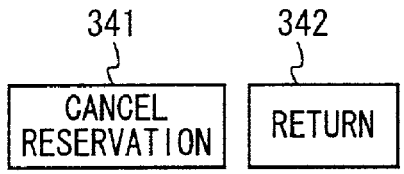

To cancel a reservation, the user clicks the "Cancel" link button 311. When the "Cancel" link button 311 is clicked, the CPU 120 of the user PC 106 sends the information that the "Cancel" link button has been clicked, to the live casting server 150 over the Internet 103. In response to this, the live casting server 150 sends a Web page for the cancellation to the user PC 106 over the Internet 103 and as a result, the browser display screen 44 of the user PC 106 displays the cancellation screen shown in FIG. 34.

As shown in this figure, the cancellation screen shows the currently set reservation contents and a "reservation cancellation" button 341 and "Return" button 342. The user clicks the "Reservation cancellation" button 341 to cancel the reservation and clicks the "Return" button 342 otherwise.

Figure 35:
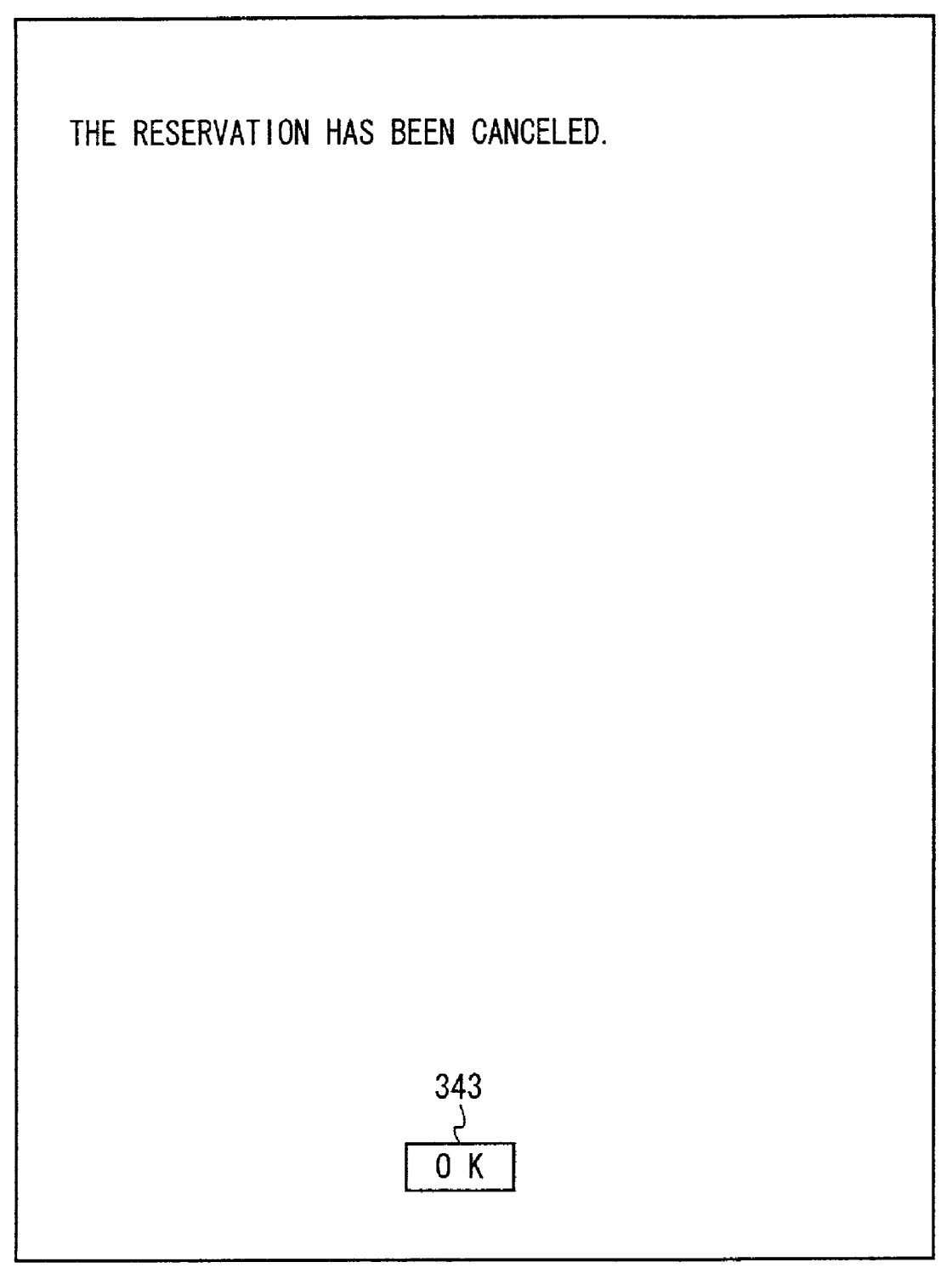

Then, when the user clicks the "Reservation cancel" button 341, the CPU 120 of the user PC 106 sends the information that the reservation will be canceled, to the live casting server 150 over the Internet 103. Thus, the live casting server 150 erases the registration contents in the reservation database 151 and sends the Web page of the cancellation completion screen to the user PC 106 over the Internet 103. As a result, the browser display screen 44 of the user PC 106 displays a message shown in FIG. 35 notifying that the reservation has been canceled. When the user clicks the "OK" button 343, cancellation is completed and the "My channel" screen in FIG. 31 appears.

When the reservation is canceled in this way, the live casting server 150 sends e-mail including information that the reservation has been canceled and live distribution will not carried out, to the e-mail addresses registered in the friend list above. Thus, it is possible to automatically inform people who have the e-mail addresses that live distribution will not performed, without the need for the user of the user PC 106 to inform by telephone that live distribution will not performed or to create e-mail including such a message.

Furthermore, if the user wants to confirm the reservation contents after the reconfirmation above has been made, the user clicks the "Reconfirmed" button shown on the screen in FIG. 31. When the "Reconfirmed" button is clicked, the CPU 120 of the user PC 106 sends the information to the live casting server 150 over the Internet 103. In response to this, the live casting server 150 sends the Web page for confirming the reconfirmed reservation to the user PC 106 over the Internet 103. As a result, the browser display screen 44 of the user PC 106 shows the currently set reservation contents, special items when the dialup router is used, a "Reenter PC connection setting" button 361 and a "Return" button 362 instructing a return to the "My channel" screen.

If the "Reenter PC connection setting" button 361 is clicked, the CPU 120 of the user PC 106 sends the information to the live casting server 150 over the Internet 103. In response to this, the live casting server 150 sends the reservation setting information file (see FIG. 29) to the user PC 106 over the Internet 103 again. As a result, the user PC 106 automatically takes in the reservation setting information file. Retransmission of this reservation setting information file can be performed when a PC different from the PC used to make a reconfirmation is used to perform the live distribution, etc.

B-3. Live Distribution

When the distribution reservation including the above reconfirmation is completed and the time for starting the reserved live distribution comes, the user of the user PC 106 connects to the streaming server 102 via the dedicated server connection network 108 and performs a live distribution of the content. Then, the client PC 107 receives the content by requesting for the stream distribution of the content.

B-3-1. Content Transmission from User PC to Streaming Server

Figure 37:
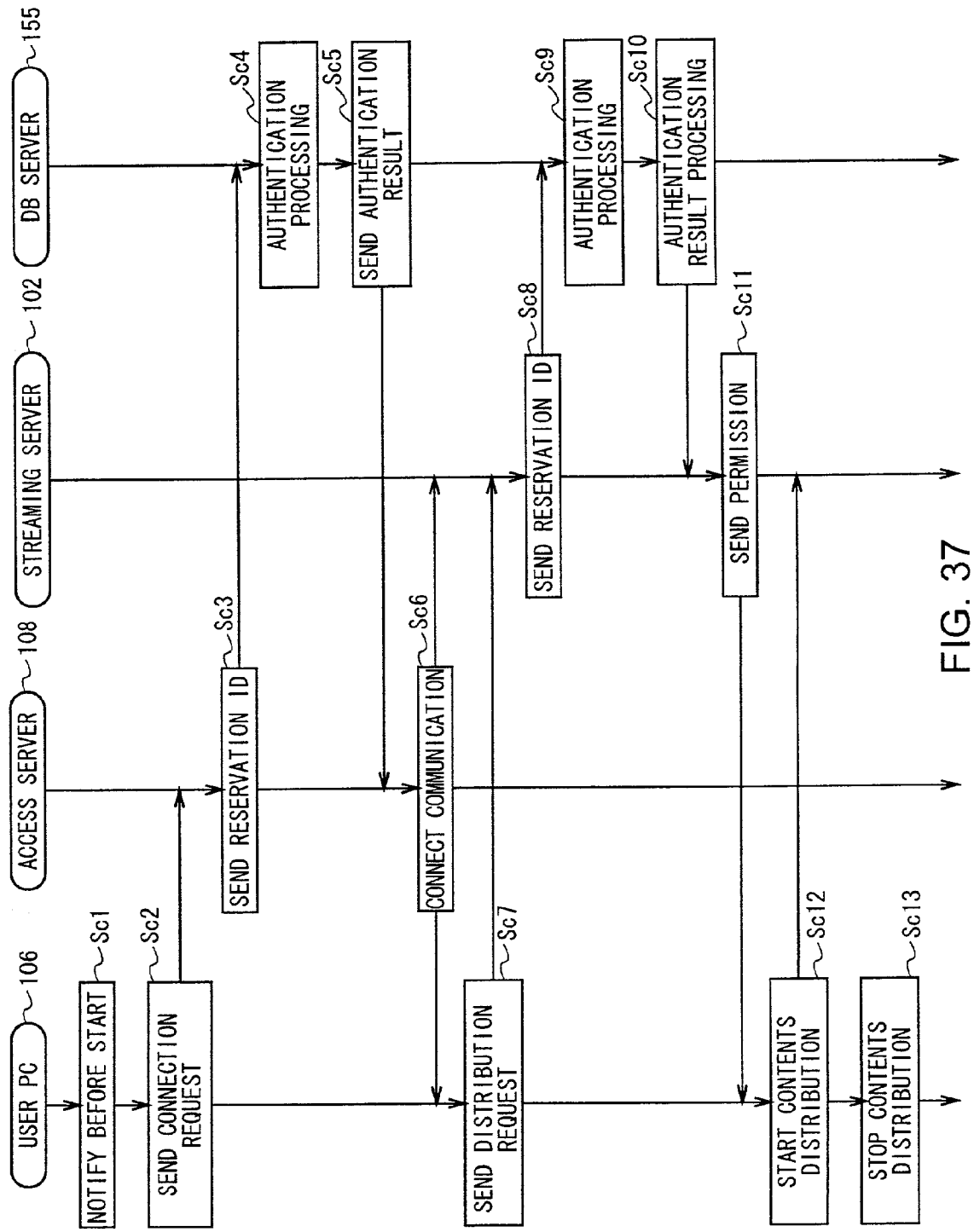
FIG. 37 is a sequence flow chart showing processing operations in the content supply system during the live distribution.

The processing operations by the user PC 106, the dedicated server connection network 108, the database server 155 (see FIG. 12) and the streaming server 102 when the user PC 106 sends content to the streaming server 102 by live distribution will be explained with reference to FIG. 37 showing a sequence flow chart of the processing operation.

When a live distribution is performed, connection to the streaming server 102 is permitted from five minutes before the start time of the reserved live distribution, and so the processing to establish communication/connection between the user PC 106 and the streaming server 102 will be started at this time. The user prepares content distribution before the start time of the live distribution. The preparation for the content distribution includes the determination of the photographing position of the digital video camera 129 (see FIG. 3), effect setting processing in live distribution mode based on the concept of the contents to be distributed (see FIG. 10 and FIG. 11), etc.

The user PC 106 of this embodiment stores a program to display a message "Live distribution will start soon" to the user a predetermined time before the reserved live distribution start time (e.g., ten minutes before) and as shown in FIG. 37, when the predetermined time before the start time comes, the CPU 120 of the user PC 106 executes this program to display the message "Live distribution will start soon" on the display section 124 (step Sc1). This prevents the user from forgetting the live distribution start time. Here, if the user PC 106 is not set to live distribution mode in the aforementioned application, the CPU 120 automatically executes this application program, automatically selects the live distribution mode in the application and displays the "Live distribution mode" screen on the display section 124 (see FIG. 9A).

Then, when the time at which the start of connection to the streaming server 102 is permitted (five minutes before the start time) comes, the CPU 120 of the user PC 106 executes the connection processing program to automatically start the processing of communication/connection with the streaming server 102. The communication/connection processing started can be fully automated or the user can only enter an instruction for the final connection start to automatically execute the communication/connection processing using this input as a trigger.

The processing by the CPU 120 according to the communication/connection processing program decrypts the reservation setting information file encrypted and stored in a predetermined registry (see FIG. 29) and carries out the following communication/connection processing based on the information described in the items "reservation ID" of this file, "server accessible time", "access telephone number" and "access server information".

When the accessible start time indicated by "server accessible time" comes, the CPU 120 starts communication/connection processing, acquires the access port telephone number of the carrier preset by the user by referring to the "access telephone number" of the reservation setting information file and carries out processing for calling the telephone number. The CPU 120 then sends the reservation ID to the access server of the dedicated server connection network 108 and requests for communication/connection (step Sc2). Since the automatic calling processing is carried out in this way, the user need not enter the telephone number, etc. In the case of live distribution in particular as described above, using the user PC 106 in the modes shown in FIG. 3B or FIG. 3C by entering information, etc. with the keyboard 126*a* is a very complicated operation, and therefore the processing of automatic calling provides the user with a more comfortable content creation environment.

In order to authenticate whether the user PC 106 that has requested for connection to the access port as described above belongs to a user who has a valid reservation, the access server of the dedicated server connection network 108 sends the sent reservation ID to the database server 155 of the server reservation control center 101 (step Sc3). The database server 155 that has received the reservation ID sent from the dedicated server connection network 108 carries out authentication processing by checking whether this reservation ID is registered in the reservation database 151 in the time zone that starts at the current time (step Sc4). If the reservation ID sent is registered in the reservation database 151, the access server judges that the user PC 106 that has sent this reservation ID has a valid reservation and if the reservation ID sent is not registered in the reservation database 151 in that time zone, the access server judges that the user PC 106 that has sent this reservation ID does not have a valid reservation.

In this authentication processing, only the reservation ID described above is used. This has the following effect. For example, when the reservation is authenticated using the user ID and password of each member of this service, even if it is confirmed that the user ID and password are valid and it is the member who has accessed, it is not possible to distinguish whether the member has a reservation in that time zone. Therefore, in the authentication processing, it is necessary to authenticate whether the user is a member, then to check the registration content of the reservation and to check whether the member identified with the user ID has a reservation in the time zone, which makes the authentication processing very complicated. In contrast, if the reservation ID used only for authentication for the reservation described above is used, this reservation ID is the information that only the user can know, and therefore there is no need to authenticate the user ID and it is possible to distinguish whether the user has a valid reservation through the simple authentication processing of checking whether the reservation ID is registered for the reservation for the time zone corresponding to the accessed time.

The database server 155 that has performed the authentication processing using the reservation ID as described above sends this authentication result to the access server of the dedicated server connection network 108 (step Sc5).

When the authentication result from the database server 155 shows that a user has a valid reservation, the access server of the dedicated server connection network 108 permits the connection between the user PC 106 and the streaming server 102, which establishes a PPP connection and communication/connection between them (step Sc6). On the other hand, in the case where the authentication result shows a user does not have a valid reservation, the access server of the dedicated server connection network 108 does not permit the connection between the user PC 106 and the streaming server 102 and immediately cuts the call from the user PC 106. Thus, by immediately cutting the call when it is judged that the call is from an illegal user, the line is secured for users with a valid reservation.

When connected to the streaming server 102 via the dedicated server connection network 108 as described above, the CPU 120 of the user PC 106 sends a reservation ID to the streaming server 102 to request for a live distribution (step Sc7).

The streaming server 102 that has received the live distribution request from the user PC 106 sends the sent reservation ID to the database server 155 of the server reservation control center 101 to authenticate whether the user PC 106 that has requested for the live distribution shows that a user has a valid reservation (step Sc8). Thus, the database server 155 that has received the reservation ID sent from the streaming server 102 carries out authentication processing by checking whether this reservation ID is registered in the reservation database 151 for the time zone that starts from the current time (step Sc9). This authentication processing is similar to that when a reservation ID is sent from the access server of the dedicated server connection network 108.

The database server 155 that has carried out authentication processing using the reservation ID as described above sends this authentication result to the streaming server 102 (step Sc10).

In the case where the authentication result from the database server 155 shows that a user has a valid reservation, the streaming server 102 permits a live distribution by the user PC 106 and informs the user PC 106 of this permission (step Sc11), acquires information about the reservation from the reservation database 151 (reservation time zone, channel, etc.) and controls live distribution based on this information. Thereby, the CPU 120 of the user PC 106 displays a message, etc. to notify the user that the live distribution has been permitted and urges the user to start distribution of the content. Upon reception of this notification, the user states to capture image with the digital video camera 129 by operating the operation dial 126b and operation buttons 126c, creates motion picture data obtained by applying real-time effect processing to the captured video, instructs the start of live distribution and sends the created motion picture data to the streaming server 102 in real time via the dedicated server connection network 108 (step Sc12).

Thus, the streaming server 102 that has received the motion picture data, which is the content sent from the user PC 106 distributes this by streaming to the client PC 107 that has requested. In this case, if the "open level" of the live distribution (see FIG. 22, etc.) is "Public", the streaming server 102 performs stream-distribution unconditionally in response to the distribution request, within the capacity of the channel on which the live distribution is carried out. On the other hand, if the "open level" is "Password" or "Secret", the streaming server 102 urges the client PC 107 that has requested the distribution to enter a password, and performs stream-distribution only for the client PC 107 that has entered a valid password. The distribution request between the streaming server 102 and the client PC 107 and the stream distribution processing operation will be described later.

Once the live distribution is started in this way, the streaming server 102 sends the time information of the service provider side acquired from the NTP server 153 and information on the number of the client PCs 107 that receive the live distribution, that is, the client PCs 107 that have requested distribution of the content, to the user PC 106. Then, the status window SW (see FIG. 9A) displayed on the display section 124 of the user PC 106 shows information that the contents are on the air, information on elapsed time of distribution, time information of the service provider side, time information of the user PC 106 side, information on the number of audiences, reservation start/end time, residual time information indicating the residual time of distribution, image size information and information on the distribution data transmission rate, etc. With reference to the display of this status window SW, the user can know various kinds of information on the live distribution currently in progress. Especially, it is a matter of concern for the transmitter of contents how many people are viewing or listening to the content and this also serves as a reference in selecting a channel (selecting the capacity) when live distribution is performed the next time. Thus, the display of the number of audience described above can be significant to the user.

In this way, when content is sent from the user PC 106 to the streaming server 102 and the user of the user PC 106 finishes live distribution before the reservation end time (time of the service provider side), the user operates the operation dial 126b (see FIG. 3) etc. to select/determine "distribution start/end" of the GUI (see FIG. 9B) in the live distribution mode. Thus, the CPU 120 of the user PC 106 finishes the transmission of content and cuts the connection with the streaming server 102 (step Sc13).

On the other hand, if the user personally finishes the content transmission before the reservation end time, the above processing is performed, but if the content transmission from the user PC 106 to the streaming server 102 is in progress when the reservation end time comes, the streaming server 102 finishes stream distribution processing of the content sent from the user PC 106 for the client PC 107 when the reservation end time comes. The streaming server 102 further forcibly cuts the communication/connection with the user PC 106 at the time of finishing the connection with the user PC 106 indicated by "server accessible time" (see FIG. 29).

B-3-2. Stream Distribution of Content from Streaming Server to Client PC

What has been explained above is the detail of the content transmission processing from the user PC 106, which is the transmitter terminal in live distribution, to the streaming server 102 and the streaming server 102 receives content transmission from the user PC 106 and performs a stream distribution of the content to the client PC 107 that has sent a request. This processing operation of contents stream distribution will be explained with reference to the display screen, etc. of the client PC 107 that sends a distribution request. In the following explanation, suppose the "open level" of the content distribution (see FIG. 22) is "Password" or "Secret" and this user of the client PC 107 knows the password to receive content.

When the client user of the client PC 107 sends a content distribution request, the client user turns on power to the client PC 107 and starts the browser software. Then, the client user enters a URL to identify the top page of the Web page of the live casting server 150 on the client PC 107 and the CPU of the client PC 107 sends a request for browsing the Web page to the live casting server 150 over the Internet 103. Thus, the live casting server 150 sends the top page of the Web page over the Internet 103 and as a result, the display screen of the client PC 107 displays the screen shown in FIG. 13.

To receive a content distribution, the client user clicks a link button such as "Today's live" (see FIG. 15) or "program guide" (see FIG. 17). If the client user clicks the "program guide", the client user further clicks on the current date on the calendar shown on the screen in FIG. 17. Thus, the programs to be distributed on that day is displayed as shown in FIG. 15. Then, the client user clicks the "title" link button of the program whose distribution is to be requested from the programs displayed.

When the "title" link button is clicked in this way, the CPU of the client PC 107 sends a request for browsing the Web page that displays detailed information of the "title" to the live casting server 150 over the Internet 103. Then, the live casting server 150 sends the Web page that displays detailed information of the specified live program to the client PC 107 over the Internet 103. As a result, the display screen of the client PC 107 displays the screen shown in FIG. 16.

If the client user requests for the distribution of the program with the detailed information, the client user enters a password to obtain a distribution permission on the display screen shown in FIG. 16 and clicks the "Replay" button 175.

In the case where the client PC 107 does not have real-time replay software, the client user clicks the "Replay software" button 176 before clicking the "Replay" button 175 to download the replay software beforehand.

Then, when the password is entered and the "Replay" button 175 is clicked, the CPU of the client PC 107 sends the entered password and distribution request to the streaming server 102 over the Internet 103. The streaming server 102 sends the sent password to the database server 155 and the database server 155 executes authentication processing whether the password sent is valid with reference to the reservation database 151, and sends the authentication result to the streaming server 102.

When the authentication result above shows that the password sent is a valid password, the streaming server 102 judges whether to perform a distribution to the client PC 107 based on the capacity preset for the channel used for the content distribution. More specifically, the streaming server 102 compares the number of the client PCs 107 carrying out distribution of the content with the capacity and if content distribution is already being carried out to the same number of client PCs 107 as the capacity, the streaming server 102 will perform no further distribution. That is, when content distribution is being carried out to the client PCs 107 as many as the capacity, at the time of a distribution request, the streaming server 102 will not respond to the distribution request.

Figure 38:
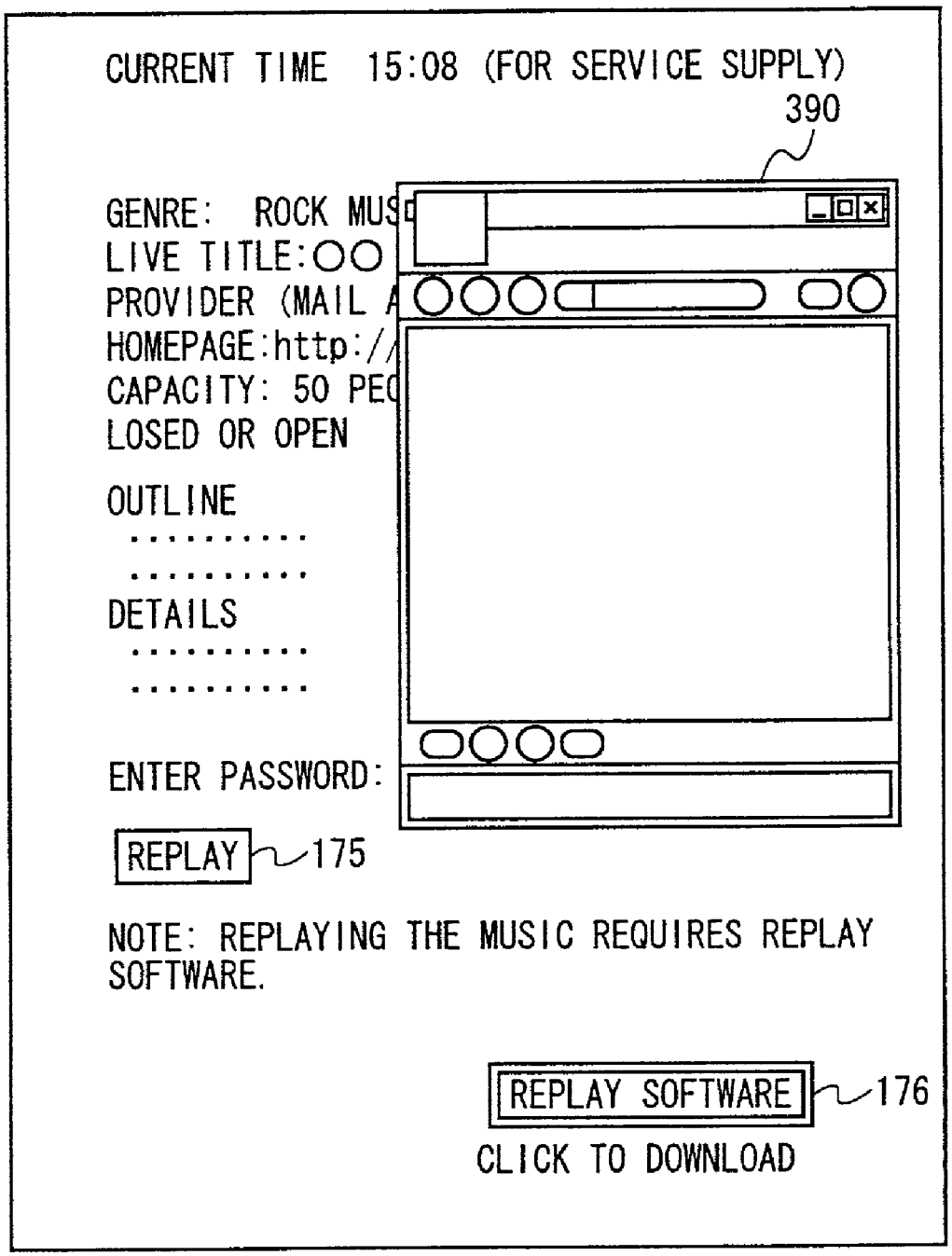
FIG. 38 is a drawing showing a display screen of a client PC that receives a content supply during the live distribution.

On the other hand, if the number of client PCs 107 that receive the contents is smaller than the capacity at the time of the distribution request, the streaming server 102 permits the distribution to the requesting client PCs 107 and the streaming server 102 performs stream distribution of the content to the client PCs 107. Once stream distribution is started in this way, the display screen of the client PC 107 displays the replay display screen 390 of the replay software on the program detailed information display screen as shown in FIG. 38 and the content distributed by streaming is reproduced in real time on the replay display screen 390. In this way, the users of the client PCs 107 can reproduce and view and listen to the live-distributed content in real time.

Furthermore, the streaming server 102 counts the number of the client PCs 107 that sent a request for distribution of the program and are actually receiving the distribution and sends this count result, that is, information of the number of audiences to the content transmission terminal (the user PC 106 in the above explanation).

In the explanation above, the client PCs 107 send a distribution request to the streaming server 102 via the Web page of the live casting server 150, but when a user who has an e-mail address set in the "Friend list" (see FIG. 22) sends a distribution request using the client PC 107, it is also possible to configure the system so that the user enters a URL displayed in "Address information for distribution request" of the e-mail sent from the live casting server 150 as described above (see FIG. 30) or clicks on a URL being displayed. Carrying out such an operation, the CPU of the client PC 107 starts processing of connection to the destination specified by the URL, that is, the streaming server 102 and can thereby request the streaming server 102 for distribution.

C. Modification

By the way, the present invention is not limited to the embodiment described above, but can be modified in various manners as shown in the following examples.

(Modification 1)

In the embodiment above, the streaming server 102 stream-distributes to a requesting client PC 107 the contents sent from the user PC 106. The streaming server 102 can also be configured so as to carry out a rebroadcast service in such a manner that the contents sent from the user PC 106 is stored in a medium such as a hard disk and is distributed as an on-demand program while the stream distribution processing is carried out. In this case, it is possible to post the rebroadcast program on the "Today's program" Web page (see FIG. 15) and distribute the content to the requesting client PC 107.

Furthermore, the embodiment above performs content distribution by sending motion picture data taken with the digital video camera 129 of the user PC 106 in real time as content to the streaming server 102, and also the user can perform content distribution by storing content created beforehand using the user PC 106, etc. in the hard disk 123 and sending the content to the streaming server 102 at a reserved distribution time. In order to send content in real time using the user PC 106 as described in the aforementioned embodiment, when sending content such as the captured motion picture data, etc. to the streaming server 102, it is also possible to store the content data in the hard disk 123 of the user PC 106. Then, content distribution may be performed by making a reservation for live distribution again and distributing the stored contents as a rebroadcast program from the user PC 106 to the streaming server 102.

(Modification 2)

In the aforementioned embodiment, the streaming server 102 performs the stream distribution of the content sent from the user PC 106, to a requesting client PC 107. However, it is also possible to perform a service consisting of not only performing the stream distribution processing but also storing the contents sent from the user PC 106, in a medium such as a hard disk, writing the content to another kind of publicly known package medium such as a compact disc-read only memory (CD-ROM) or a digital versatile disc-read only memory (DVD-ROM) and distributing this content to the requesting user. Such a service allows the client user of the client PC 107 to view and listen to the live-distributed distributed content and to request for favorite content written in a package medium to be distributed. As described above, since the dedicated server connection network 108 is used as the communication path between the user PC 106, which is the terminal for transmitting the contents, and the streaming server 102, it is possible to secure a sufficient transmission band. On the other hand, the communication path between the streaming server 102 and the client PC 107 is the one using the Internet 103, and therefore it is not always possible to secure a sufficient transmission band, and the communication path is likely to be subject to restrictions on the transmission band. Due to such restrictions on the transmission band, it is necessary to reduce the transmission rate of stream data distributed to the client PC 107 and in this case, the quality of reproduced image of the content may deteriorate on the client PC 107 side. The above-described service can respond to the request for viewing and listening to favorite contents with high-quality video reproduced. That is, using this service, it is possible to write content sent from the user PC 106 to the streaming server 102, directly into a package medium and reproduce the written content data with the client PC 107, allowing the client user to view and listen to the contents with the same quality as that of the content sent from the user PC 106 to the streaming server 102. In addition, the client who receives content recorded in such a package medium can view and listen to the content by reproducing or displaying it on a TV screen using a player (can be other than a PC) provided with a function of reproducing/displaying the content stored in the package medium.

(Modification 3)

The aforementioned embodiment permits the user to perform live distribution only in a time zone reserved beforehand. However, while live distribution based on the reservation is in progress, the streaming server 102 can refer to the reservation database 151, check the reservation situation after the reservation time of the channel currently in use is completed and if there is any free space, send a message such as "Reservation can be extended to oo" to the user PC 106 a predetermined time before the reservation end time (e.g., ten minutes before). The status window SW (see FIG. 9A) of the user PC 106 that has received this message, etc. can display this message. In this case, an extension button is displayed on the status window SW, and when this extension button is clicked, the CPU 120 of the user PC 106 sends the information that an extension will be made, to the streaming server 102. The streaming server 102 that has received this permits the extension. Carrying out such an extension service provides effects such as making it possible to respond to an extension request from the user of the user PC 106 who is the distributor and also allowing the service provider to make effective use of the channel of the streaming server 102.

(Modification 4)

Furthermore, the aforementioned embodiment describes the case where the program to execute distribution reservation processing is pre-installed in the hard disk of the live casting server 150 or the program to execute various kinds of processing for making a reservation for distribution or various kinds of processing for live distribution is pre-installed in the hard disk 123 of the user PC 106. However, the present invention is not limited to this and it is also possible to install the various kinds of the programs by reproducing a program storage medium which is a package medium such as a compact disc-read only memory (CD-ROM) or a digital versatile disc-read only memory (DVD-ROM), storing the content distribution program or install the various kinds of the programs by reproducing a program storage medium such as semiconductor memory or magneto-optical disk in which such a program is stored temporarily or permanently.

As the means for storing the various kinds of programs in such a program storage medium, it is also possible to use wired or wireless communication medium such as a local area network or digital satellite broadcasting or to store those programs via various communication interfaces such as a router and modem.

(Modification 5)

Furthermore, the aforementioned embodiment describes the case where the Internet 103 is used as the network to make a reservation for distribution between the user PC 106 and the live casting server 150, but the present invention is not limited to this and it is also possible to use another type of wired or wireless network.

Furthermore, in the aforementioned embodiment, the dedicated server connection network 108 is provided to connect the user PC 106 and the streaming server 102, but the present invention is not limited to this and it is also possible to connect them via the Internet 103.

(Modification 6)

Furthermore, in the aforementioned embodiment, the user PC 106 with a built-in digital video camera 129 is used as the transmitter terminal for live distribution, but it is also possible to use an ordinary PC with a digital video camera connected via the Institute of Electrical and Electronics Engineers (IEEE) 1394 interface, etc. with cables or a PC connected to a digital video camera which is connected by radio. It is also possible to use a cellular phone with a digital video camera connected using a cable, etc. or a cellular phone with a built-in digital video camera, instead of the user PC 106.

The case where a cellular phone using a built-in digital video camera instead of the user PC 106 will be explained below.

Figure 39:
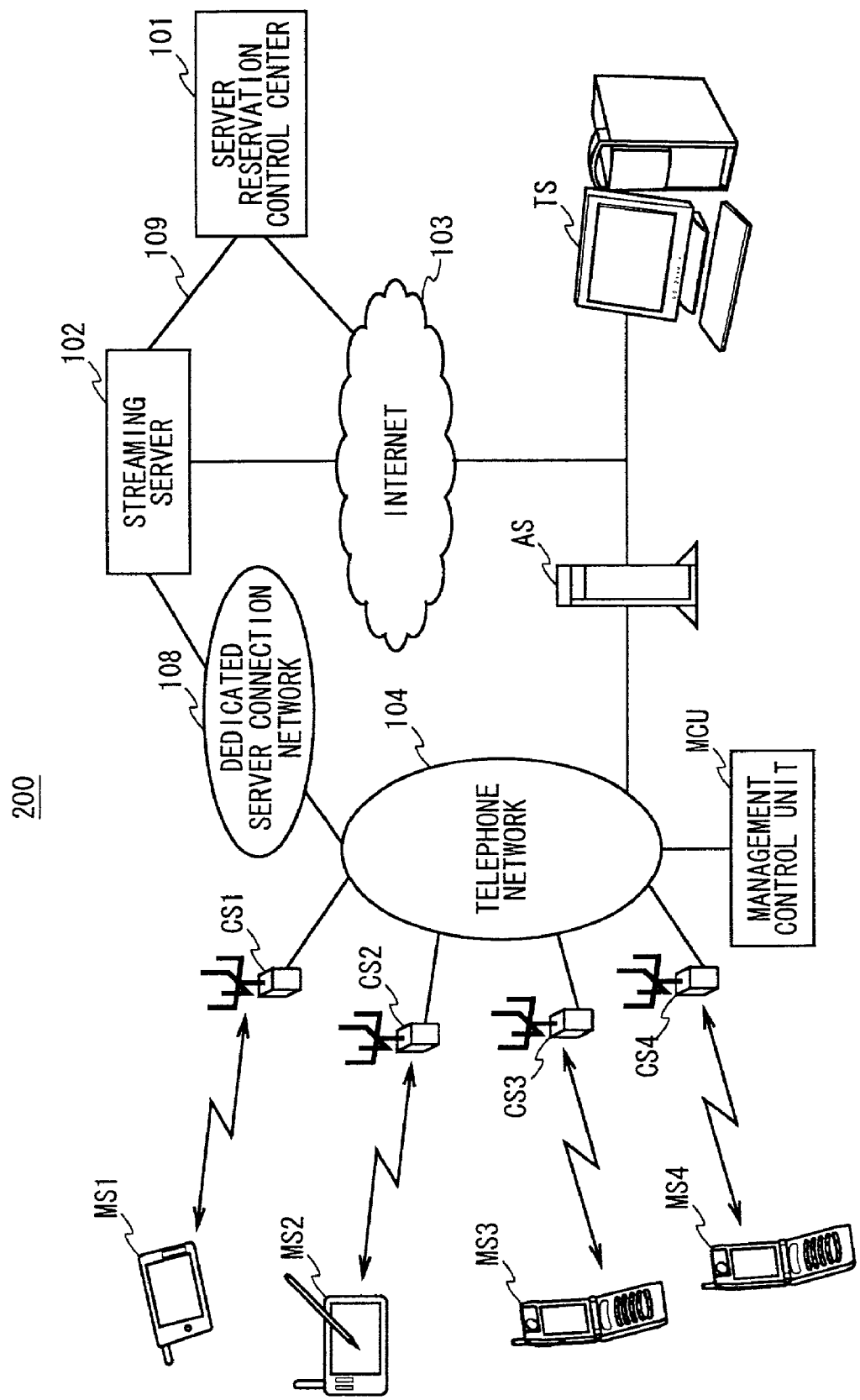
FIG. 39 is a schematic drawing showing an overall configuration of a network system according to a modification of the embodiment.

In FIG. 39, reference numeral 200 denotes a network system to which a cellular phone MS3 applying the present invention is connected, and base stations CS1 to CS4, which are fixed radio stations, are located in their respective cells resulting from dividing the communication service supply area into desired sizes.

These base stations CS1 to CS4 are connected to portable information terminals MS1 and MS2, which are mobile radio stations, and camera-integrated digital cellular phones MS3 and MS4 by radio according to a wideband-code division multiple access (W-CDMA) scheme and are capable of transmitting a large volume data at a high data transfer rate of up to 2 Mbps using a 2 GHz frequency band.

In this way, the portable information terminals MS1 and MS2 and camera-integrated digital cellular phones MS3 and MS4 can communicate a large volume data at a high transfer rate according to the W-CDMA system, and can thereby perform not only voice communication but also various kinds of data communication such as transmission/reception of e-mail, browsing of simple homepages, transmission/reception of images.

Furthermore, the base stations CS1 to CS4 are connected to the telephone network 104 via a wired line, and this telephone network 104 is connected to the Internet 103 and many subscriber wired terminals (not shown), computer networks and intra-networks, etc.

The telephone network 104 is also connected to the access server AS of the Internet service provider and the access server AS is connected to a contents server TS owned by the Internet service provider.

This contents server TS provides content such as simple homepage as a file in a compact hyper text markup language (HTML) format, for example, in response to the request from the subscriber wired terminal, portable information terminals MS1 and MS2 and camera-integrated digital cellular phones MS3 and MS4. This compact HTML is an HTML subset obtained by keeping only tags that can be reflected and leaving out the rest of a limit-sized display apparatus. For example, iMode (registered trademark) of NTT DoCoMo uses an i-mode HTML which focuses on functions necessary for a cellular phone and uses 30 types of tags and has restrictions such that it is not possible to specify character attributes and colors of text and a two-gradation GIF file is recommended for images. It is possible to create a simple homepage file that is browsed by portable terminals with a limited display area and display capability by using handheld device markup language (HDML) and wireless markup language (HML) which are descriptive languages used for the compact HML and the mobile communication protocol wireless application protocol (WAP), etc.

In this network system 200, the Internet 103 is connected to the server reservation control center 101, streaming server 102 the same as in the aforementioned embodiment, and the subscriber wired terminals, portable information terminals MS1 and MS2 and camera-integrated digital cellular phones MS3 and MS4 can access the server reservation control center 101 and streaming server 102 according to a protocol such as TCP/IP (Transmission Control Protocol/Internet Protocol). In the example illustrated, when a content distribution is performed using the streaming server 102, the camera-integrated digital cellular phones MS3 and MS4 send contents to the streaming server 102 over the dedicated server connection network 108 as in the aforementioned embodiment, and also content can be sent over the Internet 103.

By the way, the portable information terminals MS1 and MS2, and the camera-integrated digital cellular phones MS3 and MS4 communicate with base stations CS1 to CS4 using a simple transport protocol of 2 Mbps (not shown) and the base stations CS1 to CS4 communicate with WWW server WS1 to "WSn over the Internet ITN using a TCP/IP protocol.

By the way, the management control unit MCU is connected to the subscriber wired terminals, portable information terminals MS1 and MS2 and camera-integrated digital cellular phones MS3 and MS4 via the telephone network 104 and is responsible for authentication processing and billing processing on the subscriber wired terminals, portable information terminals MS1 and MS2 and camera-integrated digital cellular phones MS3 and MS4.

Figure 40:
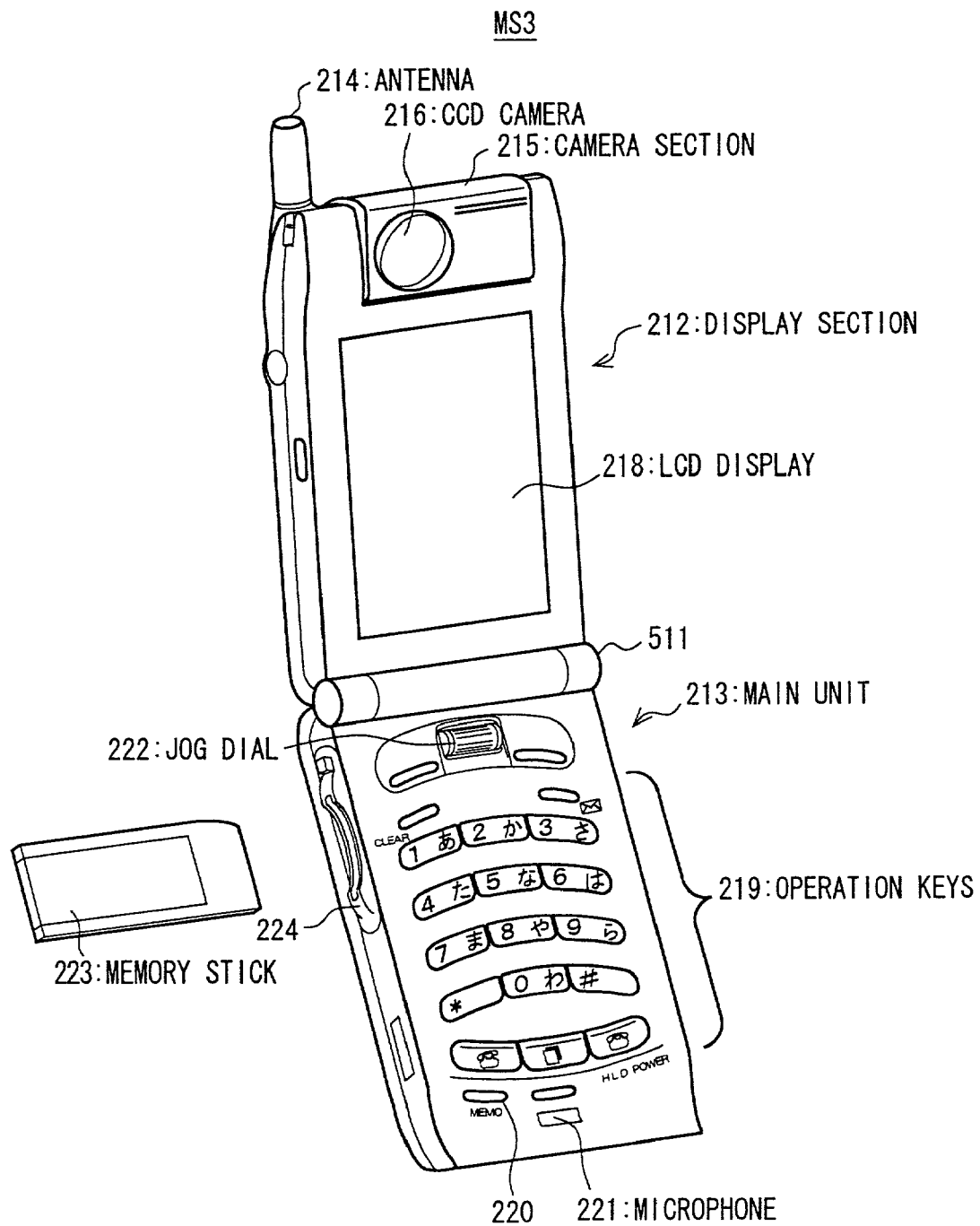
FIG. 40 is a schematic perspective view showing an external configuration of a camera-integrated digital cellular phone.
Figure 41:
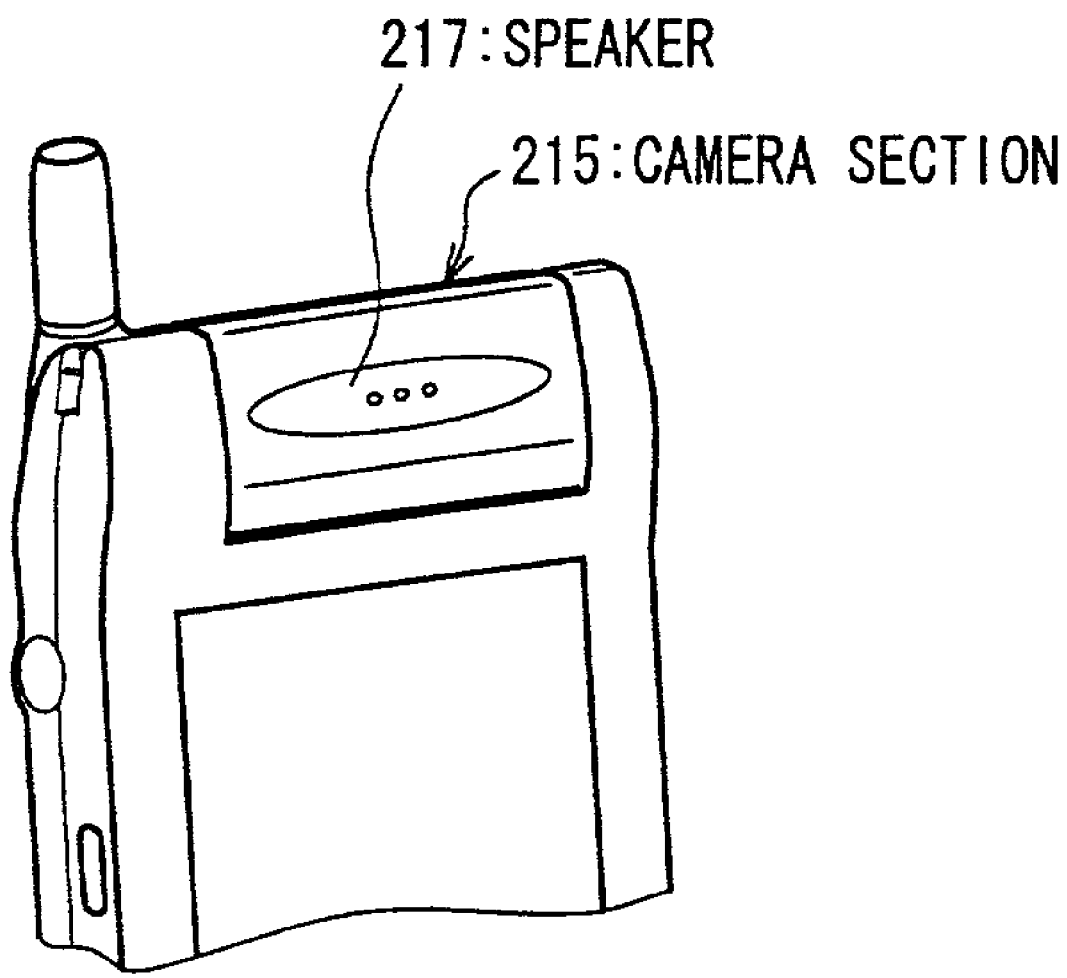
FIG. 41 is a schematic perspective view showing a display section of the camera-integrated digital cellular phone when the camera is rotated.

Next, a configuration example of the appearance of the camera-integrated digital cellular phone MS3 that can be used instead of the user PC 106 above will be explained. As shown in FIG. 40, the camera-integrated digital cellular phone MS3 is divided into the display section 212 and main unit 213 with the hinge 211 located in the center as the boundary and is foldable via the hinge 211.

The display section 212 has a transmission/reception antenna 214 at the top left set in a telescopic manner and radio waves are transmitted/received to/from the base station CS3 via the antenna 214.

Furthermore, the display section 212 is provided with a camera section 215 at the top center which is pivotable at an angle of nearly 180 degrees and a CCD camera 216 mounted in the camera section 215 allows a desired object to be captured.

Here, in the display section 212 when the user rotates the camera section 215 nearly 180 degrees, a speaker 217 provided in the center on the back of the camera section 215 faces toward the front, which provides a normal voice conversation state.

The display section 212 is further provided with an LCD display 218 on the front to show the reception quality of a radio wave, the battery level, names and telephone numbers registered in a telephone directory, transmission history, contents of e-mail, simple homepage and images taken with the CCD camera 216 of the camera section 215.

On the other hand, the main unit 213 is provided with operation keys 219 including numeral keys "0" to "9", call key, redial key, end/power key, clear key and e-main key and it is possible to enter various commands using these operation keys 219.

The main unit 213 is also provided with a memo button 220 and a microphone 221 under the operation keys 219 and it is possible to record voice during a call using the memo button 220 and collect the user's voice during conversation by the microphone 221.

The main unit 213 is also provided with a jog dial 222 above the operation keys 219, which is pivotable and slightly protrudes from the surface of the main unit 213, and executes various operations such as scrolling of the telephone directory and e-mail displayed on the LCD display 218, rolling-up of the simple homepage and image feeding operations, etc, according to the rotation operation of the jog dial 222.

For example, when the user selects a desired telephone number from among a plurality of telephone numbers in the telephone directory displayed on the LCD display 218 according to the rotation operation of the jog dial 222 and presses the jog dial 222 toward inside the main unit 213, the main unit 213 confirms the selected telephone number and automatically calls on the relevant telephone number.

By the way, the main unit 213 is provided with a battery pack (not shown) on the back and when the end/power key is in the ON state, the battery supplies power to each section to drive them.

On the other hand, the main unit 213 is also provided with a memory stick slot 224 to insert a removable memory stick (trademark of Sony Corporation) on the top left side of the main unit 213 and when the memo button 220 is pressed, it is possible to record the voice of the other party in communication in this memory stick or store e-mail, simple homepage or images taken by the CCD camera 216 according to the operations by the user.

The memory stick 223 is a type of flash memory card developed by Sony Corporation, the present applicant. This memory stick 223 contains a flash memory element, which is an electrically erasable and programmable read only memory (EEPROM), a kind of electrically erasable and programmable non-volatile memory, in a small, thin plastic case of 21.5 (H)×50 (W)×2.8 (D)mm, and allows write/read of various kinds of data such as images, voice and music via a ten-pin terminal.

Furthermore, the memory stick 223 uses a special serial protocol that can secure compatibility with apparatuses used even if the specification of an internal flash memory is changed because of introduction of a large-volume memory, implements high-speed performance with a maximum writing speed of 1.5 MB/S and maximum read speed of 2.45 MB/S and secures high reliability by providing a erroneous erasure protection switch.

Constructed with the capability of inserting such a memory stick 223, the camera-integrated digital cellular phone MS3 can share data with other electronic devices via this memory stick 223.

Figure 42:
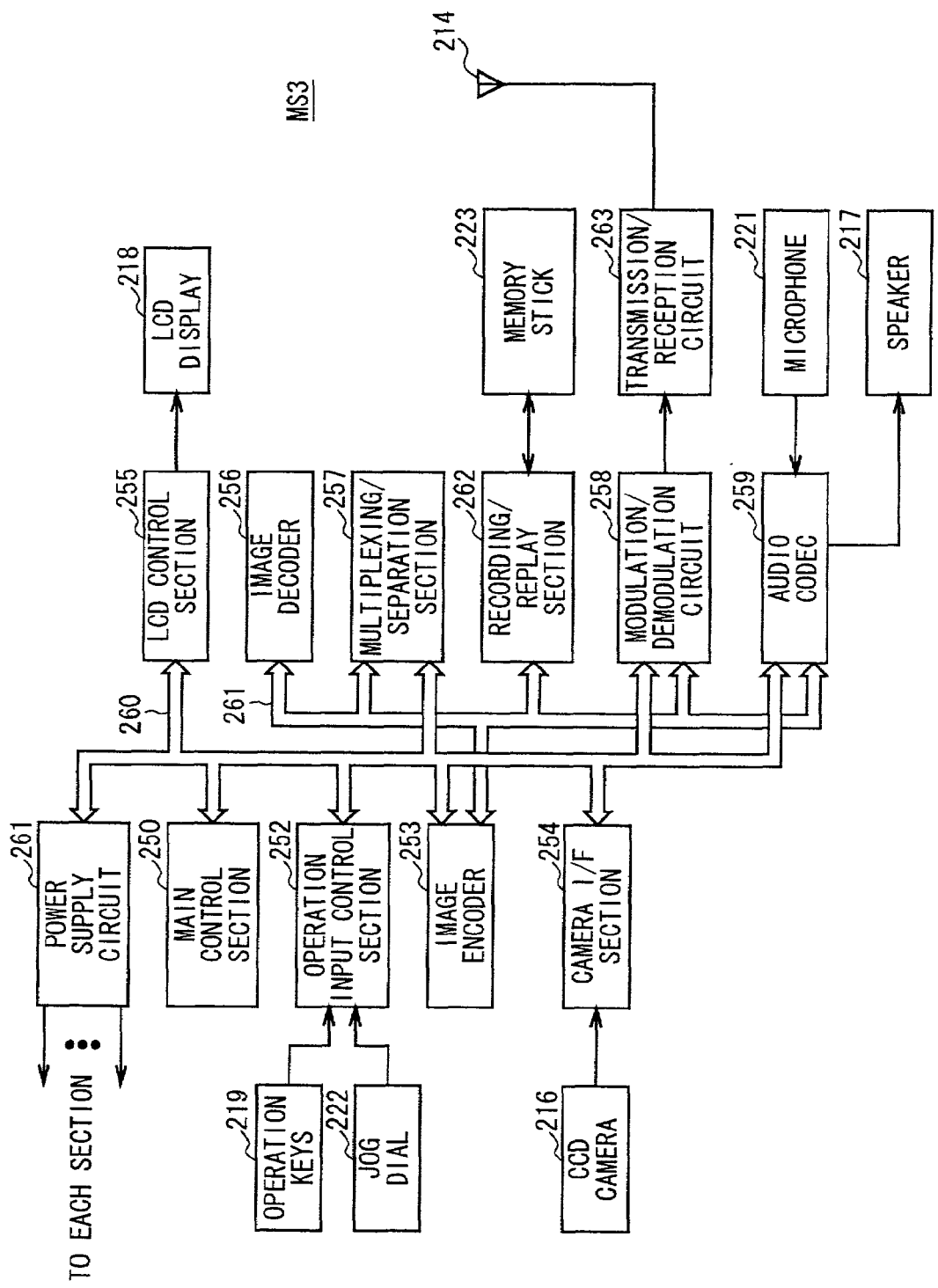
FIG. 42 is a block diagram showing a circuit configuration of the camera-integrated digital cellular phone.

As illustrated in FIG. 42, in the camera-integrated digital cellular phone MS3, a main control section 250 that controls the display section 212 and main unit 213, a power supply circuit 251, an operation input control section 252, an image encoder 253, a camera interface section 254, a liquid crystal display (LCD) control section 255, an image decoder 256, a multiplexing/separation section 257, a record/replay section 262, a modulation/demodulation circuit 258 and an audio CODEC 259, are mutually connected by a main bus 260, and the image encoder 253, the image decoder 256, the multiplexing/separation section 257, the modulation/demodulation circuit 258 and the audio CODEC 259 are mutually connected by a synchronous bus 261.

The power supply circuit 251, when the user turns ON the end/power key, supplies power from the battery pack to each sections to drive the camera-integrated digital cellular phone MS3.

The camera-integrated digital cellular phone MS3 converts the audio signal collected by the microphone 221 to digital audio data by the audio CODEC 259 in voice conversation mode, subjects this to spread spectrum processing at the modulation/demodulation circuit 258, subjects this to digital/analog conversion processing and frequency conversion processing at the transmission/reception circuit 263 and transmits the resultant from the antenna 214, under the control of main control section 250 composed of a CPU, ROM and RAM, etc.

The camera-integrated digital cellular phone MS3 amplifies the reception signal received by the antenna 214 in the voice conversation mode, subjects this to frequency conversion processing and analog/digital conversion processing, subjects this to despread spectrum processing at the modulation/demodulation circuit 258, converts the resultant to an analog audio signal at the audio CODEC 259 and outputs this via the speaker 217.

Furthermore, when transmitting an e-mail in the data communication mode, the camera-integrated digital cellular phone MS3 sends text data of the e-mail which has been entered by operating the operation keys 219 and jog dial 222 to the main control section 250 via the operation input control section 252.

The main control section 250 subjects the text data to spread spectrum processing at the modulation/demodulation circuit 258, subjects to digital/analog conversion processing and frequency conversion processing at the transmission/reception circuit 263 and then transmits the resultant to the base station CS3 (see FIG. 39) via the antenna 214.

On the other hand, when receiving an e-mail in the data communication mode, the camera-integrated digital cellular phone MS3 subjects the reception signal received by the base station CS3 via the antenna 214 to despread spectrum processing at the modulation/demodulation circuit 258, restores the original text data and then displays the text data as the e-mail on the LCD display 218 via the LCD control section 255.

Then, the camera-integrated digital cellular phone MS3 can also store the e-mail, which has been received according to the operation of the user, in the memory stick 223 via the record/replay section 262.

On the other hand, when sending image data in the data communication mode, the camera-integrated digital cellular phone MS3 supplies the image data taken by the CCD camera 216, to the image encoder 253 via the camera interface section 254.

By the way, when no image data is sent, the camera-integrated digital cellular phone MS3 can also directly display the image data taken by the CCD camera 216 on the LCD display 218 via the camera interface section 254 and LCD control section 255.

The image encoder 253 converts the image data supplied from the CCD camera 216 into encoded image data, by compressing/encoding according to a predetermined encoding system such as moving picture experts group (MPEG) 2 or MPEG4 and sends this to the multiplexing/separation section 257.

At this time, the camera-integrated digital cellular phone MS3 sends the voice collected by the microphone 221 during shooting by the CCD camera 216 as digital audio data to the multiplexing/separation section 257 via the audio CODEC 259.

The multiplexing/separation section 257 multiplexes the encoded image data supplied from the image encoder 253 and the audio data supplied from the audio CODEC 259 according to a predetermined system, subjects the resultant multiplexed data to spread spectrum processing at the modulation/demodulation circuit 258, subjects this to digital/analog conversion processing and frequency conversion processing at the transmission/reception section 262 and transmits the resultant via the antenna 214.

On the other hand, in data communication mode, when receiving, for example, data of a motion picture file linked to a simple homepage, etc., the camera-integrated digital cellular phone MS3 subjects the reception signal received via the antenna 214 from the base station CS3 to despread spectrum processing at the modulation/demodulation circuit 258 and sends the resultant multiplexed data to the multiplexing/separation section 257.

The multiplexing/separation section 257 separates the multiplexed data into encoded image data and audio data, supplies the encoded image data to the image decoder 256 and supplies the audio data to the audio CODEC 259 via the synchronous bus 261.

The image decoder 256 decodes the encoded image data according to a decoding system corresponding to a predetermined encoding system such as MPEG2 or MPEG4 to create reproduced motion picture data, supplies this to the LCD display 218 via the LCD control section 255, and thereby, for example, motion picture data contained in the motion picture file linked to the simple homepage is displayed.

At the same time, the audio CODEC 259 converts audio data to an analog audio signal, then supplies this to the speaker 217 and thereby, reproduces audio data included in the motion picture file linked to the simple homepage, for example.

In this case, as in the case of e-mail, the camera-integrated digital cellular phone MS3 can store the data linked to the received simple homepage, etc. in the memory stick 223 via the recording/replay section 262 through operations by the user.

In addition to such a configuration, the camera-integrated digital cellular phone MS3 stores an application program, etc. similar to that in the aforementioned embodiment in the ROM of the main control section 250, accesses the live casting server 150 (see FIG. 12) of the reservation control center 101 based on this application program, can thereby perform live distribution reservation processing including member registration and reconfirmation to the live casting server 150, and when a reservation is made, receives the reservation setting information file (see FIG. 28) and automatically encrypts and saves the file. At this time, the camera-integrated digital cellular phone MS3 can perform processing similar to live distribution processing based on a reservation carried out by the user PC 106 in the aforementioned embodiment. Thus, in a live distribution, the camera-integrated digital cellular phone MS3 automatically reads the reservation setting information file saved in the reservation processing and establishes a communication/connection with the streaming server 102 and sends the content taken with the CCD camera 216 to the streaming server 102 and performs a live distribution of the content.

(Modification 7)

Moreover, in the embodiment above, the screen shown in FIG. 22 is displayed on the browser display screen 44 of the user PC 106 that has received the Web page sent from the live casting server 150 over the Internet 103 to make a distribution reservation (step Sb3 in FIG. 21). This display screen for the distribution reservation has the "friend list" item in the reservation input column 222 to enter e-mail addresses of friends, etc. who should be informed of information that live distribution will be performed, but it is also possible to enter contact addresses other than e-mail addresses. For example, instead of the distribution reservation screen (FIG. 22), it is also possible to display the distribution reservation screen as shown in FIG. 43 on the browser display screen 44. As shown in this figure, in addition to e-mail addresses, telephone numbers and facsimile numbers, etc. can be entered in the column of the "friend list" item of the reservation input column 222a on this display screen.

When a telephone numbers and facsimile numbers are entered in the "friend list" item in the reservation input column 222a and the reservation button 223 is clicked, the CPU 120 of the user PC 106 creates a desired reservation information file including telephone numbers and facsimile numbers and this desired reservation information file is sent to the live casting server 150 over the Internet 103. In this case, the live casting server 150 sends information including the distribution time zone, destination information, password, etc., as in the case of the email (FIG. 30), to the telephone numbers and facsimile numbers included in the desired reservation information file at same the timing as the e-mail transmission timing (e.g., at the time of completion of reconfirmation shown in step Sb19 in FIG. 25). In the case of a telephone number, it is possible to automatically call on the telephone number and when the other party answers the call, notify the other party of information about the live distribution by a voice guidance, etc. and in the case of a facsimile number, it is possible to send the data describing the information as facsimile data.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A content distribution notification method of informing a third party by a first party that a content distribution will be performed based on a reservation by a first party distributor terminal apparatus, said reservation for use of a distribution server, via a reservation control apparatus for controlling a reservation status of said distribution server, via a first network, and for performing a live content distribution using said distribution server based on the reservation, in order to perform the live content distribution using said distribution server for distributing content by streaming via said network to a client terminal apparatus, said content distribution notification method comprising:

receiving reservation request information including a desired service time to use said distribution server and third party contact address who should be informed that the content distribution will be performed, from said first party distributor terminal apparatus to said reservation control apparatus via a network;

setting a reservation based on said reservation request information;

a subsequent notifying step of sending notification information based on said reservation request information to notify the third party that the content distribution will be performed, from said reservation control apparatus to the third party contact address via the network when the content distribution using said distribution server in said desired service time included in said reservation request information is permitted;

unidirectionally streaming the content distribution from a live distribution source to the third party based on said reservation request information;

performing a capacity check before accepting the reservation, including determining whether a channel is opened or closed;

providing a reservation summary to the first party including an indication of capacity, bands available, fee and a schedule showing which periods of time are free or reserved; and reserving by the third party, for rebroadcast by the distribution server, a predetermined portion of a previous live broadcast of said content distribution, wherein said reservation request information includes one of at least a first reservation type and a second reservation type;

a permission notification step of sending, when content distribution using said distribution server in said desired service time included in said reservation request information is permitted, reservation permission notification information to notify the first party that the content distribution is permitted and that it is necessary for said first party to carry out a procedure for reconfirming the reservation via the network by a predetermined time before said desired service time to establish this reservation, from said reservation control apparatus to said first party distributor terminal apparatus via the network, and wherein said notification step sends said notification information upon said distributor terminal apparatus performing said reservation reconfirmation procedure.

2. The content distribution notification method according to claim 1, wherein
said notification information includes access information for connection said distribution server.

3. The content distribution notification method according to claim 1, wherein:
said step of sending notification information includes sending authentication information for the third party to acquire a permission to access said distribution server; and
said notification information includes said authentication information.

4. The content distribution notification method according to claim 1, further comprising
a cancellation notification step of sending cancellation notification information to notify the third party that the reservation is canceled by said first party, from said reservation control apparatus to the third party contact address via a network, when information of canceling the reservation is sent from said first party distributor terminal apparatus to said reservation control apparatus via the network.

5. The content distribution notification method according to claim 1, further comprising
a change notification step of sending change notification information to notify the third party that the reservation contents are changed by said first party, from said reservation control apparatus to the third party contact address via the network, when information of changing the reservation contents is sent from said first party distributor terminal apparatus to said reservation control apparatus via the network.

6. The content distribution notification method according to claim 1, further comprising
a permission notification step of sending, when content distribution using said distribution server in said desired service time included in said reservation request information is permitted, reservation permission notification information to notify the first party that the content distribution is permitted and that it is necessary for the first party to carry out a procedure for reconfirming the reservation via the network by a predetermined time before said desired service time to establish this reservation from said reservation control apparatus to said first party distributor terminal apparatus via the network, and wherein said notification step sends said notification information upon said permission notification information being sent and further to send said notification information upon said first party distributor terminal apparatus performing said reservation reconfirmation procedure.

7. The content distribution notification method according to claim 1, wherein:
the third party contact address is an e-mail address; and
said notification step is to send said notification information to the third party contact address via an e-mail.

8. The content distribution notification method of claim 1, wherein said first and second reservation types include a restricted reservation type and a public reservation type, respectively.

9. The content distribution notification method of claim 8, wherein said restricted reservation type is one of a password reservation type and a secret reservation type.

10. A reservation control apparatus for controlling reservations of live content distribution by a first party to a third party using a distribution server that performs stream distribution of content to a third party terminal apparatus via a network, said reservation control apparatus comprising:
receiving means for receiving reservation request information including a desired service time to use said distribution server and a third party contact address who should be informed that the content distribution will be performed, from a first party distributor terminal apparatus requesting to perform live content distribution via a network;
means for setting a reservation based on said reservation request information; and
notification means for subsequently sending notification information based on said reservation request information to notify said third party that the content distribution will be performed, from said reservation control apparatus to the third party contact address via the network, when content distribution using said distribution server in said desired service time included in said reservation request information is permitted; and
means for unidirectionally streaming the content distribution from a live distribution source to the third party based on said reservation request information;
means for performing a capacity check before accepting the reservation, including determining whether a channel is opened or closed;
means for providing a reservation summary to the first party including an indication of capacity, bands available, fee and a schedule showing which periods of time are free or reserved; and
means for reserving by the third party, for rebroadcast by the distribution server, a predetermined portion of a previous live broadcast of said content distribution, wherein
said reservation request information includes one of at least a first reservation type and a second reservation type;
a permission notification means for sending, when content distribution using said distribution server in said desired service time included in said reservation request information is permitted, reservation permission notification information to notify the first party that the content distribution is permitted and that it is necessary for the first party to carry out a procedure for reconfirming the reservation via the network by a predetermined time before said desired service time to establish this reservation, to said distributor terminal apparatus via the network, and wherein said notification means sends said notification information upon said first party distributor terminal apparatus performing said reservation reconfirmation procedure.

11. The reservation control apparatus according to claim 10, wherein
said notification means includes means for sending said notification information including access information for connection to said distribution server.

12. The reservation control apparatus according to claim 10, wherein
said receiving means includes means for receiving reservation request information including authentication information for the third party to acquire a permission to access said distribution server; and
said notification means includes means for sending said notification information including said authentication information.

13. The reservation control apparatus according to claim 10, wherein said receiving means further comprises
cancellation notification means for sending cancellation notification information to notify the third party that the reservation is canceled by said first party, from said reservation control apparatus to said third party contact address via the network, when receiving information of canceling the reservation sent from said first party distributor terminal apparatus via the network.

14. The reservation control apparatus according to claim 10, wherein said receiving means further comprises
change notification means for sending change notification information to notify the third party that the reservation is changed by said first party, from said reservation control apparatus to the third party contact address via the network, when receiving information of changing the reservation contents sent from said first party distributor terminal apparatus via the network.

15. The reservation control apparatus according to claim 10, further comprising
permission notification means for sending, when content distribution using said distribution server in said desired service time included in said reservation request information is permitted, reservation permission notification information to notify the first party that the content distribution is permitted and that it is necessary for the first party to carry out a procedure for reconfirming the reservation via the network by a predetermined time before said desired service time to establish this reservation, to said distributor terminal apparatus via the network, and wherein
said notification means sends said notification information upon said permission notification information being sent and further sends said notification information upon said distributor terminal apparatus performing said reservation reconfirmation procedure.

16. The reservation control apparatus according to claim 10, wherein:
the third party contact address user is an e-mail address; and
said notification means sends said notification information to the third party contact address via an e-mail.

17. The reservation control apparatus of claim 10, wherein said first and second reservation types include a restricted reservation type and a public reservation type, respectively.

18. The reservation control apparatus of claim 17, wherein said restricted reservation type is one of a password reservation type and a secret reservation type.

19. A computer program stored in a computer readable medium and containing instructions to cause a computing device to perform a content distribution notification method of informing a third party by a first party that a content distribution will be performed based on a reservation by a first party distributor terminal apparatus, said reservation for use of a distribution server, via a reservation control apparatus for controlling a reservation status of said distribution server, via a first network, and for performing a live content distribution using said distribution server based on the reservation, in order to perform the live content distribution using said distribution server for distributing content by streaming via said network to a client terminal apparatus, said content distribution notification method comprising:

receiving reservation request information including a desired service time to use said distribution server and third party contact address who should be informed that the content distribution will be performed, from said first party distributor terminal apparatus to said reservation control apparatus via a network;

setting a reservation based on said reservation request information;

a subsequent notifying step of sending notification information based on said reservation request information to notify the third party that the content distribution will be performed, from said reservation control apparatus to the third party contact address via the network when the content distribution using said distribution server in said desired service time included in said reservation request information is permitted;

unidirectionally streaming the content distribution from a live distribution source to the third party based on said reservation request information;

performing a capacity check before accepting the reservation, including determining whether a channel is opened or closed;

providing a reservation summary to the first party including an indication of capacity, bands available, fee and a schedule showing which periods of time are free or reserved; and reserving by the third party, for rebroadcast by the distribution server, a predetermined portion of a previous live broadcast of said content distribution, wherein said reservation request information includes one of at least a first reservation type and a second reservation type;

a permission notification step of sending, when content distribution using said distribution server in said desired service time included in said reservation request information is permitted, reservation permission notification information to notify the first party that the content distribution is permitted and that it is necessary for said first party to carry out a procedure for reconfirming the reservation via the network by a predetermined time before said desired service time to establish this reservation, from said reservation control apparatus to said first party distributor terminal apparatus via the network, and wherein said notification step sends said notification information upon said distributor terminal apparatus performing said reservation reconfirmation procedure.

* * * * *